US009451060B1

(12) United States Patent
Bowers et al.

(10) Patent No.: US 9,451,060 B1
(45) Date of Patent: Sep. 20, 2016

(54) TECHNIQUES AND APPARATUS FOR CONTROLLING ACCESS TO COMPONENTS OF A PERSONAL COMMUNICATION STRUCTURE (PCS)

(71) Applicant: Civiq Smartscapes, LLC, Milford, MA (US)

(72) Inventors: Kyle R. Bowers, Boxborough, MA (US); Benjamin P. Lee, Wayland, MA (US); Parag N. Shah, Carlisle, MA (US); Kenneth J. Gray, Woonsocket, RI (US); Benjamin M. Lawler, Beverly, MA (US)

(73) Assignee: Civiq Smartscapes, LLC, Milford, MA (US)

( * ) Notice: Subject to any disclaimer, the term of this patent is extended or adjusted under 35 U.S.C. 154(b) by 0 days.

(21) Appl. No.: 14/884,044

(22) Filed: Oct. 15, 2015

(51) Int. Cl.
| G08B 13/00 | (2006.01) |
| H04M 1/02 | (2006.01) |
| H04W 88/02 | (2009.01) |
| H04W 12/08 | (2009.01) |
| G08B 13/22 | (2006.01) |

(52) U.S. Cl.
CPC ............... *H04M 1/02* (2013.01); *G08B 13/22* (2013.01); *H04W 12/08* (2013.01); *H04W 88/02* (2013.01)

(58) Field of Classification Search
CPC ... G06Q 30/0241; G06Q 90/00; G06Q 10/00
USPC ...................... 340/541, 5.61, 5.51, 5.91, 5.8; 705/7.11, 14.37, 1.1
See application file for complete search history.

(56) References Cited

U.S. PATENT DOCUMENTS

| 2,029,221 A | 1/1936 | Jackson et al. |
| 4,923,319 A | 5/1990 | Dent |
| 5,061,023 A | 10/1991 | Soubliere et al. |
| 5,415,949 A | 5/1995 | Stone et al. |
| 5,587,740 A | 12/1996 | Brennan |
| 5,991,153 A | 11/1999 | Heady et al. |

(Continued)

FOREIGN PATENT DOCUMENTS

| CN | 104695733 | 6/2015 |
| WO | WO-2015/123142 A1 | 8/2015 |

OTHER PUBLICATIONS

City Bridge, LLC, "Link NYC Technical Proposal," submitted Jul. 21, 2014 to the City of New York Department of Information, Technology and Telecommunications in response to Request for Proposals for a Franchise to Install, Operate and Maintain Public Communications Structures (248 pages).

(Continued)

*Primary Examiner* — Phung Nguyen
(74) *Attorney, Agent, or Firm* — Goodwin Procter LLP

(57) ABSTRACT

Techniques and apparatus for controlling access to a personal communication structure (PCS) are described. The PCS may include independently accessible compartments at least partially enclosing respective subsystems of the PCS. The independently accessible compartments include an electronics compartment, a communications compartment, and a display compartment. The electronics, communications, and display compartments at least partially enclose a power distribution subsystem, a communications subsystem, and a display subsystem, respectively. The PCS also includes an access controller operable to provide access independently to respective interiors of at least a subset of the compartments to authorized users.

30 Claims, 32 Drawing Sheets

(56) References Cited

U.S. PATENT DOCUMENTS

| | | | |
|---|---|---|---|
| 6,002,240 A | 12/1999 | McMahan et al. |
| 6,010,065 A | 1/2000 | Ramachandran et al. |
| 6,210,066 B1 | 4/2001 | Dent |
| 6,364,761 B1 | 4/2002 | Steinbrecher |
| 6,384,811 B1 | 5/2002 | Kung et al. |
| 6,493,440 B2 | 12/2002 | Gromatzky et al. |
| 6,512,670 B1 | 1/2003 | Boehme et al. |
| 6,766,005 B1 | 7/2004 | Grunenwald |
| 6,788,544 B1 | 9/2004 | Barsun et al. |
| 7,108,445 B2 | 9/2006 | Henriques |
| 7,157,838 B2 | 1/2007 | Thielemans et al. |
| 7,195,222 B2 | 3/2007 | Dent |
| 7,339,782 B1 | 3/2008 | Landes et al. |
| 7,374,258 B2 | 5/2008 | Bowron |
| 7,734,764 B2 | 6/2010 | Weiner et al. |
| 7,748,681 B2 | 7/2010 | Dent |
| 7,980,533 B1 | 7/2011 | Anderson et al. |
| 7,985,139 B2 | 7/2011 | Lind et al. |
| 8,006,435 B2 | 8/2011 | DeBlonk et al. |
| 8,037,651 B2 | 10/2011 | Dent |
| 8,108,724 B2 | 1/2012 | Barlow et al. |
| 8,125,163 B2 | 2/2012 | Dunn et al. |
| 8,154,768 B2 | 4/2012 | Muraki |
| 8,189,134 B2 | 5/2012 | LeCave |
| 8,208,115 B2 | 6/2012 | Dunn |
| 8,212,959 B2 | 7/2012 | Moscovitch et al. |
| 8,274,622 B2 | 9/2012 | Dunn |
| 8,281,531 B2 | 10/2012 | Dent |
| 8,297,067 B2 | 10/2012 | Keisling et al. |
| 8,310,824 B2 | 11/2012 | Dunn et al. |
| 8,321,052 B2 | 11/2012 | Yepez et al. |
| 8,323,089 B2 | 12/2012 | Nagano |
| 8,345,845 B2 | 1/2013 | Boyce et al. |
| 8,350,799 B2 | 1/2013 | Wasinger et al. |
| 8,351,013 B2 | 1/2013 | Dunn et al. |
| 8,351,014 B2 | 1/2013 | Dunn |
| 8,358,397 B2 | 1/2013 | Dunn |
| 8,369,083 B2 | 2/2013 | Dunn et al. |
| 8,373,841 B2 | 2/2013 | Dunn |
| 8,379,182 B2 | 2/2013 | Dunn |
| 8,427,007 B2 | 4/2013 | Jansma et al. |
| 8,439,761 B2 | 5/2013 | O'Keene et al. |
| 8,472,174 B2 | 6/2013 | Idems et al. |
| 8,482,695 B2 | 7/2013 | Dunn |
| 8,497,972 B2 | 7/2013 | Dunn et al. |
| 8,508,155 B2 | 8/2013 | Schuch |
| 8,569,910 B2 | 10/2013 | Dunn et al. |
| 8,606,428 B2 | 12/2013 | Chan |
| 8,649,170 B2 | 2/2014 | Dunn et al. |
| 8,654,302 B2 | 2/2014 | Dunn et al. |
| 8,700,226 B2 | 4/2014 | Schuch et al. |
| 8,711,321 B2 | 4/2014 | Dunn et al. |
| 8,713,377 B2 | 4/2014 | Nuthi |
| 8,749,749 B2 | 6/2014 | Hubbard |
| 8,755,021 B2 | 6/2014 | Hubbard |
| 8,767,165 B2 | 7/2014 | Dunn |
| 8,773,633 B2 | 7/2014 | Dunn et al. |
| 8,804,091 B2 | 8/2014 | Dunn et al. |
| 8,823,916 B2 | 9/2014 | Hubbard et al. |
| 8,854,572 B2 | 10/2014 | Dunn |
| 8,854,595 B2 | 10/2014 | Dunn |
| 8,927,909 B2 | 1/2015 | Le Neel et al. |
| 8,988,647 B2 | 3/2015 | Hubbard |
| 9,030,641 B2 | 5/2015 | Dunn |
| 9,072,166 B2 | 6/2015 | Dunn et al. |
| 9,116,263 B2 | 8/2015 | Hayden, Sr. |
| 2001/0032918 A1 | 10/2001 | Barnes et al. |
| 2003/0080949 A1 | 5/2003 | Ditzik |
| 2004/0187505 A1 | 9/2004 | Hoff et al. |
| 2005/0038749 A1 | 2/2005 | Fitch et al. |
| 2005/0166482 A1 | 8/2005 | Leahy et al. |
| 2005/0210331 A1 | 9/2005 | Connelly et al. |
| 2006/0059790 A1 | 3/2006 | Yeung |
| 2006/0218828 A1 | 10/2006 | Schrimpf et al. |
| 2006/0220895 A1 | 10/2006 | Arcaria et al. |
| 2006/0228165 A1 | 10/2006 | Yonan |
| 2007/0103866 A1 | 5/2007 | Park |
| 2007/0170237 A1 | 7/2007 | Neff |
| 2007/0183849 A1 | 8/2007 | Rock |
| 2008/0053129 A1 | 3/2008 | Follette et al. |
| 2008/0113821 A1 | 5/2008 | Beadell et al. |
| 2008/0181385 A1 | 7/2008 | Eveland |
| 2008/0204556 A1 | 8/2008 | de Miranda et al. |
| 2008/0255901 A1* | 10/2008 | Carroll ............... G06Q 30/0237 705/14.37 |
| 2009/0003312 A1 | 1/2009 | Velazquez et al. |
| 2009/0231807 A1 | 9/2009 | Bouissiere |
| 2009/0241388 A1 | 10/2009 | Dunn |
| 2010/0149736 A1 | 6/2010 | Dittmer et al. |
| 2010/0222132 A1* | 9/2010 | Sanford ................. G06Q 30/02 463/25 |
| 2011/0226505 A1 | 9/2011 | Mackin |
| 2012/0262271 A1* | 10/2012 | Torgersrud ............ G06F 21/32 340/5.53 |
| 2013/0147626 A1 | 6/2013 | Hammoud |
| 2015/0244297 A1 | 8/2015 | Niemoeller et al. |

OTHER PUBLICATIONS

CityBridge & LinkNYC Media Data Sheet, available at <http://civiqsmartscapes.com/img/solutions/LinkNYC-Media-Kit.pdf> published Mar. 2015 (13 pages).

\* cited by examiner

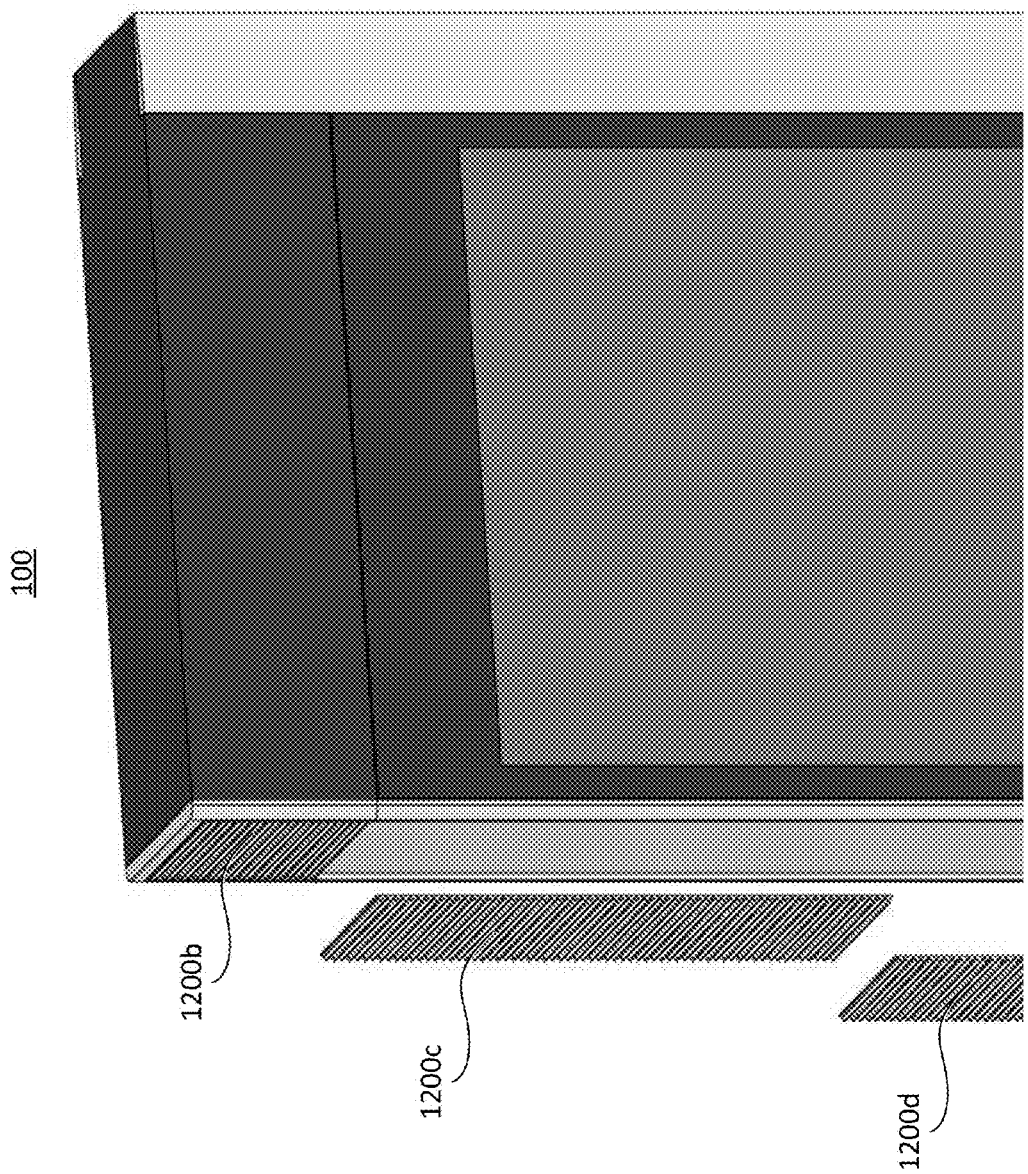

TECHNIQUES AND APPARATUS FOR CONTROLLING ACCESS TO COMPONENTS OF A PERSONAL COMMUNICATION STRUCTURE (PCS)

FIELD OF INVENTION

The present disclosure relates generally to techniques and apparatus for controlling access to components of a personal communication structure (PCS). Some embodiments relate specifically to techniques and apparatus for compartmentalizing subsystems of a PCS and independently controlling access to the individual compartments.

BACKGROUND

In some public or semi-public areas, various structures can be used for communication or to obtain access to goods and services. For example, telephone booths can be used to place telephone calls. Interactive kiosks can be used to obtain access to information, products, and/or services. Some interactive kiosks are self-service kiosks, which allow patrons of a business to perform service tasks that were historically performed by business employees. For example, the automated teller machine (ATM) is a self-service kiosk that allows users to deposit funds into a financial account, withdraw funds from an account, check an account balance, etc.—tasks that were historically performed with the assistance of a human bank teller. As another example, some retail stores allow customers to scan and pay for their items at self-service checkout kiosks rather than checkout stations staffed by human cashiers.

An interactive kiosk generally includes a computer terminal, which executes software and/or controls hardware peripherals to perform the kiosk's tasks. Many interactive kiosks are deployed inside buildings that are accessible to the public (e.g., banks, stores), in areas where the building operators can monitor the kiosks and protect them from unauthorized access. In some cases, interactive kiosks are integrated into walls of buildings (e.g., some ATMs are integrated into walls of banks), fastened to walls, or placed against walls, which can protect the kiosks from unauthorized access and reduce the occurrence of potentially dangerous events such as the kiosks tipping or overturning.

SUMMARY OF THE INVENTION

In recent years, public telephone booths have dwindled in number and many of the remaining booths have fallen into relative disuse and disrepair. The demise of the public telephone booth can be traced, in part, to the increasing prevalence of mobile phones and to the widespread use of communication networks for non-telephonic purposes. Many people who wish to participate in telephone conversations in public places prefer the convenience of their own mobile phones to the inconvenience of a stationary phone booth. Furthermore, in contrast to many mobile phones, conventional public telephone booths do not allow users to access Internet-based data and services. Many people who wish to access Internet-based data and services in public places use mobile computing devices (e.g., smartphones or laptop computers) and wireless networks (e.g., mobile broadband networks or Wi-Fi networks) to do so. In short, for many people, the public telephone booth is less convenient and less functional than other readily-available options for connecting to a communication network.

Despite the seeming ubiquity of mobile computing devices, many people are often left with insufficient access to telephonic or Internet-based services. In some areas, wireless network coverage may be poor or nonexistent. In areas where wireless networks are available, the number of network users or the volume of network traffic may exceed the capacity of the network, leaving some users unable to connect to the network, and degrading quality of service for users who are able to connect (e.g., degrading audio quality of phone calls or reducing rates of data communication). Even when wireless networks are available and not congested, some people may not have access to telephonic or Internet-based services because they may not have suitable computing devices or network-access agreements (e.g., a person may not own a computing device, may own a computing device but not have a network-access agreement with an Internet-service provider, may not own a mobile computing device, may have a mobile computing device with an uncharged battery, etc.).

There is a need for personal communication structures (PCSs) that enhance public access to communication networks. Such PCSs may enhance access to communication networks by expanding network coverage (e.g., making communication networks available in areas where they would otherwise be unavailable), expanding network capacity (e.g., increasing the capacity of communication networks in areas where such networks are available), expanding access to end-user computing devices and telephones, and/or expanding access to charging outlets for mobile computing devices. By enhancing access to communication networks, the PCSs may improve the employment prospects, educational opportunities, and/or quality of life for individuals, families, and communities that would otherwise have limited access to communication networks.

The interior portions of a PCS may be secured to protect the PCS's components from vandalism, theft, and damage (e.g., from unwanted handling or exposure to the ambient environment), protect people from safety hazards (e.g., electrical hazards), prevent unauthorized parties from accessing the PCS's components, etc.

Nevertheless, from time to time it may be necessary or desirable for authorized parties to access the PCS's internal components. For example, it may be desirable for an authorized party to access a PCS component to perform maintenance, to perform tests, to repair or replace the component, to adjust the component's settings, etc. In some cases, it may be desirable for one party to have access to one set of PCS components and for another party to have access to another set of PCS components, without either party having access to both sets of components. More generally, it may be desirable for different parties to have access only to specified subsets of the PCS's components. For example, it may be desirable for an electricians' union to have access to the PCS's power distribution components, so that the union's electricians can maintain or repair the power distribution subsystem, but there may be no reason for the electricians to have access to any other PCS components.

There is a need for a personal communication structure (PCS) with components divided among independently accessible, independently secured compartments, such that suitable parties can be granted access to some PCS components, without granting those parties access to other PCS components. Such an arrangement of secure PCS compartment may facilitate maintenance and operation of the PCS in scenarios where different maintenance providers and/or operators of the PCS need access only to limited subsets of the PCS's components.

According to an aspect of the present disclosure, a PCS is provided including independently accessible compartments at least partially enclosing respective subsystems of the PCS. The independently accessible compartments include an electronics compartment, a communications compartment, and a display compartment. The electronics, communications, and display compartments at least partially enclose a power distribution subsystem, a communications subsystem, and a display subsystem, respectively. The PCS also includes an access controller operable to provide access independently to respective interiors of at least a subset of the compartments.

In some embodiments, the electronics compartment further at least partially encloses a networking subsystem and/or a maintenance subsystem. In some embodiments, the electronics compartment includes a power distribution compartment and an independently accessible networking compartment, wherein the power distribution compartment at least partially encloses the power distribution subsystem, and wherein the networking compartment at least partially encloses a networking subsystem. In some embodiments, the independently accessible compartments further include a networking compartment at least partially enclosing a networking subsystem and/or a maintenance compartment at least partially enclosing a maintenance subsystem. In some embodiments, the electronics compartment includes an access panel movable between an open position and a closed position, and a lock operable to lock the access panel in the closed position. In some embodiments, the access controller is operable to provide access to an interior of the electronics compartment by disengaging the lock and/or moving the access panel to the open position. In some embodiments, the electronics compartment is disposed along a lower portion of the PCS.

In some embodiments, the communications subsystem includes at least one communication device selected from the group consisting of a wireless access point, a radio access node, and an antenna. In some embodiments, the radio access node includes a small cell operable to communicate with 3G mobile networks, 4G mobile networks, and/or LTE mobile networks. In some embodiments, at least one side of the communications compartment is attached to a frame of the PCS by at least one security fastener. In some embodiments, the communications compartment is located proximate a top of the PCS.

In some embodiments, the display subsystem includes a display panel operable to display images. In some embodiments, the display compartment includes an access member movable between an open position and a closed position, and a lock operable to lock the access member in the closed position. In some embodiments, the lock includes a connector coupled to the access member and a mating interlocking connector coupled to a frame of the PCS. In some embodiments, the access member includes a housing, wherein the housing includes a frame, a transparent covering secured to the frame, and a cavity formed by the frame and the transparent covering, and wherein the display panel is secured to the frame and disposed within the cavity. In some embodiments, the access controller is operable to provide access to an interior of the display compartment by disengaging the lock and/or moving the access member to the open position. In some embodiments, the display compartment is disposed along an upper portion of the PCS.

In some embodiments, the access controller includes a processing device, wherein the subset of the independently accessible compartments include respective locks, and wherein the processing device is configured to independently disengage the respective locks. In some embodiments, the processing device is adapted to disengage each of the locks by controlling a solenoid driver, a rotary actuator, a linear actuator, an electromagnet, a cam, and/or a lever. In some embodiments, the access controller is configured to detect closure of an access member of at least one compartment, wherein the access member is movable between an open position and a closed position, and wherein the access controller is configured to engage the lock associated with the at least one compartment based on detection of the closure of the access member.

In some embodiments, the processing device is configured to receive authentication data and to disengage at least one of the locks based on the authentication data meeting authentication requirements associated with the locks. In some embodiments, the access controller further includes a data input device configured to provide the authentication data to the processing device. In some embodiments, the access controller is configured to detect unauthorized access and/or attempted unauthorized access. In some embodiments, the access controller is configured to collect evidence of the unauthorized access and/or the attempted unauthorized access. In some embodiments, the PCS further includes a camera, wherein the access controller is configured to collect the evidence by operating the camera to acquire at least one image of a region proximate to the PCS. In some embodiments, the access controller is configured to provide an alert regarding the unauthorized access and/or the attempted unauthorized access. In some embodiments, the access controller is configured to provide the alert by performing sounding an alarm, displaying a message via the display subsystem, and/or sending a silent alert to a security provider.

In some embodiments, the independently accessible compartments further include a user interface compartment at least partially enclosing a user interface subsystem. In some embodiments, the PCS further includes an air intake compartment at least partially enclosing an air intake subsystem. In some embodiments, the PCS further includes a mounting compartment, wherein the mounting compartment encloses at least one power connection and at least one network connection.

According to another aspect of the present disclosure, a personal communication structure (PCS) is provided including a plurality of independently accessible compartments at least partially enclosing respective subsystems of the PCS. The plurality of independently accessible compartments include an electronics compartment disposed along a lower portion of the PCS, a communications compartment located proximate a top of the PCS, and a display compartment disposed along an upper portion of the PCS. The electronics compartment at least partially encloses a power distribution subsystem. The communications compartment at least partially encloses a communications subsystem. The display compartment at least partially encloses a display subsystem.

In some embodiments, the electronics compartment further at least partially encloses a networking subsystem and/or a maintenance subsystem. In some embodiments, the electronics compartment includes an access panel movable between an open position and a closed position, and a lock operable to lock the access panel in the closed position. In some embodiments, the access controller is operable to provide access to an interior of the electronics compartment by disengaging the lock and/or moving the access panel to the open position.

In some embodiments, the communications subsystem includes at least one communication device selected from the group consisting of a wireless access point, a radio access node, and an antenna. In some embodiments, the radio access node includes a small cell. In some embodiments, the small cell is operable to communicate with 3G mobile networks, 4G mobile networks, and/or LTE mobile networks.

In some embodiments, the display subsystem includes a display panel operable to display images. In some embodiments, the display compartment includes an access member movable between an open position and a closed position, and a lock operable to lock the access member in the closed position. In some embodiments, the lock includes a connector coupled to the access member and a mating interlocking connector coupled to a frame of the PCS. In some embodiments, the access member includes a housing, wherein the housing includes a frame, a transparent covering secured to the frame, and a cavity formed by the frame and the transparent covering, and wherein the display panel is secured to the frame and disposed within the cavity. In some embodiments, the access controller is operable to provide access to an interior of the display compartment by disengaging the lock and/or moving the access member to the open position.

In some embodiments, the PCS further includes an access controller operable to provide access independently to respective interiors of at least a subset of the compartments. In some embodiments, the access controller includes a processing device, wherein the subset of the independently accessible compartments include respective locks, and wherein the processing device is configured to independently disengage the respective locks. In some embodiments, the processing device is configured to receive authentication data and to disengage at least one of the locks based on the authentication data meeting authentication requirements associated with the locks.

In some embodiments, the PCS further includes a data input device adapted to provide the authentication data to the processing device, and an air intake compartment at least partially enclosing an air intake subsystem and the data input device. In some embodiments, the independently accessible compartments further include a user interface compartment at least partially enclosing a user interface subsystem.

According to another aspect of the present disclosure, an access-control method for a personal communication structure (PCS) is provided. The method includes receiving authentication data via an interface of the PCS. The PCS includes a plurality of independently accessible compartments at least partially enclosing respective subsystems of the PCS. The plurality of independently accessible compartments includes an electronics compartment at least partially enclosing a power distribution subsystem, a communications compartment at least partially enclosing a communications subsystem, and a display compartment at least partially enclosing a display subsystem. The method further includes, based, at least in part, on a determination that the authentication data meets authentication requirements associated with a first of the independently accessible compartments, providing access to an interior of the first compartment without providing access to interiors of other independently accessible compartments.

In some embodiments, providing access to the interior of the first compartment includes moving an access panel of the first compartment from a closed position to an open position and/or disengaging a lock coupled to the access panel. In some embodiments, the access panel of the first compartment is moved to the open position without moving access panels of the other independently accessible compartments.

In some embodiments, the lock of the first compartment is disengaged without disengaging locks of the other independently accessible compartments.

In some embodiments, the method further includes receiving permission to provide authorized access to the interior of the first compartment, wherein the access to the interior of the first compartment is provided based, at least in part, on the receipt of the permission to provide authorized access to the interior of the first compartment and on the determination that the authentication data meets the authentication requirements associated with the first compartment. In some embodiments, the permission to provide authorized access to the interior of the first compartment is received from a remote entity through a communication network. In some embodiments, the permission to provide authorized access to the interior of the first compartment is limited to a specified time period. In some embodiments, the specified time period is based, at least in part, on a repair schedule and/or a maintenance schedule.

In some embodiments, the method further includes requesting permission to provide authorized access to the interior of the first compartment, prior to receiving the permission. In some embodiments, the step of requesting permission is based on a maintenance subsystem of the PCS recommending servicing of a component of the PCS accessible via the first compartment. In some embodiments, the step of requesting the permission to provide authorized access to the interior of the first compartment includes transmitting a code to at least one of an address and a phone number associated with a security provider.

In some embodiments, the method further includes providing an indication that authorized access to the interior of the first compartment is permitted. In some embodiments, providing the indication includes activating a light on the PCS, activating a light on the first compartment, and/or displaying a message.

Other aspects and advantages of the invention will become apparent from the following drawings, detailed description, and claims, all of which illustrate the principles of the invention, by way of example only.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIGS. 12A and 12B show front perspective views of a PCS with ribbed panels, in accordance with some embodiments;

DETAILED DESCRIPTION

Overview of Personal Communication Structure (PCS)

Figure 1:
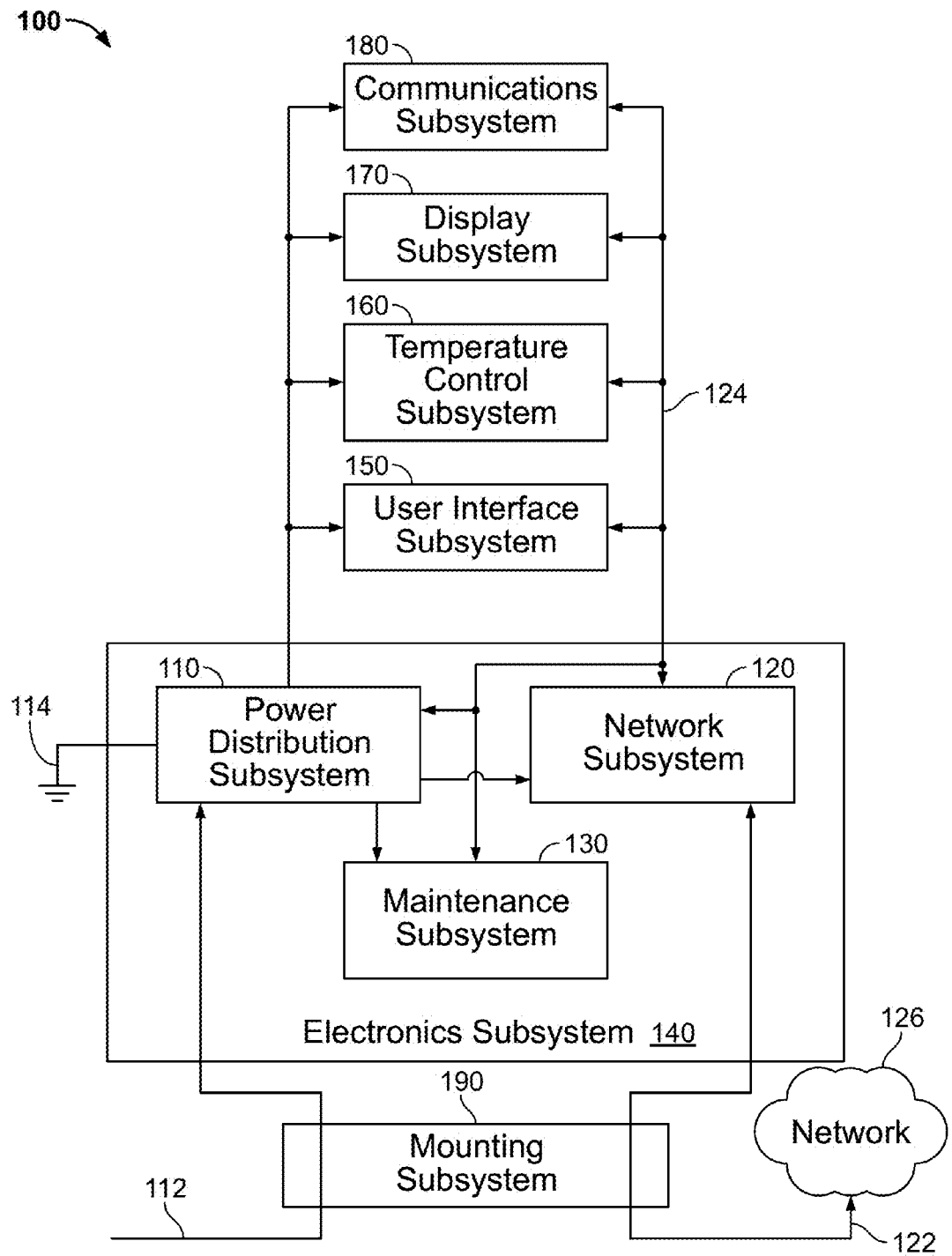
FIG. 1 is a block diagram of a personal communication structure (PCS), in accordance with some embodiments.

FIG. 1 illustrates a personal communication structure (PCS) 100, according to some embodiments. PCS 100 enhances access to communication networks in public or semi-public places. In some embodiments, PCS 100 includes an electronics subsystem 140, a user interface subsystem 150, a temperature control subsystem 160, a display subsystem 170, a communications subsystem 180, and/or a mounting subsystem 190. Electronics subsystem 140 may include a power distribution subsystem 110, a network subsystem 120, and/or a maintenance subsystem 130. These and other components of PCS 100 are described in further detail below.

Power distribution subsystem 110 distributes electrical power to components of PCS 100. Power distribution subsystem 100 may provide power to network subsystem 120, maintenance subsystem 130, other components of electronics subsystem 140, user interface subsystem 150, temperature control subsystem 160, display subsystem 170, and/or communications subsystem 180. Power distribution subsystem 110 may distribute power provided by any suitable power source(s) including, without limitation, batteries, solar panels, a power line 112 coupled to a power grid, etc. In some embodiments, power distribution subsystem 110 includes one or more power converters operable to convert power from one form (e.g., AC power) into another form (e.g., DC power) suitable for the PCS's components. In some embodiments, power distribution subsystem 110 includes one or more voltage level converters operable to change the voltage level of a signal to a level compatible with a component of the PCS. The ground terminal of the power distribution subsystem 110 may be coupled to a reference potential 114 via the chassis of the PCS or via any other suitable path.

Figure 2:
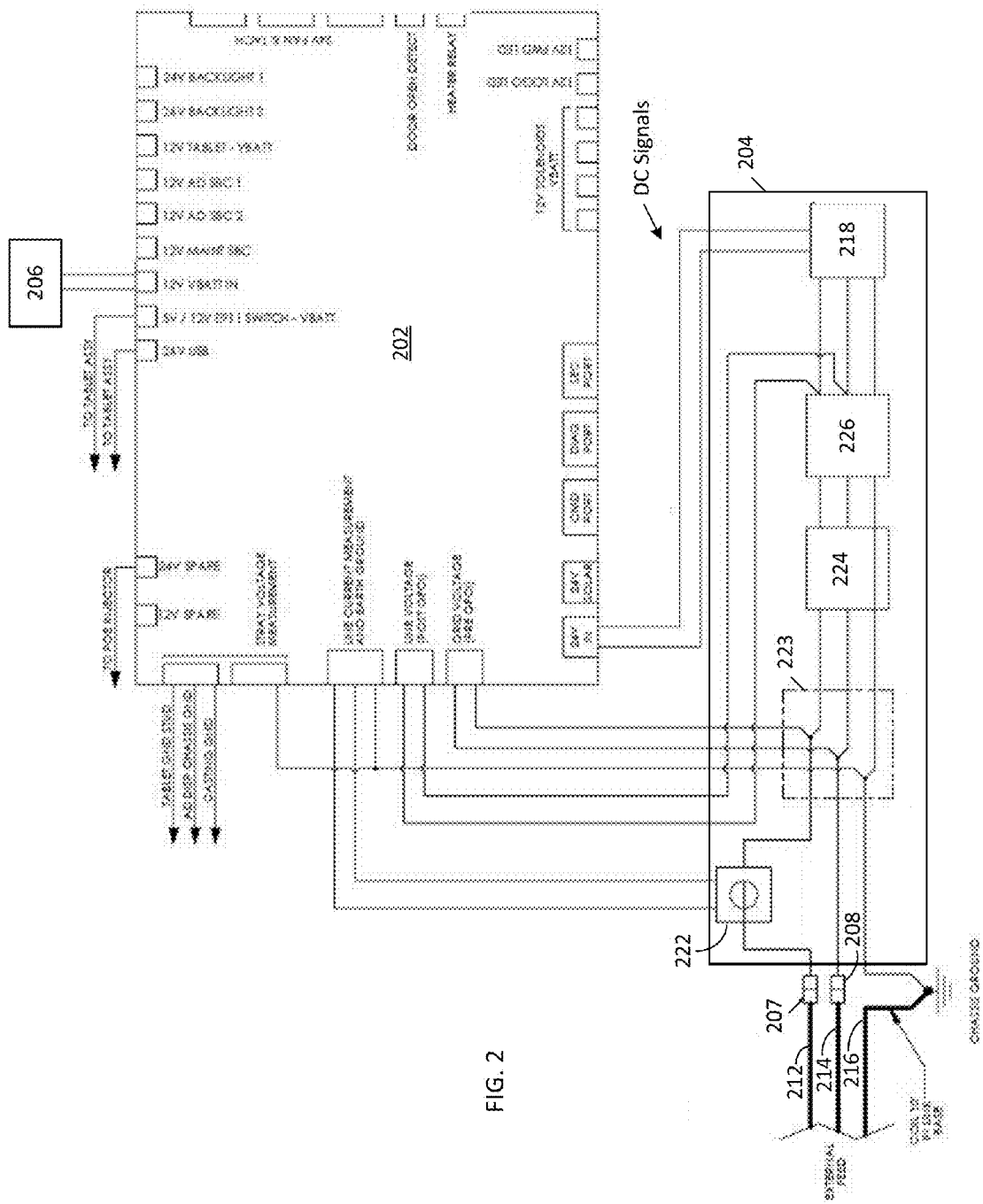
FIG. 2 is a schematic of a power distribution subsystem of a PCS, in accordance with some embodiments.

FIG. 2 shows a schematic of a power distribution subsystem 110, according to some embodiments. In some embodiments, power distribution subsystem (PDS) 110 includes a power conversion system 204, a power distribution board 202, and a battery 206. The inputs to power conversion system 204 include AC power supply signals (e.g., 120 VAC at 60 Hz) carried on a hot line 212, a neutral line 214, and a ground line 216. In some embodiments, the hot line 212 and neutral line 214 may be coupled to power conversion system 204 by quick disconnect devices 207 and 208, respectively, whereby the hot and neutral lines may be safely disconnected from power distribution subsystem 110 if the PCS is separated from its footing. Ground line 216 may be coupled to a ground terminal of the PCS 100. Power conversion system 204 processes the AC power supply signals and converts the processed signals into DC power supply signals. In some embodiments, power conversion system 204 includes a current transformer 222, AC power distribution unit 223, ground-fault circuit interrupter 224 (e.g., circuit breakers), AC line filter 226, and rectifier 218. Rectifier 218 may function as a DC power supply (e.g., a 24 V, 75 A, 2 kW DC power supply). As can be seen in FIG. 2, the outputs of various components of power conversion system 204 may be provided as inputs to power distribution board 202.

Power distribution board 202 may detect power system faults and distribute DC power signals to other components of the PCS. In some embodiments, power distribution board 202 uses the AC signals provided by power conversion system 204 to perform fault detection (e.g., ground fault detection, stray voltage detection, etc.). In some embodiments, power distribution board 202 uses the DC power supply signals provided by power conversion system 204 and/or battery 206 to produce DC power supply signals at various voltage levels (e.g., 5V, 12V, and 24V DC), and distributes those DC power supply signals to suitable components of the PCS 100.

In some embodiments, power distribution system DC power signals can be switched on and off. As those skilled in the art can appreciate, staggered activation of high-power devices (e.g., one or more components of display subsystem 170) reduces in-rush current demand on power supply 218. In some embodiments, the power distribution subsystem 110 is able to measure output current and can shut off power supply signals when the device reaches an over-current threshold. When a device causes over-current and "trips" the output, an error message may be sent to a maintenance center, indicating that the PCS requires servicing.

Battery 206 may provide backup power for components of PCS 100, including but not limited to user interface subsystem 150, which may implement emergency communication (e.g., E911) functionality. In some embodiments, power distribution board 202 may charge battery 206 (e.g., at 24 VDC) when power conversion system 204 is producing DC power and PCS 100 is not using all the available DC power. In some embodiments, a solar charging system may charge battery 206 during power outages or at other times.

In some embodiments, the power distribution subsystem 110 can detect whether the ground-fault circuit interrupter 224 has tripped. The ability to detect activation of the ground-fault circuit interrupter 224 can facilitate maintenance of the PCS. For example, while on back-up battery power, the PDS may determine whether AC power is lost (e.g., by sensing whether AC power supply signals are present) or the ground-fault circuit interrupter 224 has tripped. A suitable message can then be sent to the maintenance center, indicating, for example, whether the PCS requires service.

Returning to FIG. 1, network subsystem 120 controls communication on a network 124 within PCS 100, and communication between internal network 124 and a network 126 external to the PCS. In some embodiments, network subsystem 120 uses network 124 to communicate with power distribution system 110, maintenance subsystem 130, user interface subsystem 150, temperature control subsystem 160, display subsystem 170, and/or communications subsystem 180. The nodes of network 124 may be arranged in one or more suitable network topologies, including, without limitation, a bus (e.g., with network subsystem 120 as the bus controller), star network (e.g., with network subsystem 120 as the central hub), ring network, mesh network, tree network, point-to-point network, etc. Network 124 may be implemented using one or more suitable communication technologies, including, without limitation, Ethernet, DVI (Digital Visual Interface), HDMI (High-Definition Multimedia Interface), USB (Universal Serial Bus), SMB (System Management Bus), I2C (Inter-Integrated Circuit) bus, VGA (Video Graphics Array), SCSI (Small Computer System Interface), SPI (Serial Peripheral Interface) bus, LVDS (low-voltage differential signaling), etc.

Network subsystem 120 may send and receive any suitable data. For example, network subsystem 120 may control the operation of other components of PCS 100 by sending control data to the PCS's subsystems. Network subsystem 120 may forward commands received from a suitable source, including, without limitation, other PCS subsystems and/or network 126. As another example, network subsystem 120 may send operand data to components of PCS 100 for processing by those components (e.g., data to be displayed by display subsystem 170 or user interface subsystem 150, data to be transmitted by communications subsystem 180, etc.).

In some embodiments, network subsystem 120 communicates with network 126 via data link 122. Data link 122 may be implemented using a suitable communications line, including, without limitation, an Ethernet cable, coaxial cable, or optical fiber. In some embodiments, network subsystem 120 may include a signal conversion device adapted to convert the signals received on data link 122 from one form (e.g., optical signals) into another form (e.g., electrical signals).

Figure 3:
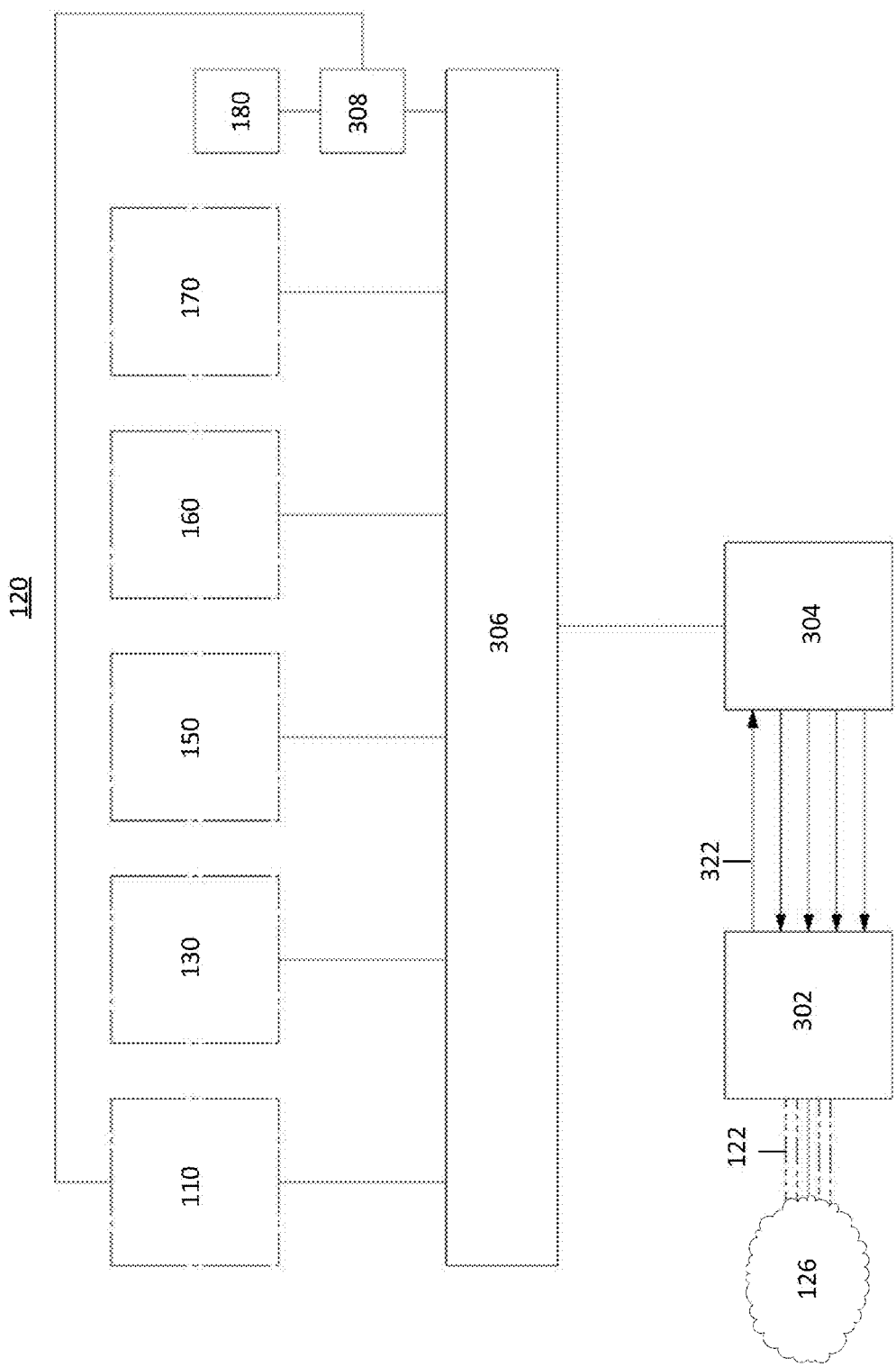
FIG. 3 is a schematic of a network subsystem of a PCS, in accordance with some embodiments.

FIG. 3 shows a schematic of a network subsystem 120, in accordance with some embodiments. In one embodiment, network subsystem 120 includes a fiber junction box 302, a service delivery switch 304, and a network switch 306. In the example of FIG. 3, data link 122 includes one or more optical fibers. Fiber junction box 302 may optically couple the optical fibers of data link 122 to one or more internal optical fibers 322. In some embodiments, fiber junction box 302 includes one or more quick disconnect devices, whereby the optical fibers of data link 122 may be protected from damage if PCS 100 is separated from its footing. Service delivery switch 304 may convert the optical signals received on optical fibers 322 into electrical signals representing network traffic (e.g., Ethernet packets), and provide that network traffic to network switch 306. Likewise, service delivery switch 304 may convert the network traffic (e.g., Ethernet packets) received from network switch 306 into optical signals, and provide those optical signals to fiber junction box 302. Network switch 306 may switch network traffic between PCS subsystems, or between a PCS subsystem and network 126. In some embodiments, network switch 306 is an Ethernet switch. Network switch 306 may be powered by power distribution subsystem 110.

In some embodiments, network subsystem 120 includes a power-over-Ethernet (POE) injector 308. The POE injector 308 may provide power to one or more PCS subsystems, including, without limitation, communications subsystem 180.

Returning to FIG. 1, maintenance subsystem 130 runs maintenance diagnostics on components of PCS 100. In some embodiments, maintenance subsystem 130 performs tests on the PCS's components and/or initiates self-tests of the PCS's components. Such tests may be performed periodically (e.g., daily, weekly, monthly, etc.), intermittently, randomly or at other suitable times. Alternatively or in addition, components of PCS 100 may perform such tests in response to commands received via network subsystem 120 (e.g., commands issued by a PCS operator via network 126 or via communications subsystem 180), or in response to other suitable events.

Based on the results of such tests, maintenance subsystem 130 may determine whether a tested component is operating properly. If a tested component is not operating properly, maintenance subsystem 130 may output data describing the component's malfunction (e.g., transmit an error code to a PCS operator via network 126 or communications subsystem 180, display an error message via display subsystem 170 or user interface subsystem 150, etc.), take action to resolve the malfunction (e.g., reboot the malfunctioning component), turn off power to the faulty component or to the entire PCS (e.g., if the malfunction presents a safety hazard), etc.

In some embodiments, maintenance subsystem 130 may be adapted to control or adjust the operation of power distribution subsystem 110, for safety purposes or other suitable purposes. As described above, if a safety hazard is detected, maintenance subsystem 130 may control power distribution subsystem 110 to deactivate the PCS 100 or the unsafe component(s). Alternatively, maintenance subsystem 130 may control power distribution subsystem 110 to "power cycle" or "reboot" a malfunctioning component.

Figure 4:
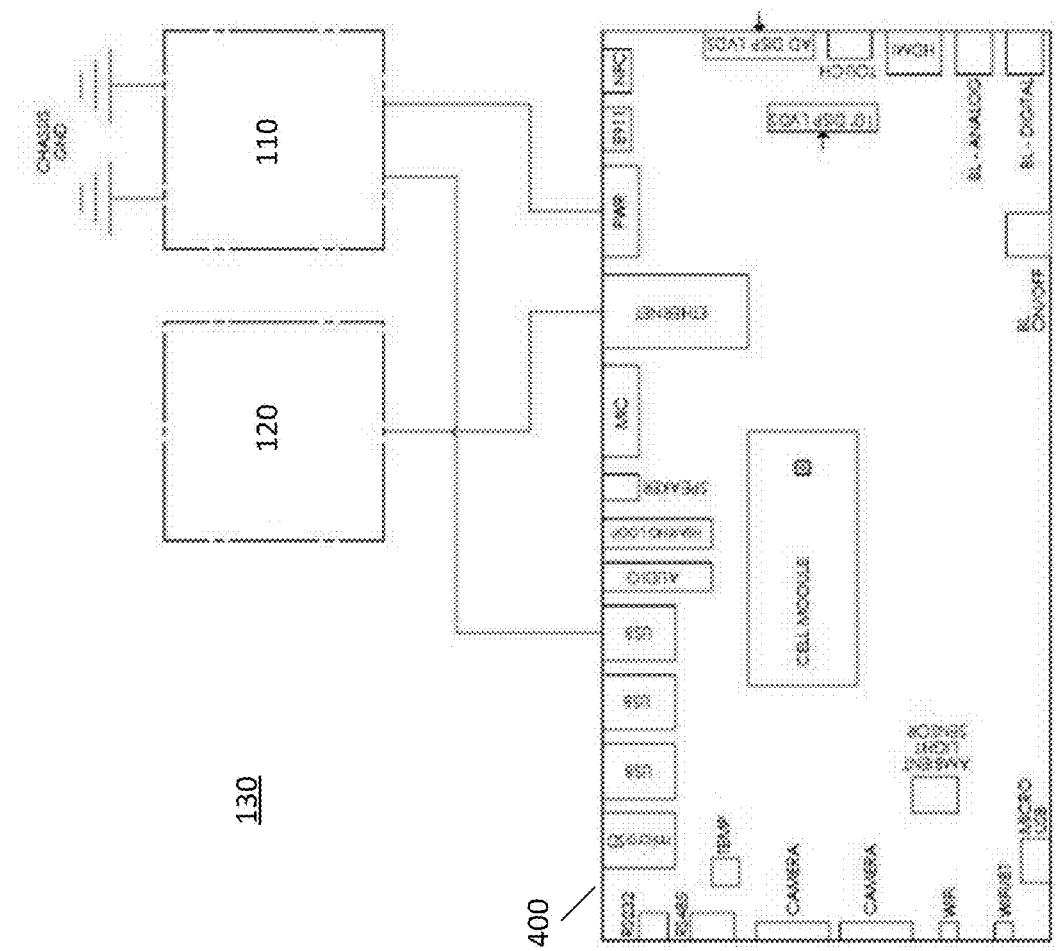
FIG. 4 is a schematic of a maintenance subsystem of a PCS, in accordance with some embodiments.

FIG. 4 shows a schematic of a maintenance subsystem 130, in accordance with some embodiments. In various embodiments, maintenance subsystem 130 includes one or more processing devices 400. The processing device(s) may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 400 may communicate with other components of PCS 100 via network subsystem 120 to perform maintenance tasks, or for other suitable purposes. In some embodiments, processing device(s) 400 are powered by power distribution subsystem 110.

Returning to FIG. 1, in addition to power distribution subsystem 110, network subsystem 120, and/or maintenance subsystem 130, electronics subsystem 140 may include other components. In some embodiments, electronics subsystem 140 includes one or more illumination controllers, which control illumination of one or more lights coupled to or proximate to the PCS. When lit, the lights controlled by the illumination controller may illuminate user interface subsystem 150 or other portions of PCS 100. In some embodiments, electronics subsystem 140 includes one or more sensor controllers, which control one or more sensor devices (e.g., microphones, cameras, ambient light sensors, pressure sensors, voltage sensors, environmental sensors, accelerometers, etc.). Such sensors may be used for any suitable purpose, including, without limitation, adjusting the brightness of displays and/or lights based on ambient lighting, surveilling the region proximate to the PCS (e.g., when an attempt to gain unauthorized access to the PCS is detected), etc.

Figure 5:
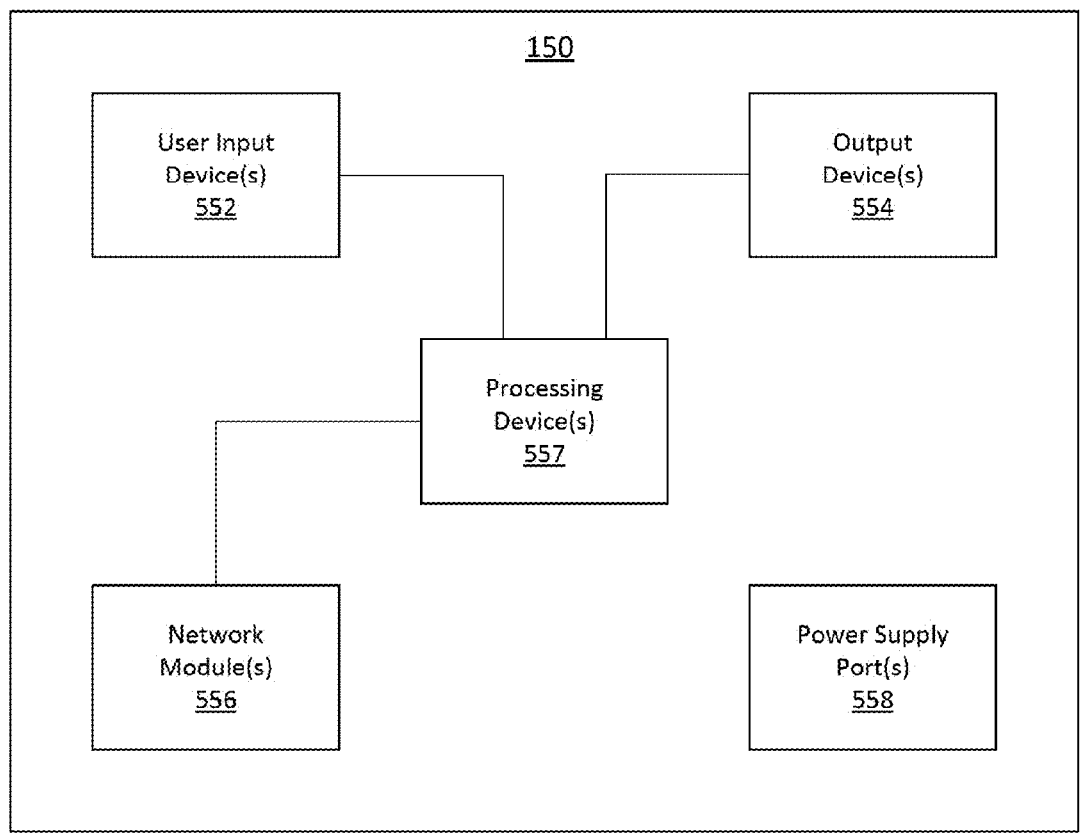
FIG. 5 is a block diagram of a user interface subsystem of a PCS, in accordance with some embodiments.

User interface subsystem 150 provides an interactive user interface, which may be used to access a communication network. Referring to FIG. 5, user interface subsystem 150 may include one or more user input devices 552, output devices 554, network modules 556 (e.g., network interface controllers, wireless transceivers, etc.), processing devices 557, and/or power supply ports 558. The user input device(s) 552 may include, without limitation, a touchscreen, touchpad, keyboard, keypad, trackball, one or more microphones, camera, buttons, switches, etc. The output device(s) 554 may include, without limitation, a display unit (e.g., touchscreen, LCD display, etc.), light(s), speaker(s), audio jack(s) (e.g., headset jacks, including microphone), etc. The one or more network modules 556 may include, without limitation, a 3G mobile network transceiver, 4G mobile network transceiver, LTE mobile network transceiver, Wi-Fi transceiver, RFID reader, Bluetooth transceiver, Near Field Communication (NFC) transceiver, Ethernet adapter, etc. In some embodiments, at least one of the network modules 556 may be configured to access network 126 via network subsystem 120 or to access a communication network via communications subsystem 180. The one or more processing devices may include, without limitation, a microprocessor, microcontroller, small board computer, or system on a chip (SoC) (e.g., Qualcomm Snapdragon, Nvidia Tegra, Intel Atom, Samsung Exynos, Apple A7, Motorola X8, etc.). The one or more power supply ports 558 may include, without limitation, one or more USB charging ports, a two-prong or three-prong AC power outlet (e.g., providing current limited AC power at 120 V, 60 Hz), etc.

User interface subsystem 150 may enhance users' access to communication networks in several ways. In some embodiments, user interface subsystem 150 may provide users access to communication networks (e.g., the Internet) via network module(s) 556. For example, a user may provide inputs via user input device(s) 552 to control a web browser or other network-based application executing on processing device(s) 557, which may access a communication network via network module(s) 556. The data obtained from the communication network may be processed by processing device(s) 557 and provided to the user via output device(s) 554. As another example, a user may connect a computing device (e.g., a mobile computing device) to user interface subsystem 150 via a network module 556 (e.g., a Wi-Fi access point), and access a communication network via another network module 556 (e.g., a mobile network transceiver), via communications subsystem 180, or via network 126. As yet another example, users may charge mobile computing devices via power supply port(s) 558, and access communication networks through the charged devices.

In some embodiments, PCS 100 includes an assisted listening unit that transmits the PCS's audio outputs to hearing assistance devices (e.g., hearing aids, Cochlear implants, etc.) within the assisted listening unit's range via a "hearing loop" (e.g., an "audio induction loop" or "audio-frequency induction loop"). The assisted listening unit may include a loop coil and a loop amplifier adapted to drive amplified signals into the loop coil, thereby creating a magnetic field that delivers the amplified signals to hearing assistance devices within the unit's range. The loop coil may be included in or located proximate to user interface subsystem 150, or disposed at another suitable location in, on, or near PCS 100.

In some embodiments, user interface subsystem 150 includes an interface for adjusting the assisted listening unit (e.g., for increasing or decreasing the signal strength or range of the assisted listening unit). The assisted listening unit's interface may include, without limitation, one or more buttons, dials, switches, and/or software-based interfaces. By adjusting the assisted listening unit, a user may control the range of the assisted listening unit and/or the volume of the audio output provided by the assisted listening unit.

In some embodiments, user interface subsystem 150 includes interface components for placing a phone call. User interface subsystem may implement the phone calls using voice-over-IP (VOIP) technology. The user's speech may be captured via the user interface subsystem's microphone, and the speech of other parties to the phone call may be provided via the user interface subsystem's speaker(s). In some embodiments, the user interface subsystem 150 permits users to place phone calls to emergency responders (e.g., E911 calls). The E911 calls may be placed using VOIP technology (e.g., via a network module 556 of user interface 150, via communications subsystem 180, or via network 126) or another suitable technology.

In some embodiments, the user input devices 552 include a microphone system, and the processing device 557 is able to perform noise cancellation on the microphone system. It can be appreciated that the PCS may be located in an environment with high levels of ambient street noise. The processing device 557 may perform a noise cancelling process that distinguishes the user's speech from the background noise and removes at least some of the background noise from the audio stream. When a user plugs in a headset that contains a microphone, the noise cancellation technique may also detect and remove background noise picked up by the headset's microphone.

Figure 6:
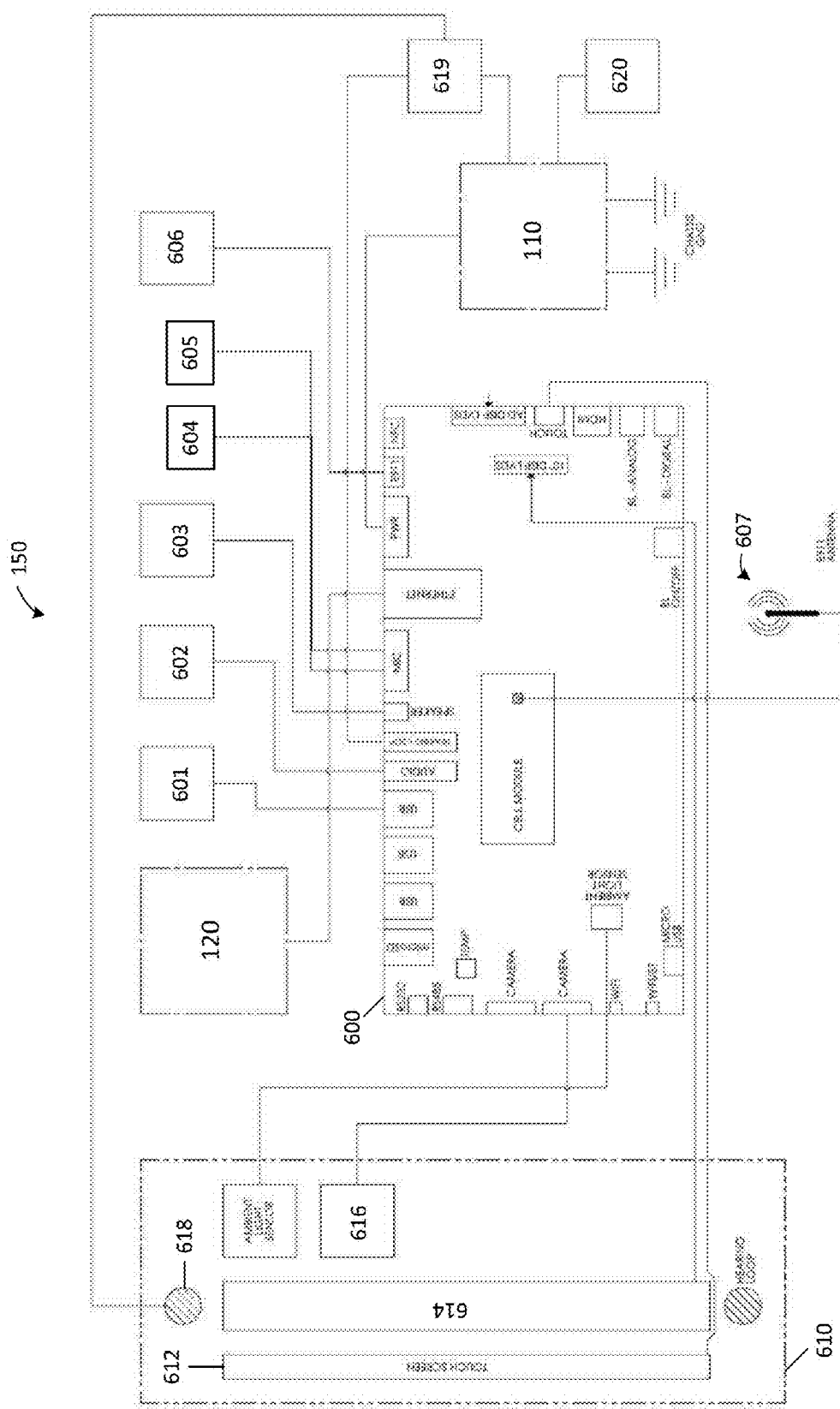
FIG. 6 is a schematic of a user interface subsystem of a PCS, in accordance with some embodiments.

FIG. 6 shows an exemplary schematic of the user interface subsystem 150, in accordance with some embodiments. In some embodiments, user interface subsystem 150 includes one or more processing devices 600. The processing device(s) 600 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 600 may communicate with other components of PCS 100 via network subsystem 120. In some embodiments, processing device(s) 600 are powered by power distribution subsystem 110.

In the example of FIG. 6, user interface subsystem 150 includes a keypad 601, headset jack 602, speaker 603, two microphones (604, 605), and an E911 button 606, all of which are coupled to the processing device(s) 600. Processing device(s) 600 may be adapted to initiate an E911 communication when E911 button 606 is pressed, and to send and receive E911 messages via a wireless communication module 607 (e.g., a 3G, 4G, or LTE mobile network transceiver, including a suitable antenna, which may be located proximate to the top of the PCS).

In some embodiments, the E911 button contains an indicator. One example of the indicator is an illumination ring. The illumination ring may help a user to locate the button at night, and/or may flash when a user presses the button to indicate a E911 call is in progress.

In the example of FIG. 6, user interface subsystem 150 includes a touchscreen 612, display 614, camera 616, hearing loop coil 618, hearing loop amplifier 619, and USB charging port(s) 620. In some embodiments, the touchscreen 612, display 614, camera 616, and hearing loop coil 618 may be packaged together in a tablet computing device 610. The USB charging port(s) 620 and hearing loop amplifier 619 may be powered by power distribution subsystem 110.

Returning to FIG. 1, temperature control subsystem 160 controls the temperature within PCS 100. For example, temperature control subsystem 160 may cool the components of PCS 100. Some of the PCS's components generate heat and the PCS 100 may absorb heat from its environment (e.g., via radiation or convection), particularly when the ambient temperature is high or the PCS is exposed to direct sunlight. Extreme heat can interfere with the operation of the PCS or even permanently damage some of the PCS's components.

Alternatively or in addition, temperature control system 160 may, under appropriate conditions, heat the components of PCS 100. Some PCSs may be located in cold environments (e.g., outdoors in regions with cold ambient temperatures). Like extreme heat, extreme cold can interfere with the PCS's operation or damage its components.

Temperature control subsystem 160 may include one or more components suitable for heating and/or cooling the PCS. In some embodiments, temperature control subsystem 160 includes one or more fans operable to circulate ambient air through the PCS, which can cool the PCS. In some embodiments, the PCS 100 includes one or more heat sinks, and the ambient air circulated by temperature control subsystem 160 passes proximate to the heat sink(s). In some embodiments, temperature control subsystem 160 includes one or more fans operable to recirculate air in portions (e.g., airtight compartments) of PCS 100, which can facilitate the transfer of heat from those portions of the PCS to other regions of the PCS and/or to the ambient environment. The fans may be single-speed fans or variable-speed fans. In some embodiments, temperature control subsystem 160 includes one or more heaters, which can heat the PCS. In some embodiments, one or more fans and/or heaters are located apart from temperature control subsystem 160, but controlled by the temperature control subsystem.

Temperature control subsystem 160 may control the PCS's temperature by controlling the operation of the fan(s) and/or heater(s). In some embodiments, temperature control subsystem 160 controls the PCS's temperature based, at least in part, on the temperature inside or in an area proximate to the PCS. Temperature control subsystem 160 may obtain temperature information regarding the temperature in or near PCS 100 from one or more temperature sensors. The temperature sensors may be located inside the PCS, on an outer surface of the PCS, proximate to the PCS, and/or in any other suitable location. Temperature control subsystem 160 may include one or more sensor drivers that can activate the sensor(s) and obtain temperature measurements from the sensor(s). Alternatively or in addition, temperature control subsystem may obtain temperature information regarding the temperature in the vicinity of the PCS from a suitable source (e.g., a website) via a communication network (e.g., network 126).

In some embodiments, the temperature control system 160 adds or removes active fans (e.g. switches fans on or off) in specific areas of the PCS based on the temperature sensor information. For example, active fans may be added when the ambient temperature is high (e.g., above a threshold). Conversely, active fans may be removed when the ambient temperature is low (e.g., below a threshold) to reduce power usage. The fans may be organized in addressable groups to facilitate addition and removal of active fans.

In some embodiments, the temperature control subsystem 160 uses a feedback-based control system (e.g., a feedback loop) to control the speeds of the fans. The fans may include tachometers, and the tachometer outputs may be fed back to the temperature control subsystem, which may use the tachometer outputs to determine the speeds of the fans. In addition to adding and removing active fans, the temperature control subsystem 160 may increase the speeds of the fans as the internal temperature increases or decrease the speeds of the fans as the temperature decreases.

In some embodiments, the temperature control subsystem 160 uses the fan tachometer output to determine whether a fan fault has occurred. For example, the temperature control subsystem 160 may detect a fan fault when the tachometer output indicates that there is little or no fan rotation (e.g., the rate of fan rotation is below a threshold). When a fan fault is detected, the PCS may notify the maintenance center of the fault, so the PCS can be serviced to replace or repair the faulty fan.

In some embodiments, temperature control subsystem 160 controls the PCS's temperature based on environmental information, which may include temperature information and/or other information associated with the PCS's environment. For example, environmental information may include sunlight information indicating whether the PCS is exposed to direct sunlight. Sunlight information may be obtained from a camera or other suitable optical sensor. Alternatively or in addition, environmental information may include humidity information indicating the humidity levels in the PCS's environment, time-of-day information indicating the current time at the PCS's location, weather information indicating the weather in the PCS's environment, etc.

Based on the environmental information, temperature control subsystem 160 may control the fan(s) and/or heater(s) to adjust the PCS's temperature. In some embodiments, temperature control subsystem 160 may activate one or more heaters when the PCS's temperature is below a lower threshold temperature, and/or activate one or more fans when the PCS's temperature is above an upper threshold temperature. In some embodiments, the number of heater units and/or fans activated by temperature control subsystem 160 is determined based on the environmental information. In some embodiments, the settings of the activated heaters and/or fans (e.g., the fan speeds, the heater temperatures, etc.) may be determined based on the environmental information. In some embodiments, if the temperature in the PCS is determined to be outside a safe operating range, temperature control subsystem may instruct power distribution subsystem 110 to deactivate the PCS or at least one component thereof.

Display subsystem 170 includes one or more display modules, each of which includes at least one display device. The display device may include, without limitation, a liquid crystal display (LCD), light-emitting diode (LED) display, organic light-emitting diode (OLED) display, cathode ray tube (CRT), electroluminescent display (ELD), electronic paper/electronic ink display (e.g., a bi-stable or multi-stable electrophoretic or electro-wetting display), plasma display, thin-film transistor (TFT) display, 3D display (e.g., volumetric display, holographic display, integral imaging display, compressive light field display, etc.), stereoscopic display, etc. In some embodiments, display subsystem 170 includes two display modules disposed on opposite sides of the PCS, such that the modules' display devices face in opposite directions.

A display device may display suitable information, including, without limitation, news information, weather information, emergency information (e.g., instructions for dealing with an emergency, evacuation routes, etc.), travel information (e.g., traffic conditions, road conditions, speed limits, alternative route information, public transit schedules, locations of and/or directions to public transportation facilities, etc.), tourism information (e.g., locations of and/or directions to popular tourist attractions), advertisements, etc. The displayed information may be displayed in one or more suitable formats, including, without limitation, text, still images, and/or video. Display subsystem 170 may include one or more processing devices adapted to control the display of information by the display device(s). For example, each display module may include a processing device adapted to control the display module's display device.

In some embodiments, display subsystem 170 includes one or more cameras. For example, each display module may include one or more cameras. Display subsystem 170 may use the cameras to determine the ambient light levels, and may adjust the brightness of the display device(s) accordingly. For example, if the ambient light level at the PCS is high (e.g., because the sun is shining on the PCS), display subsystem 170 may increase the brightness of the display(s) (e.g., by increasing the brightness of the display backlight(s)), so that the displayed information is readily viewable by onlookers or passers-by. On the other hand, if the ambient light level at the PCS is low, display subsystem 170 may decrease the brightness of the display(s), to reduce the display subsystem's power usage and/or heat generation. In some embodiments, the brightness levels of the PCS's displays may be controlled independently.

Alternatively or in addition, display subsystem 170 may use the cameras to obtain information about "potential viewers" (e.g., people viewing the PCS, viewing a display device of the PCS, using the PCS, and/or in the vicinity of the PCS). In some embodiments, display subsystem 170 may determine, based on images of the area proximate to the PCS (e.g., images acquired by the PCS's camera(s)), a potential viewer's apparent demographic information, including, without limitation, age, sex, race/ethnicity, etc. In some embodiments, display subsystem 170 may use facial-recognition techniques to determine a potential viewer's identity.

Display subsystem 170 may use information about the PCS's potential viewers to select the information to be displayed by the display device(s) (e.g., to select advertisements for display based on the identities or demographics of the potential viewers). Alternatively or in addition, display subsystem 170 may track the identities and/or demographics of the potential viewers who have been in the vicinity of the PCS when particular advertisements have been displayed. Tracking information about potential viewers of advertisements and/or controlling the display of advertisements based on information about the potential viewers may increase the value of the PCS's advertising impressions to potential advertisers.

Display subsystem 170 may obtain information about a potential viewer from the potential viewer, from analysis of images of the potential viewer, and/or from the potential viewer's computing device (e.g., smartphone). For example, a potential viewer who connects to a communication network through a PCS 100 (e.g., via user interface subsystem 150 or via the user's computing device) may provide authentication data (e.g., a username, password, and/or other credentials), and the PCS may use that authentication data to access the potential viewer's account information, which may identify the potential viewer and/or provide information about the potential viewer (e.g., the potential viewer's attributes and/or interests). The potential viewer may have provided such information when registering for access to the PCS (or set of PCSs), or the PCS may have inferred such information based on the potential viewer's activities on the communication network.

Even if potential viewers do not register for PCS access, information about a potential viewer's attributes and/or interests can still be inferred based on the potential viewer's activities, and this information can be tracked in connection with information identifying the potential viewer's computing device (e.g., a mobile device's phone number, mobile equipment identifier (MEID), or unique device identifier (UDID); a computing device's media access control (MAC) address; etc.). In some embodiments, a PCS 100 may identify a potential viewer or attributes thereof based on identifying information transmitted by the potential viewer's computing device when the computing device is within range of the PCS, even if the computing device is not connected to a network via the PCS 100.

Figure 7:
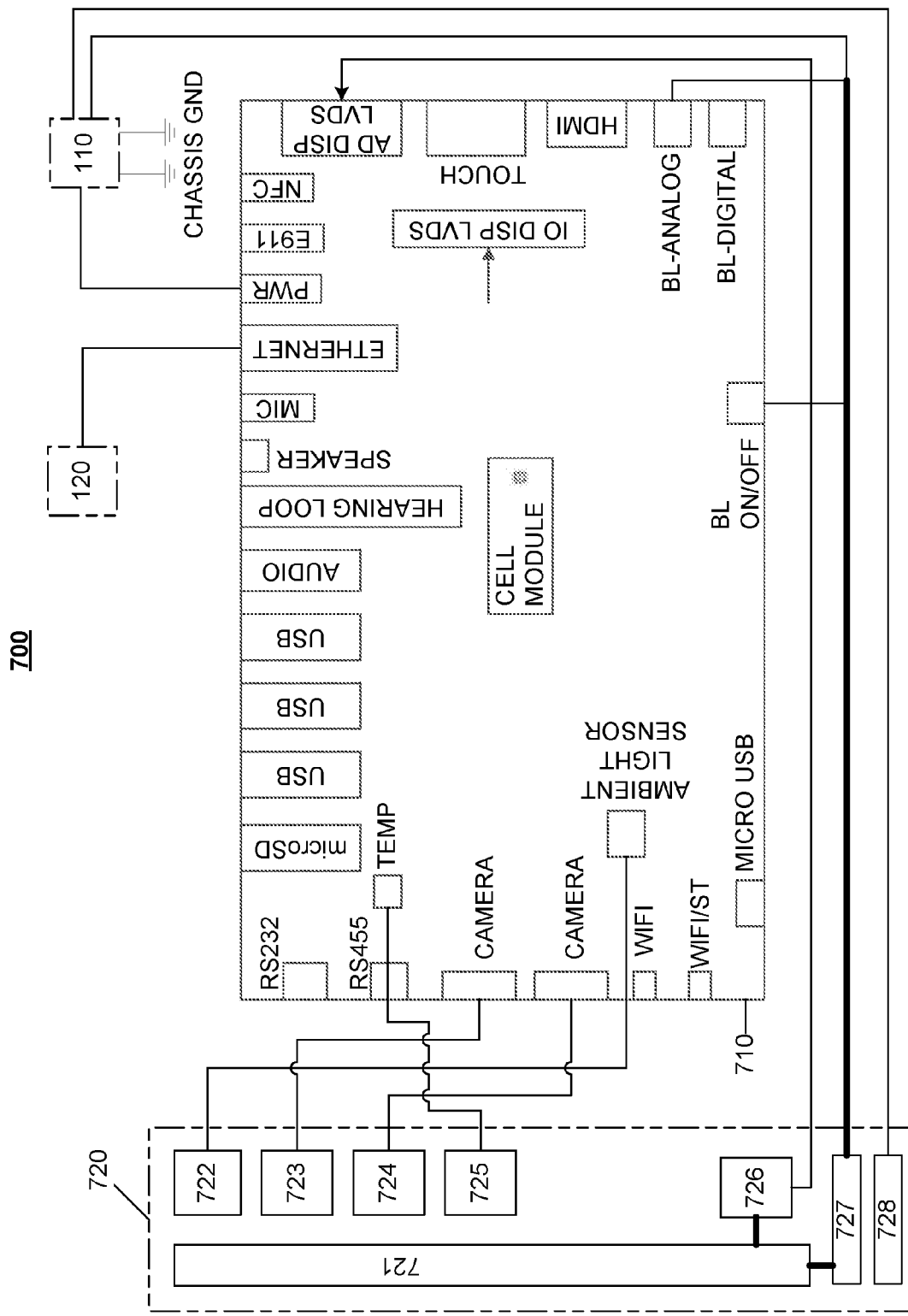
FIG. 7 is a schematic of a display module of a PCS, in accordance with some embodiments.

FIG. 7 is a schematic of a display module 700, in accordance with some embodiments. In some embodiments, a PCS 100 includes two display modules 700. In some embodiments, a display module 700 includes one or more processing device(s) 710. Each processing device 710 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 710 may communicate with other components of PCS 100 via network subsystem 120. In some embodiments, each processing device 710 is powered by power distribution subsystem 110. In the example of FIG. 7, display module 700 also includes a display device 720. Display device 720 may include a display panel 721, ambient light sensor 722, two cameras (723, 724), temperature sensor 725, frame rate controller 726, power/backlight controller 727, and one or more fans 728.

In some embodiments, the processing device 710 is able to read the ambient light sensor 722 and send a control signal to the power/backlight controller 727. One example of the control signal is a pulse width modulated (PWM) output. In response to the ambient light sensor 722 detecting the presence of high ambient light, the duty cycle of the PWM signal may be increased, thereby causing the power/backlight controller to increase the backlight brightness, so that the display image is viewable in bright sunlight. Those skilled in the art can appreciate that the PWM control signal may be digital or converted to an analog output via a digital to analog converter.

Returning to FIG. 1, communications subsystem 180 includes one or more communication modules. In some embodiments, the communication module(s) include one or more radio access nodes. The radio access node(s) may include small cells (e.g., low-power radio access nodes with ranges between roughly 10 m and 1-2 km, including, but not limited to, femtocells, picocells, and microcells), macrocells (e.g., radio access nodes with ranges of up to a few tens of kilometers), etc. The radio access node(s) may reduce congestion in mobile data networks (e.g., 3G, 4G, or LTE networks) by expanding network capacity and offloading traffic from more congested portions of the network to the portions of the network associated with the radio access node(s). In areas where mobile data networks are highly congested (e.g., portions of New York City, and particularly portions of Manhattan), deploying PCSs with radio access node(s) in an area where mobile data networks are congested may, in some embodiments, greatly reduce network congestion and improve quality of service for many network users.

In some embodiments, communications subsystem 180 includes at least one wireless access point. Computing devices may connect to the wireless access point using a suitable wireless adapter, including, without limitation, a Wi-Fi or WiMAX adapter. Through the wireless access point, communications subsystem 180 may provide access to a local area network (LAN) or wide area network (WAN) (e.g., network 126, or a 3G, 4G, or LTE network accessed via the communications subsystem's radio access node(s)). PCS operators may use the wireless access points to provide wireless broadband network access to individuals, subscribers, communities, etc. Use of the wireless access points may further improve the quality of service on mobile data networks by offloading some users from the mobile data networks to the wireless access point.

Returning to FIG. 1, mounting subsystem 190 includes a mounting device that releasably secures the PCS to a support (e.g., a footing). The mounting device may be adapted to break when a shear force above a predetermined value is applied to the mounting device, thereby allowing the PCS to move. Such releasable mounting can reduce the damage caused to people and property when an automobile collides with the PCS.

Figure 8:
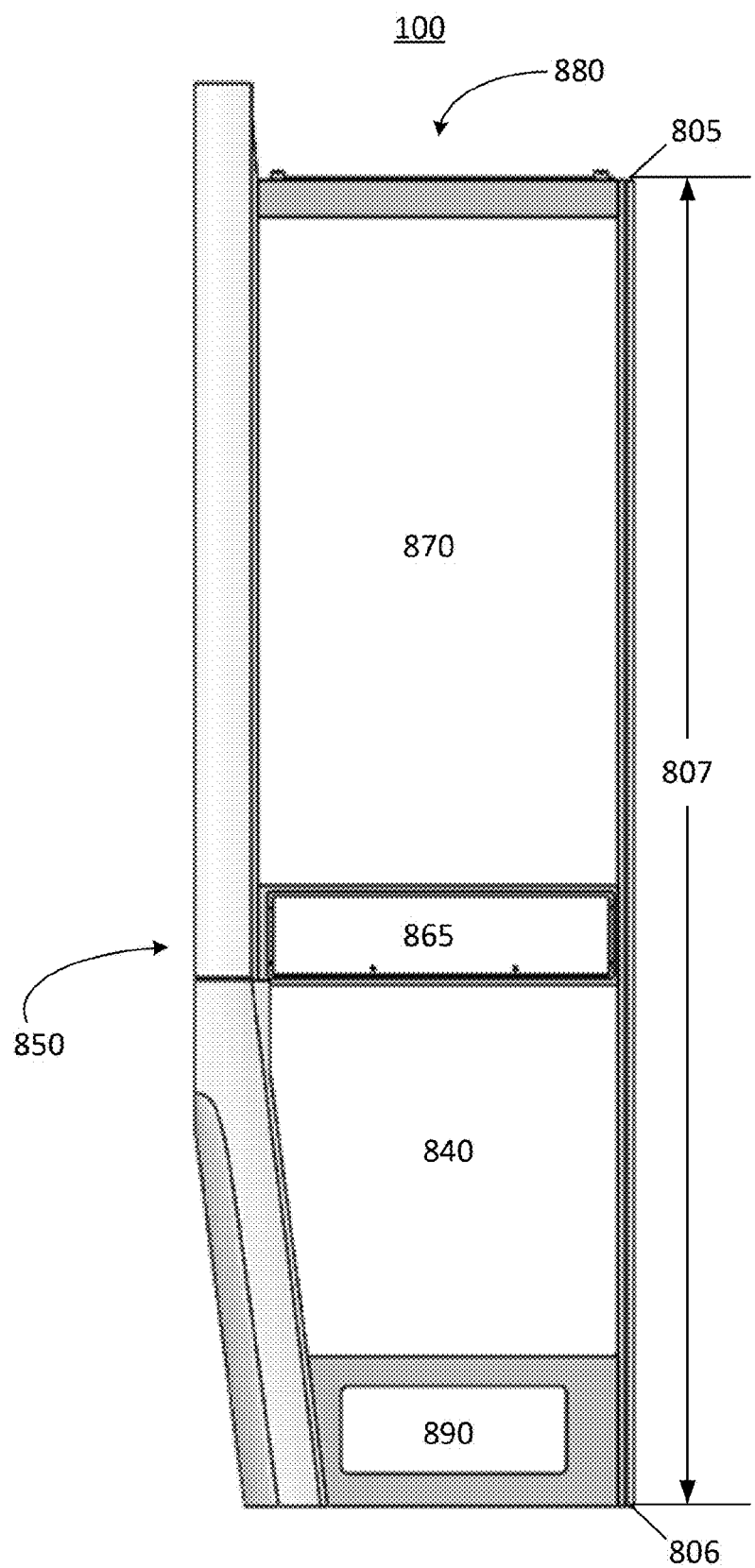
FIG. 8 illustrates an arrangement of compartments of a PCS, in accordance with some embodiments.

PCS 100 may include compartments and components of PCS 100 may be disposed in the compartments. FIG. 8 illustrates an arrangement of compartments of a PCS 100, according to some embodiments. For convenience, the PCS's top portion 805 and base portion 806 are identified in FIG. 8, as is the PCS's height 807.

In the example of FIG. 8, PCS 100 includes mounting compartment 890, electronics compartment 840, user interface compartment 850, air intake compartment 865, display compartment 870, and communications compartment 880. Electronics compartment 840 may enclose electronics subsystem 140. User interface compartment 850, display compartment 870, and communications compartment 880 may enclose user interface subsystem 150, display subsystem 170, and communications subsystem 180, respectively. In some embodiments, display compartment 870 may enclose, in addition to display subsystem 870, one or more heat sinks Mounting compartment 890 may enclose at least a portion of a mounting subsystem 190.

Air intake compartment 865 may enclose at least portions of temperature control subsystem 160. In some embodiments, air intake compartment 865 may enclose one or more fans, which may draw ambient air into the air intake area. In some embodiments, the one or more fans may also draw air into the air intake area from electronics compartment 840. The fans may move the air through display compartment 870 (e.g., across one or more heat sinks), and the air may be discharged through an exhaust in communications compartment 880. In some embodiments, air intake compartment 865 may enclose one or more heaters.

In the example of FIG. 8, communications compartment 880 is located proximate to the top 805 of the PCS, display compartment 870 is disposed along an upper portion of the PCS and below communications compartment 880, and an air intake compartment 865 is located proximate to a middle portion of the PCS (in the direction of the PCS's height) and below display compartment 870. Mounting compartment 890 is located proximate a base 806 of the PCS, electronics compartment 840 is disposed along a lower portion of the PCS between mounting compartment 890 and air intake compartment 865, and user interface compartment 850 is disposed along a lower portion of the PCS adjacent to air intake compartment 865 and electronics compartment 840.

Embodiments of a PCS are not limited by the compartmentalization scheme illustrated in FIG. 8. A PCS may include none of the compartments illustrated in FIG. 8, any combination of the compartments illustrated in FIG. 8, and/or other compartments not illustrated in FIG. 8. In cases where a PCS includes a compartment illustrated in FIG. 8 (e.g., mounting compartment 890, electronics compartment 840, user interface compartment 850, air intake compartment 865, display compartment 870, or communications compartment 880), the location and/or shape of that compartment may differ from the location and/or shape of the corresponding compartment in FIG. 8. In some embodiments, a PCS may include a compartment that encloses two or more PCS subsystems that are enclosed by different compartments in the example of FIG. 8. In some embodiments, a PCS may include separate compartments enclosing respective portions of a PCS subsystem that is enclosed by a single compartment in the example of FIG. 8. In some embodiments, a PCS may include a compartment that encloses other compartments.

Figure 9A:
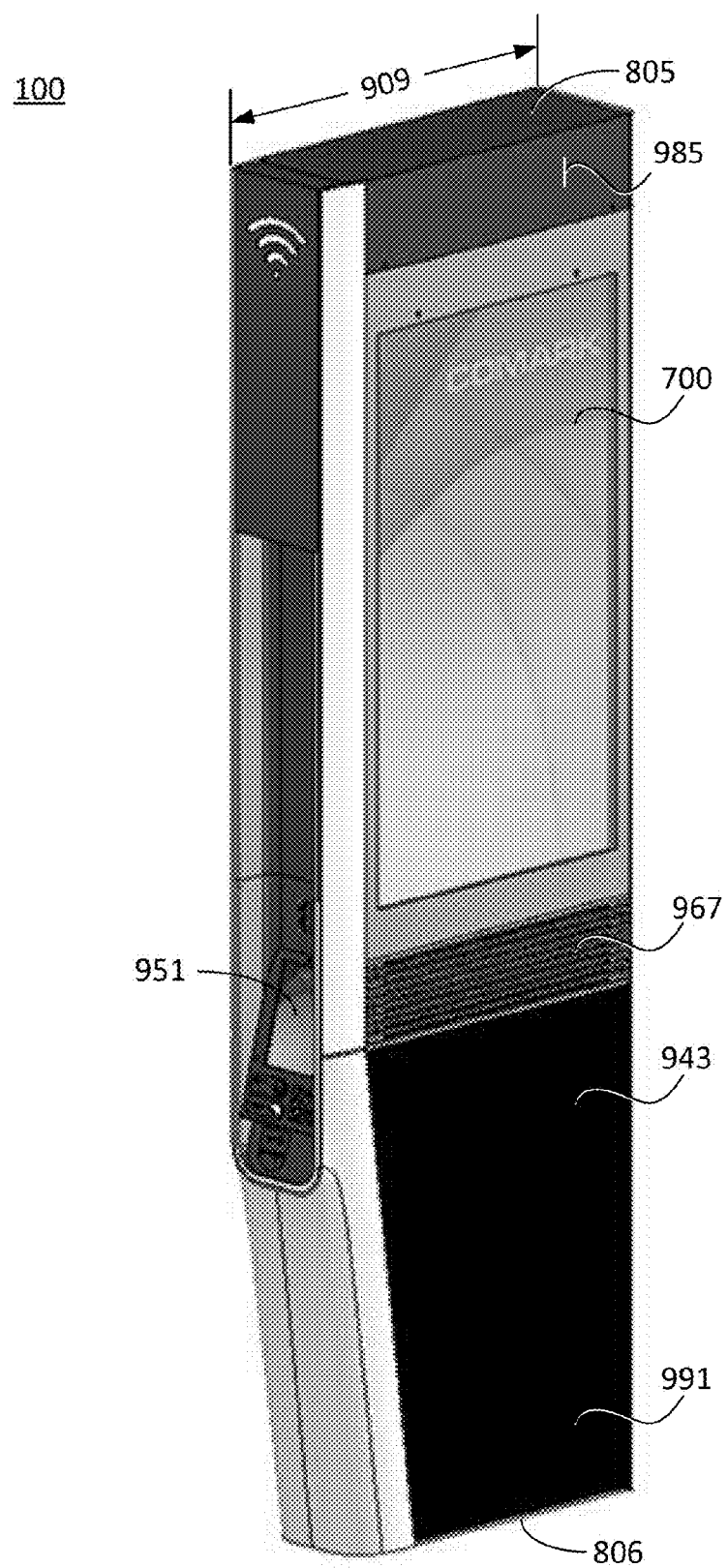
FIGS. 9A, 9B, and 9C show respective front perspective, side, and exploded front perspective views of a PCS, in accordance with some embodiments.
Figure 9B:
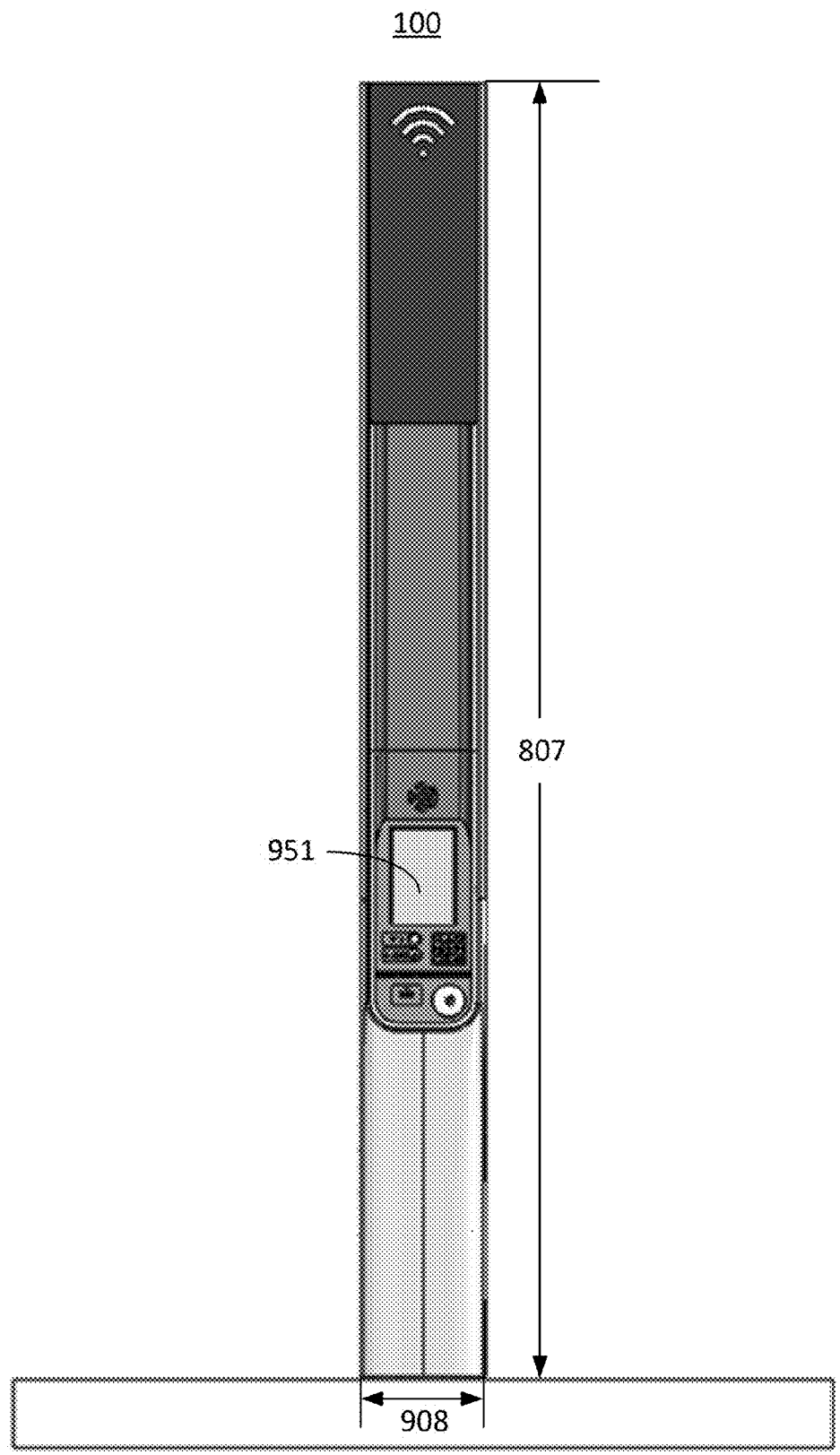
Figure 9C:
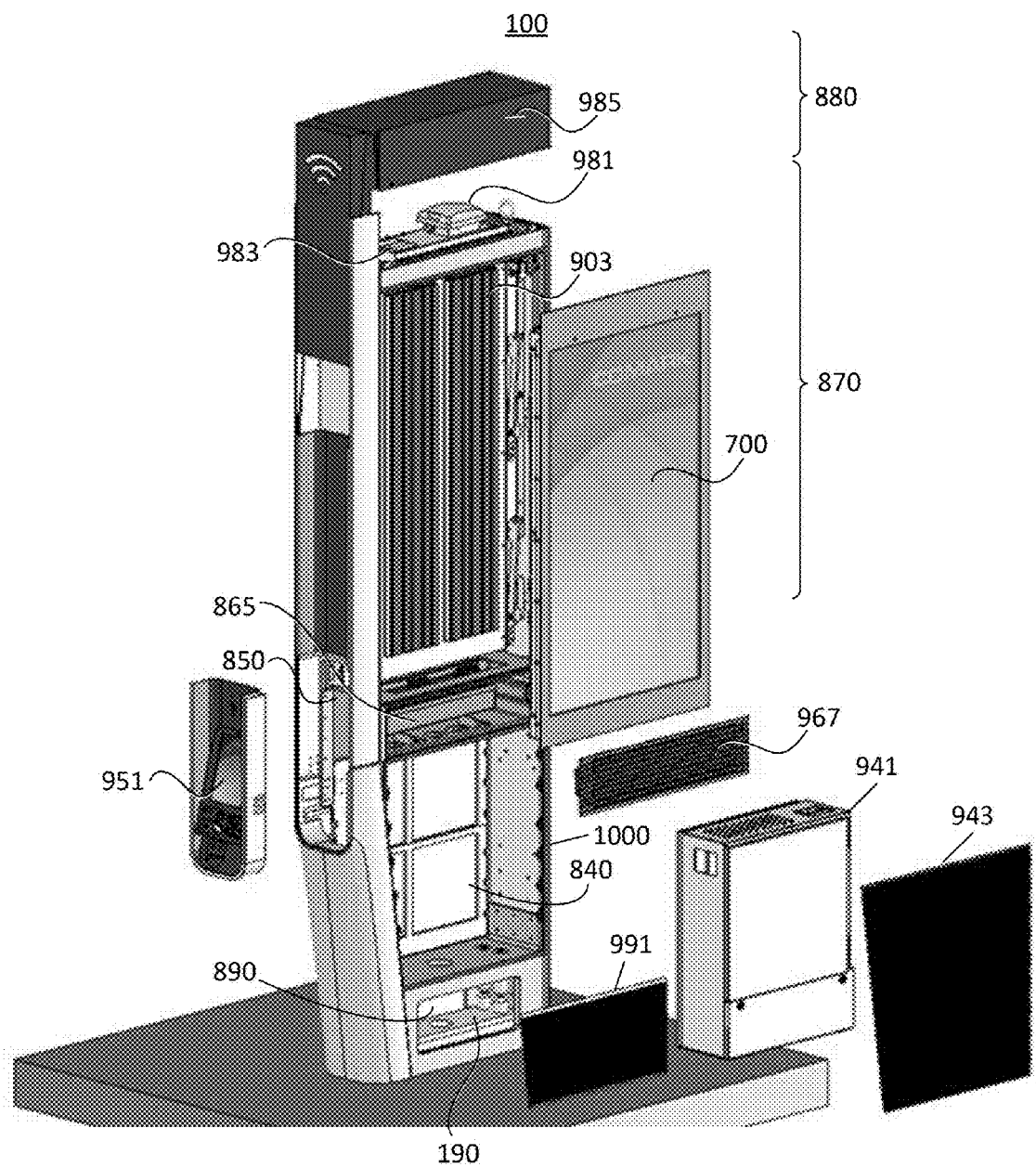

FIGS. 9A, 9B, and 9C show respective front perspective, side, and exploded front perspective views of a PCS 100, in accordance with some embodiments. For convenience, the PCS's top portion 805 and base portion 806 are identified in FIGS. 9A-9B, as are the PCS's height 807, width 908, and length 909.

As can be seen in FIG. 9C, PCS 100 may include a frame 1000. The frame 1000 is (or is part of) a structural system that supports the components of PCS 100. In some embodiments, the frame 1000 forms portions of the PCS's compartments (e.g., communications compartment 880, display compartment 870, air intake compartment 865, user interface compartment 850, electronics compartment 840, and mounting compartment 890).

As can further be seen in FIG. 9C, communications compartment 880 may include a radio access node 981, a wireless access point 983, and/or one or more antennas. The bottom of communications compartment 880 may be formed by a portion of frame 1000, and the top and sides of communications compartment 880 may be formed by a removable cap 985.

Display compartment 870 may include a heat sink 903 and a display module 700. In some embodiments, display compartment 870 includes a second display module (and, optionally, a second heat sink) arranged back-to-back (e.g., in parallel) with display module 700 and heat sink 903, such that display module 700 and the second display module face in opposite directions.

Air intake compartment 865 may include an air intake assembly 967. The air intake assembly 967 may include a grill, a filter, and a fan assembly. User interface compartment

850 may include a user interface device 951. The user interface device 951 may include a table computer, keypad, an emergency call button, microphone(s), speakers, and a mobile device charging port. Electronics compartment 840 may include an electronics cabinet 941, and may be formed by portions of frame 1000 and a cover panel 943. Mounting compartment 890 may at least partially enclose mounting subsystem 190, and may be formed by portions of frame 1000 and a cover panel 991.

Figure 10A:
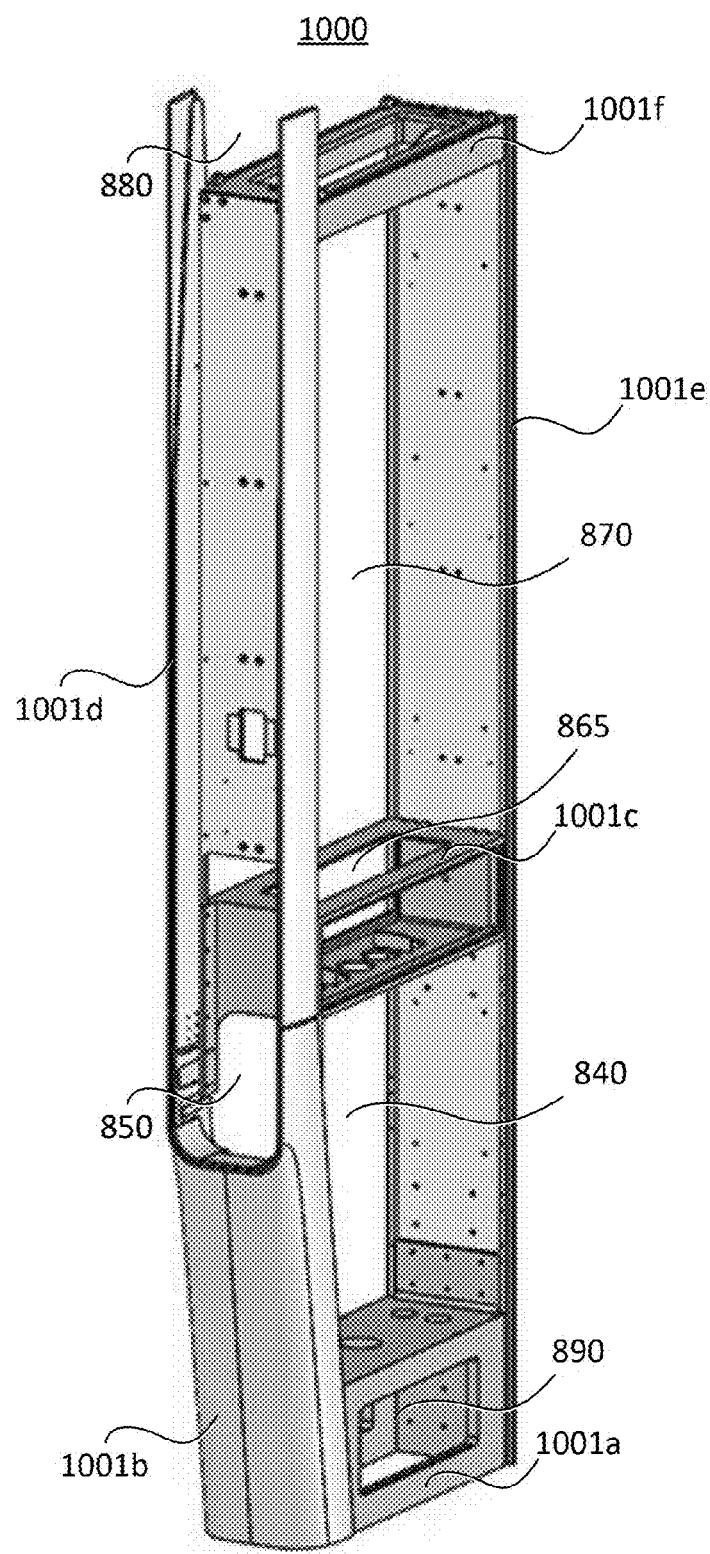
FIGS. 10A, 10B, and 10C show respective side perspective, front perspective, and exploded front perspective views of a frame of a PCS, in accordance with some embodiments.
Figure 10B:
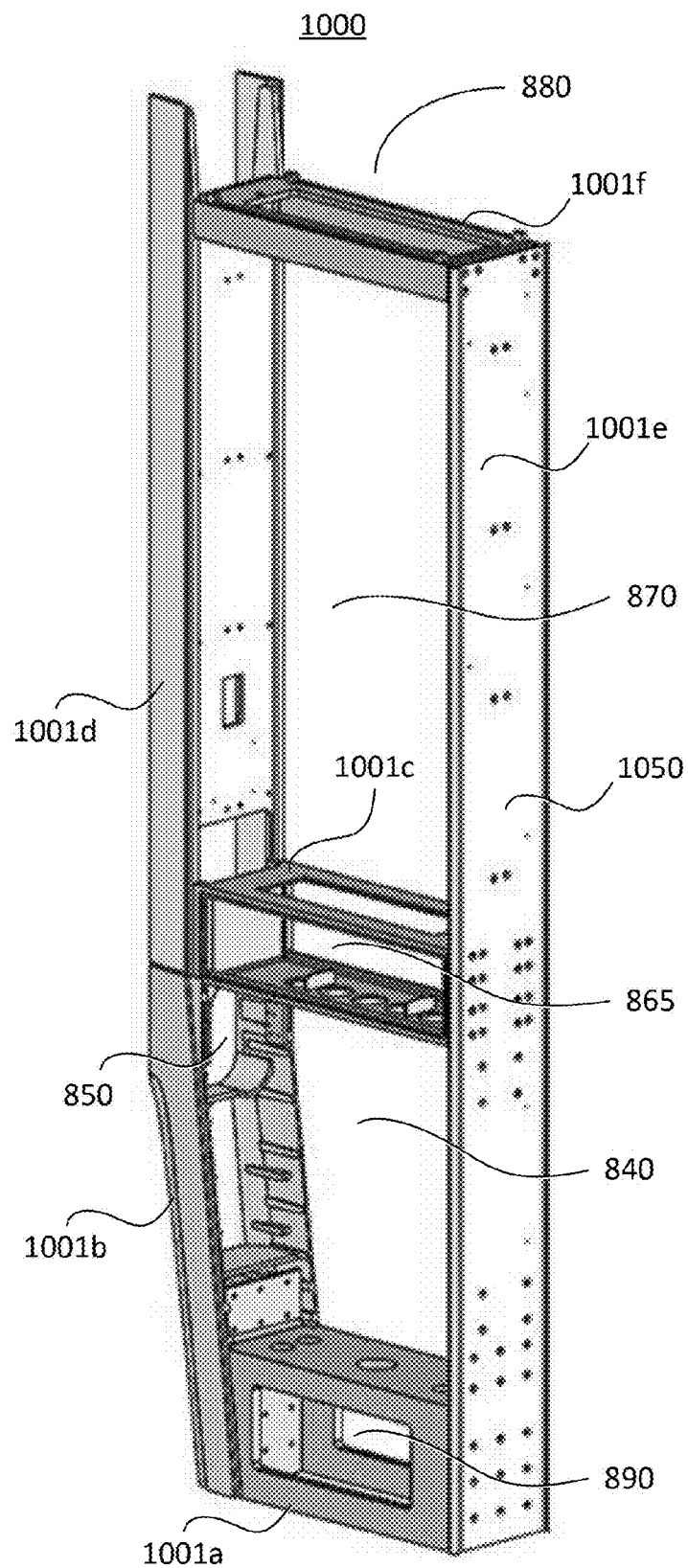
Figure 10C:
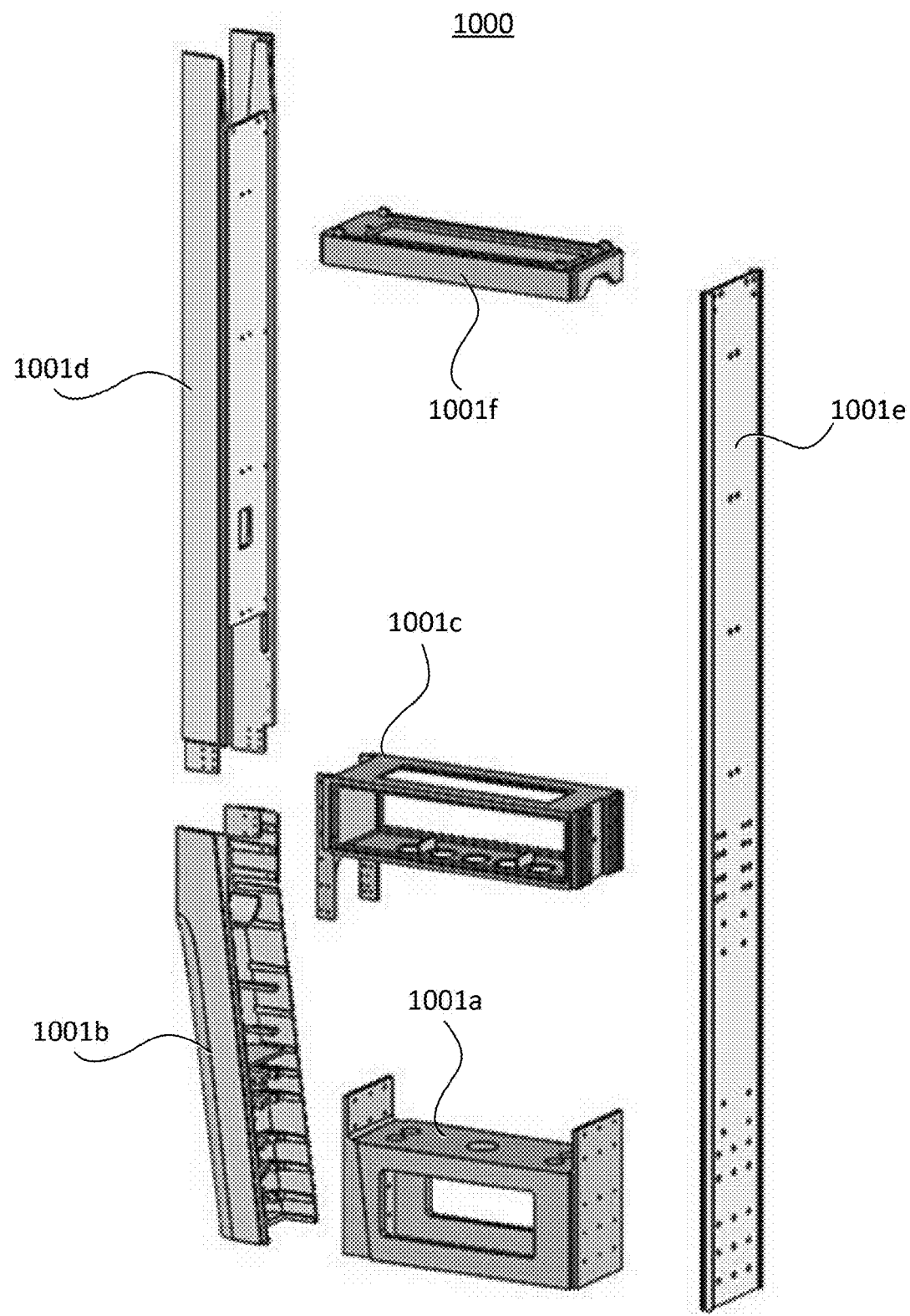

FIGS. 10A-10C show the frame 1000 of a PCS 100, according to some embodiments, and illustrate how the frame 1000 partially forms the PCS's compartments. In some embodiments, the frame 1000 is the frame of a monocoque structure, wherein the frame supports the components, forms the compartments and is also the outer face (or "skin") of portions of the PCS (e.g., the user interface compartment 850 and the opposing side 1050 of the PCS). This approach may simplify construction by reducing the number of brackets, mounting accessories, part count, etc.

In another embodiment, the frame 1000 is that of a traditional structure, and the outer skins are attached to the frame. In such embodiments, the frame supports the components of the PCS, forms the compartments of the PCS, and acts as a rigid structural chassis. One advantage of this approach is field replaceability. If an outer skin is damaged (e.g., by vandalism or by ordinary wear and tear), the damaged skin can be replaced with a new skin. As long as the frame remains uncompromised, damaged outer skins can be removed, replaced, and (optionally) sent to a service facility for refurbishing. Refurbishing methods may include removing dents and/or scratches, sanding, texturing, reshaping, and/or re-painting. Skins that are not suitable for refurbishing (e.g., due to extensive damage) may be recycled and turned into new parts.

As can be seen in FIGS. 10A-10C, frame 1000 may include a bottom member 1001a, a lower front member 1001b, a cross-frame member 1001c, an upper front member 1001d, a rear member 1001e, and a top member 1001f. In the example of FIGS. 10A-10C, lower portions of lower front member 1001b and rear member 1001e are joined to opposite sides of bottom member 1001a. One side of cross-frame member 1001c is joined to an upper portion of lower front member 1001b and a lower portion of upper front member 1001d. The opposite side of cross-frame member 1001c is joined to rear member 1001e proximate to a midpoint between the rear member's top and base ends. The upper portions of upper front member 1001d and rear member 1001e are joined to opposite sides of top member 1001f.

In the example of FIGS. 10A-10C, top member 1001f and the upper portion of upper front member 1001d form a bottom and a side of communications compartment 880. Two sides of display compartment 870 are formed by upper front member 1001d and rear member 1001e, and the top and bottom of display compartment 870 are formed by top member 1001f and cross-frame member 1001c, respectively. Cross-frame member 1001c forms the top, bottom, and two sides of air intake compartment 865. User interface compartment 850 is formed in part by the bottom portion of upper front member 1001d, the top portion of lower front member 1001b, and a side of cross-frame member 1001c. Two sides of electronics compartment 840 are formed by lower front member 1001b and the lower portion of rear member 1001e, and the top and bottom of electronics compartment 840 are formed by cross-frame member 1001c and bottom member 1001a, respectively. Bottom member 1001a forms mounting compartment 890.

Figure 11:
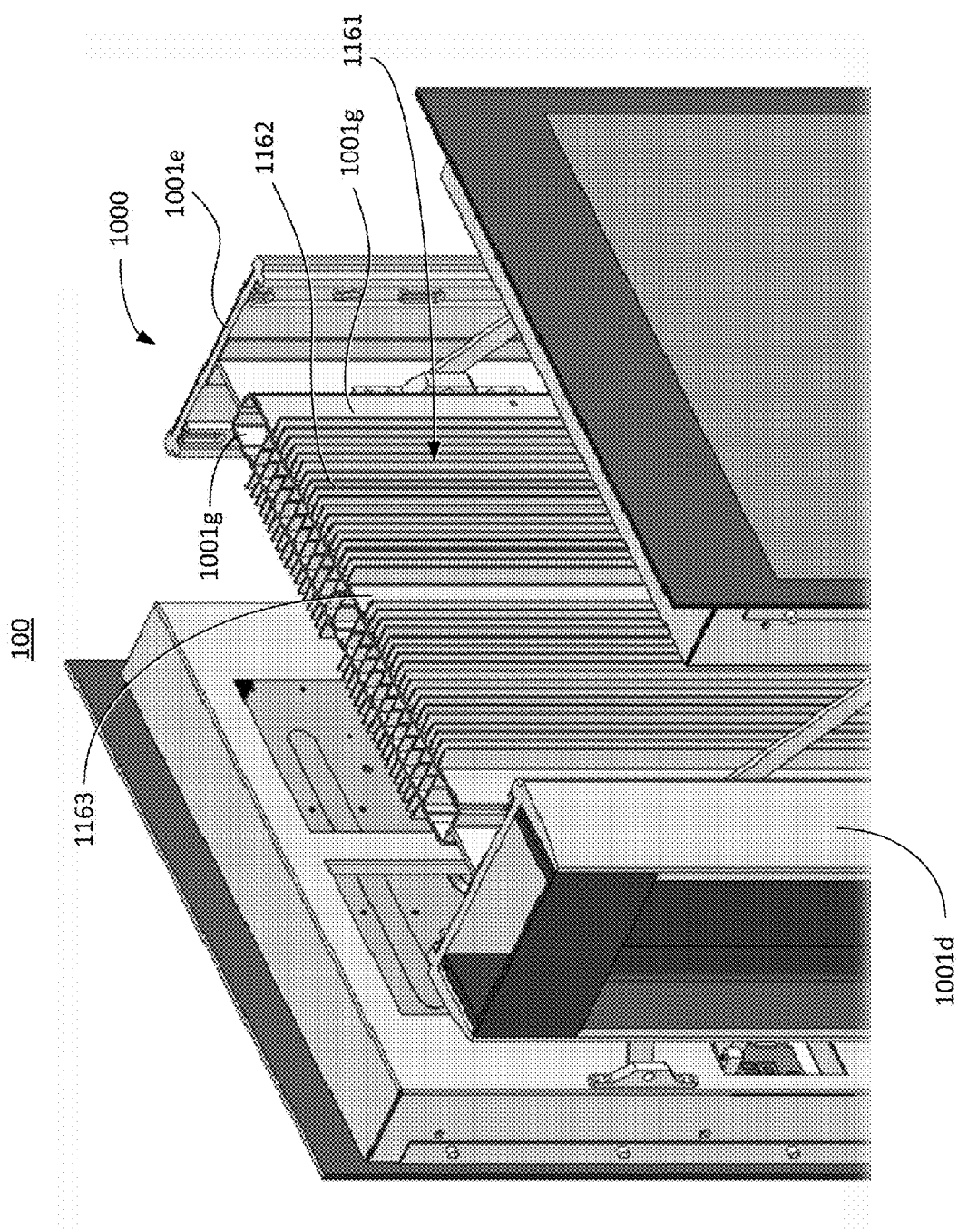
FIG. 11 shows a perspective view of a portion of a PCS, in accordance with some embodiments.

Embodiments of frame 1000 are not limited by the configuration shown in FIGS. 10A-10C. As can be seen in FIG. 11, which shows a front-perspective view of a portion of PCS 100, some embodiments of frame 1000 further include one or more cross-frame members 1001g coupled to upper front member 1001d and an upper portion of rear member 1001e to form an I-beam. In some embodiments, cross-frame member(s) 1001g may include one or more ribbed heat sinks 1161. A ribbed heat sink 1161 may include a substantially planar member 1163 and fins 1162 extending from the substantially planar member 1163 (e.g., in one or more directions substantially perpendicular to the surface of the substantially planar member).

Frame 1000 may facilitate cooling of the PCS's compartments. In some embodiments, one or more (e.g., all) members of frame 1000 may have relatively high thermal conductivity (e.g., average thermal conductivity of at least 90, 100, 110, or 120 Btu/(hr*° F.*ft)). When the temperature within a PCS compartment is greater than the ambient temperature in the area proximate to the PCS, the frame member(s) with relatively high thermal conductivity may function as heat sinks (including, but not limited to, cross-frame member(s) 1001g), such that heat from the compartments is transferred to the PCS's ambient environment through the frame member(s). The member(s) of frame 1000 with relatively high thermal conductivity may substantially consist of materials with relatively high thermal conductivity, including, without limitation, aluminum, thermal pyrolytic graphite, silicon carbide, etc. For example, one or more member(s) of frame 1000 may substantially consist of aluminum.

Members of frame 1000 may be manufactured using suitable techniques. In some embodiments, bottom member 1001a, lower front member 1001b, cross-frame member 1001c, cross-frame member(s) 1001g, and/or top member 1001f may be metal castings. In some embodiments, upper front member 1001d and/or rear member 1001e may be extruded metal, polymer, composite, etc.

Figure 12A:
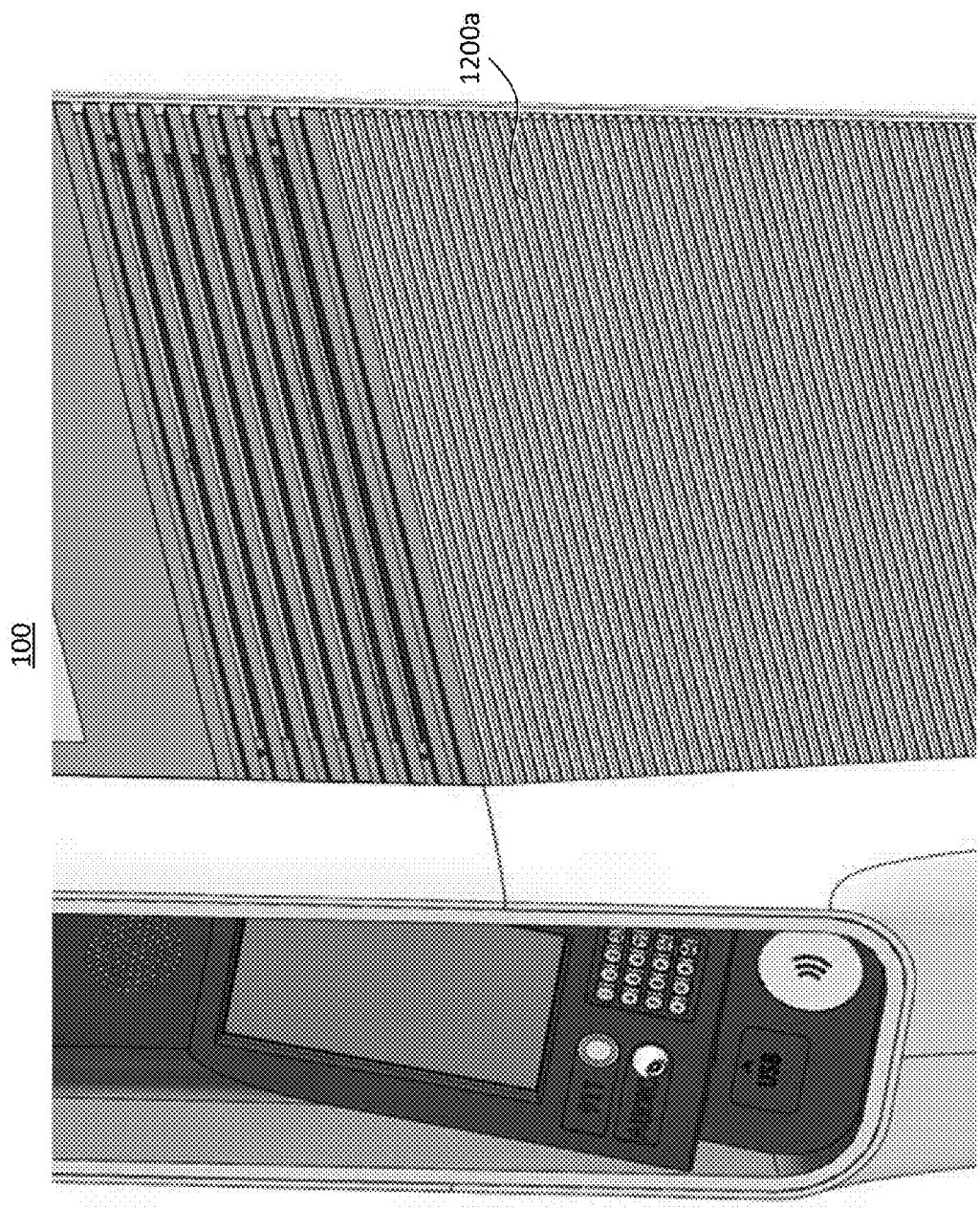
Figure 12C:
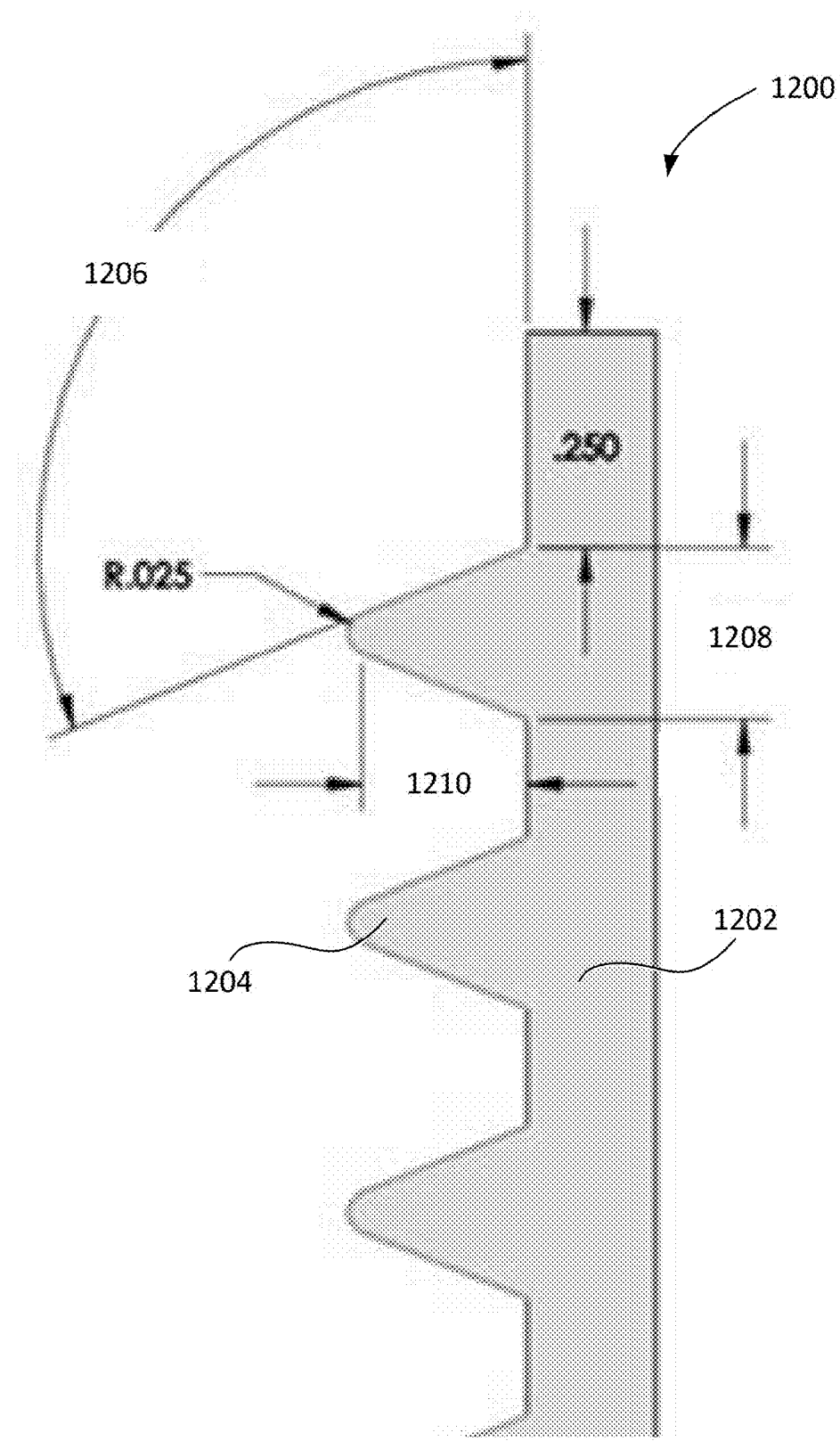
FIG. 12C shows a schematic side view of a ribbed panel, in accordance with some embodiments.

Referring to FIGS. 12A-12C, portions of a PCS's frame 1000 and/or compartments may be covered by ribbed panels 1200. The ribbed panels 1200 may discourage vandalism of PCS 100, since the panel ribs might offer a less appealing target for drawing, painting, or etching than other, smoother surfaces. In addition, the ribbed panels may be swappable, as shown in FIG. 12B, such that a damaged or vandalized panel could be quickly replaced with a pristine panel.

Referring to FIG. 12C, a ribbed panel 1200 may include a substantially planar member 1202 and a set of ribs 1204 extending from the planar member. In some embodiments, the angle 1206 between the outer surface of a rib and the outer surface of the planar member is between approximately 95° and 115°. In some embodiments, the thickness 1208 of a rib 1204 at the rib's base may be between approximately 0.25" and 0.5" and the width 1210 of a rib 1204 may be between approximately 0.3" and 0.6". Other dimensions may be used.

Controlling Access to Components of a PCS

In some embodiments, one or more of the compartments of a personal communication structure (PCS) 100 may be secured. Securing a PCS's compartments may protect the PCS's components from vandalism, theft, and damage (e.g., from unwanted handling or exposure to the ambient environment), protect people from safety hazards (e.g., electrical hazards), and/or prevent unauthorized parties from accessing the PCS's components.

Nevertheless, from time to time it may be necessary or desirable for authorized parties to access the components enclosed in a PCS's compartments. For example, it may be desirable for an authorized party to access a PCS subsystem to perform maintenance, to perform tests, to repair or replace a component, to adjust a component's settings, etc. In some cases, it may be desirable for one party to have access to one set of PCS components and for another party to have access to another set of PCS components, without either party having access to both sets of components. More generally, it may be desirable for different parties to have access only to specified subsets of the PCS's components. For example, it may be desirable for an electricians' union to have access to the PCS's power distribution subsystem 110, so that the union's electricians can maintain or repair the power distribution subsystem, but there may be no reason for the electricians to have access to any other PCS components. Likewise, it may be desirable for a telecommunications company's personnel to have access to the PCS's communications subsystem 180, but there may be no reason for the company's personnel to have access to any other PCS components.

Figure 13:
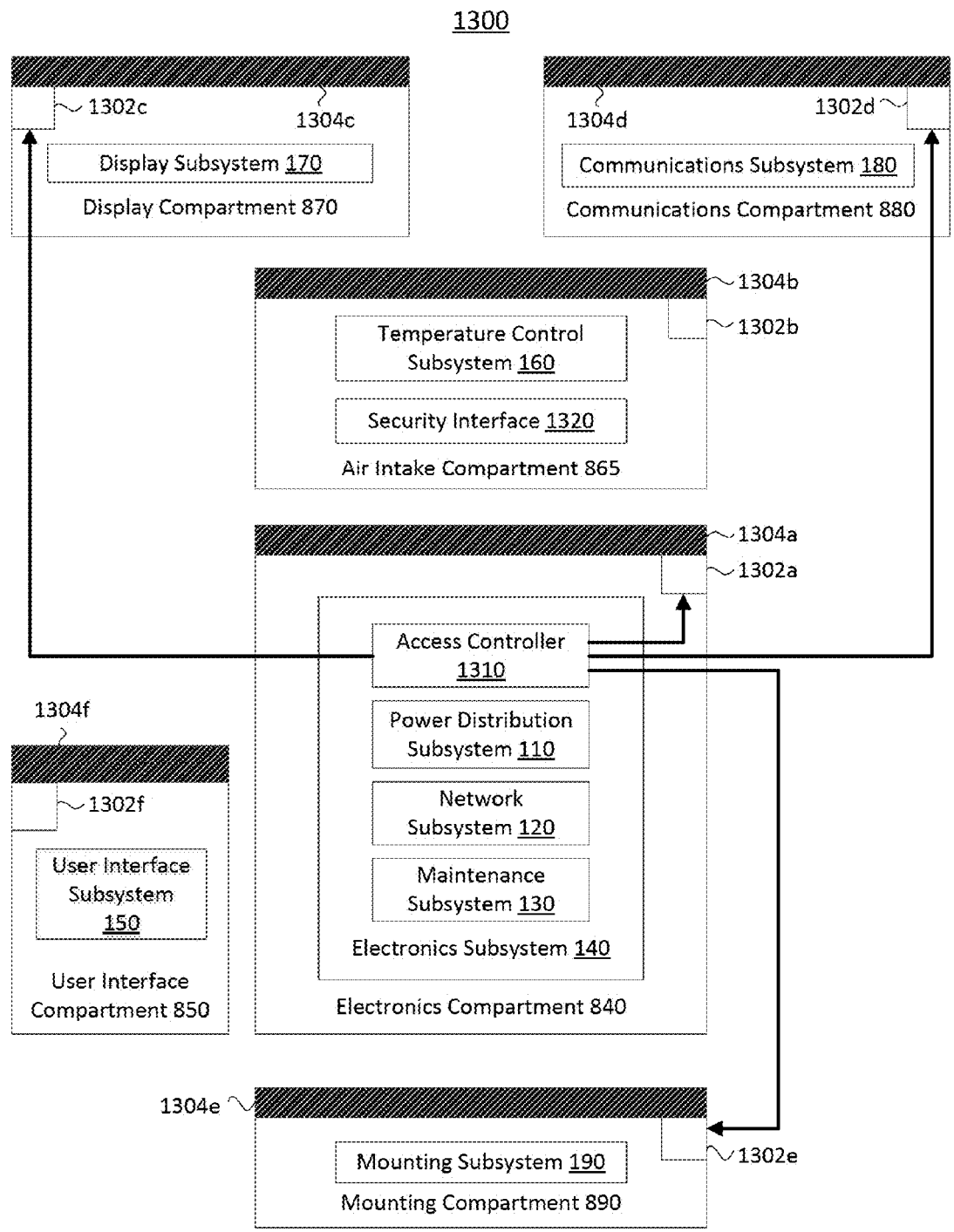
FIG. 13 illustrates a system for controlling access to components of a PCS, in accordance with some embodiments.

FIG. 13 illustrates a system 1300 for controlling access to components of a PCS, according to some embodiments. Access-control system 1300 may independently secure at least a subset of the compartments of a PCS 100 (e.g., access-control system 1300 may apply different security measures to different compartments in the subset, which may include requiring users to provide different authentication tokens and/or information to access different compartments in the subset). The independently secured compartments may be independently accessible (e.g., the interior of any compartment in the subset may be accessed without accessing the interiors of other compartments in the subset). Providing independently secured and independently accessible compartments may facilitate the task of maintaining overall security, while granting different parties access to different sets of PCS components. Some techniques for securing and controlling access to the PCS's compartments are described in further detail below.

In some embodiments, access-control system 1300 includes one or more compartment locks (e.g., locks 1302*a-f*) and one or more compartment access members (e.g., access members 1304*a-f*) associated with one or more respective compartments (e.g., electronics compartment 840, air intake compartment 865, display compartment 870, communications compartment 880, mounting compartment 890, and user interface compartment 850). When a compartment lock 1302 is engaged, the lock fastens or otherwise secures the corresponding access member 1304 in a closed position, such that the interior of the corresponding compartment is inaccessible. When a compartment lock 1302 is disengaged, the corresponding access member 1304 is movable between the closed position and an open position, such that the corresponding compartment is accessible.

Figure 14:
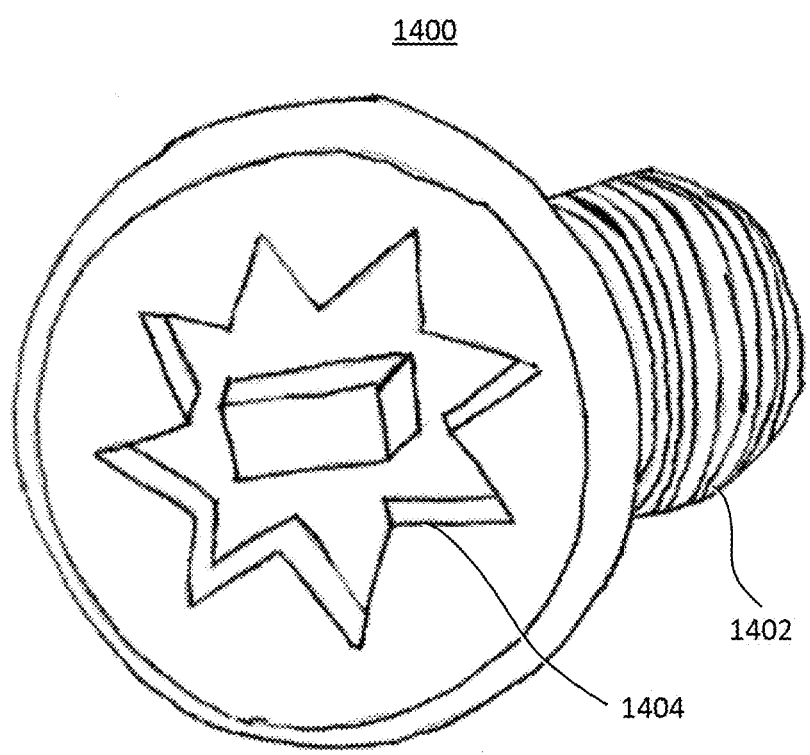
FIG. 14 shows a perspective view of a security fastener.

The compartment locks 1302 may include, without limitation, mechanical locks, electronic locks, electromechanical locks, etc. Non-limiting examples of mechanical locks include warded locks, tumbler locks (e.g., pin tumbler locks, wafer tumbler locks, disc tumbler locks, lever tumbler locks), combination locks, security fasteners (e.g., "security" or "tamper-proof" screws, bolts, anchors, nuts), etc. A security fastener may have an atypical shape and/or atypical dimensions relative to commercially available fasteners of the same type. For example, as can be seen in FIG. 14, a security fastener 1400 may be a machine screw 1402 with an atypical screw drive 1404 or head configuration. A security fastener can generally be unlocked or unfastened using a specialized tool that conforms to or otherwise accommodates the fastener's atypical shape and/or dimensions. Other mechanical locks can generally be opened with physical keys or a combination code.

Non-limiting examples of electronic or electromechanical locks include keycard locks, RFID locks, smart locks, cyber locks, etc. A keycard lock can generally be unlocked by presenting a suitable security token (e.g., a keycard with appropriate key data) to a keycard reader. Likewise, an RFID lock can generally be unlocked by presenting a suitable security token (e.g., an RFID tag with appropriate key data) to an RFID reader. A smart lock can generally be unlocked by presenting suitable authentication data to an access controller 1310, which confirms the validity of the authentication data and disengages the lock. Non-limiting examples of authentication data include biometric data (e.g., fingerprint data, retinal scan data, voice print data or other speech-based data, etc.), security credentials (e.g., username, password, personal identification number (PIN), etc.) cryptographic data, etc.

A cyber lock generally includes an electronic cylinder that can be unlocked by inserting a suitable cyber key. A cyber key is generally an electronic key that can communicate with a cyber lock to engage and disengage the cyber lock's cylinder. In some cases, a cyber key may provide power to the cyber lock. In some cases, a cyber key may contain internal memory that stores security information, which may include but is not limited to: one or more encrypted access codes, information identifying one or more PCS structures the key can access, dates and times when the key is authorized to access a particular PCS or set of PCSs, and/or date/time ranges when the key is authorized to access a particular PCS or set of PCSs. In some cases, a cyber key may be capable of disabling access to the security information and/or deleting the security information in response to input signals (e.g., input signals received wirelessly from a remote service center, indicating that the key has been lost or stolen). A cyber key's security information (e.g., schedules, credentials, authorizations, permissions, etc.) generally may be updated using wireless communications (e.g., Bluetooth and/or Wi-Fi) when connected to an authorized network. In some embodiments, a cyber key associated with a PCS 100 may connect to an authorized network through the PCS 100 (e.g., via the communications subsystem 180). Some of the above examples of cyber keys may contain an internal rechargeable battery that powers the cyber lock when the key is inserted into the lock. In some cases, a cyber key may communicate with a cyber lock (e.g., when the key is inserted into the lock). Such communication may occur wirelessly or via a wired connection (e.g., a USB interface).

Some examples of commercially available electronic or electromechanical locks include electromagnetic locks, electric latch releases, electronically-actuated deadbolts, motorized locks and solenoid locks.

In some embodiments, an electronic or electromechanical lock includes a locking mechanism and an actuator. Non-limiting examples of locking mechanisms include deadbolts, latches, electromagnets, etc. Non-limiting examples of actuators include solenoid drivers, rotary actuators, linear actuators (e.g., a linear actuator that moves a deadbolt or unlatches a latch), electromagnets, cams, levers, etc.

Returning to FIG. 13, access-control system 1300 may include an access controller 1310 and a security interface 1320. In some embodiments, access controller 1310 controls one or more actuators for one or more compartments, and uses the appropriate actuator to disengage a corresponding lock 1302 and/or open a corresponding access member 1304 upon provision of suitable authentication data. For example, when a user provides the appropriate authentication data for display compartment 870, access controller 1310 may drive an actuator to disengage lock 1302c, and (optionally) open compartment 870 by driving an actuator to move access member 1304c. In some embodiments, the authentication data is provided to access controller 1310 by security interface 1320 (e.g., via network subsystem 120). In some embodiments, authentication data is provided to access controller 1310 over a communication network (e.g., via network subsystem 120 and/or communication subsystem 180).

Figure 15:
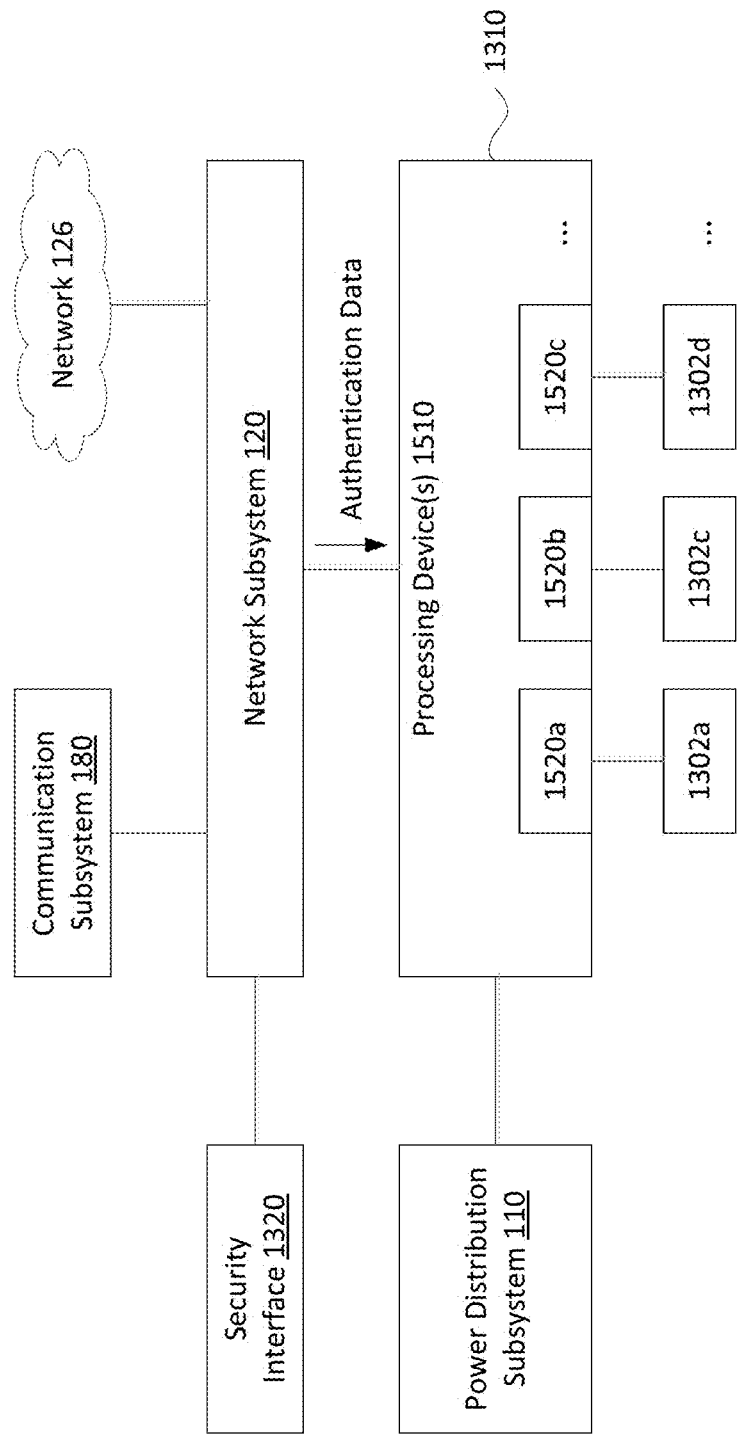
FIG. 15 shows a block diagram of an access controller, in accordance with some embodiments.

In some embodiments, access controller 1310 includes one or more processing devices 1510 and one or more actuator drivers 1520, as shown in FIG. 15. The processing device(s) 1510 and actuator driver(s) 1520 may be powered by power distribution subsystem 110. Processing device(s) 1510 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device.

Actuator driver(s) 1520 may include hardware (e.g., I/O ports) and/or software (e.g., driver software) controlled by processing device(s) 1510 and adapted to communicate with actuators (e.g., the actuators of locks 1302 and/or access members 1304). In some embodiments, access controller 1310 engages a lock 1302 and/or disengages a lock 1302 by sending suitable control signals to the lock's actuator via an actuator driver 1520. In some embodiments, access controller 1310 opens an access member 1304 and/or closes an access member 1304 by sending suitable control signals to the access member's actuator via an actuator driver 1520. In some embodiments, access controller 1310 determines whether a lock 1302 is engaged or disengaged, or determines whether an access member 1304 is open or closed, by sending a suitable query to the corresponding actuator, which may reply to the query by sending data to processing device(s) 1510 indicating the actuator's state. In some embodiments, when access controller 1310 detects closure of a compartment's access member 1304, access controller 1310 may engage the compartment's lock 1302.

An embodiment has been described in which access controller 1310 includes one or more processing device(s) 1510. In some embodiments, access controller 1310 is implemented on one or more processing devices of a subsystem of PCS 100. Access controller 1310 may, for example, be implemented on the maintenance subsystem's processing device(s) 600, which may be equipped with suitable actuator driver(s) 1520.

A user may provide authentication data to access controller 1310 via security interface 1320. Security interface 1320 may include a keycard reader, RFID reader, keyboard, keypad, touchscreen, fingerprint scanner, retinal scanner, camera, microphone, data access port, and/or other suitable data input device. The keycard reader and RFID reader can be used to read authentication data from a keycard and an RFID tag, respectively. The keyboard, keypad, or touchscreen can be used to enter security credentials. The fingerprint scanner, retinal scanner, camera, or microphone may be used to enter biometric data. The data access port may be used to upload authentication data, including but not limited to cryptographic keys. In the example of FIG. 15, security interface 1320 is configured to send the user-provided authentication data to access controller 1310 via network subsystem 120. In some embodiments, security interface 1320 includes a processing device adapted to encrypt the user-provided authentication data before sending the data to access controller 1310. In some embodiments, security interface 1320 sends the authentication data to access controller 1310 via a dedicated link that is not part of network subsystem 120. Alternatively or in addition, a user may provide authentication data to access controller 1310 over a communication network (e.g., network 126, or a network coupled to communication subsystem 180).

Access controller 1310 may analyze the user-provided authentication data to determine whether it is valid. In some embodiments, the user specifies which compartment(s) the user is attempting to access and access controller 1310 analyzes the authentication data to determine whether it is valid for the specified compartment(s). In some embodiments, the user provides authentication data without specifying which compartment(s) the user is attempting to access and access controller 1310 analyzes the authentication data to determine whether it is valid for any compartment. To determine whether the authentication data is valid, access controller 1310 may perform one or more suitable authentication procedures (e.g., fingerprint matching, voiceprint matching, retinal scan matching, username matching, password matching, PIN matching, one-factor authentication, two-factor authentication, multi-factor authentication, etc.).

In some embodiments, permission to access a compartment of the PCS 100 may be remotely granted, denied, or revoked (e.g., by a remote service center), and the grant, denial, or revocation of permission to access the compartment may be communicated to the access controller 1310 over a communication network (e.g., network 126, a network coupled to communication subsystem 180, etc.). In some embodiments, the access controller may acknowledge the grant, denial, or revocation of permission over the communication network.

The entity that grants, denies, or revokes permission to access a compartment of the PCS 100 may determine whether to grant, deny, or revoke permission based on any suitable information. In some embodiments, the entity grants permission to access a compartment during predetermined time periods. For example, the entity may grant permission to access a compartment during time periods specified by repair or maintenance schedules for components located in the compartment. As another example, the entity may deny access to the display compartment 870 for display subsystem 170 maintenance except during periods generally characterized by low pedestrian foot traffic, such as early morning hours. It can be appreciated that during periods of high pedestrian foot traffic, it is desirable for the display subsystem 170 to be showing advertisements. In some embodiments, the maintenance subsystem 130 may communicate with the entity (e.g., a remote service center). For example, the maintenance subsystem 130 may indicate to the entity whether (or when) maintenance or repair of a PCS component or subsystem is recommended or permitted. In some embodiments, the entity grants permission to access a compartment based on communication from the maintenance subsystem indicating that repair or maintenance of a component or subsystem in the compartment is recommended or permitted. For example, the maintenance subsystem 130 may indicate that repair or replacement of a PCS component in a compartment is recommended in response to administering a diagnostic test (e.g., a self-test) and detecting a fault. In some embodiments, the PCS 100 may send user-provided authentication data to the entity, which may determine whether the authentication data is valid for one or more compartments and grant permission to access the compartment(s) if the authentication data is determined to be valid.

In some embodiments, the PCS 100 may implement two-factor access control based on (1) user-provided authentication data and/or items (e.g., security tokens, keys, etc.) and (2) a grant, denial, or revocation of permission to access a compartment. When two-factor access control is used, the grant, denial, or revocation of permission to access a compartment may function as a grant, denial, or revocation of permission to allow authorized access to the compartment. When authorized access to a compartment is permitted, the access controller 1310 may allow users who provide valid authentication data/item(s) for the compartment to access the interior of the compartment. When authorized access to a compartment is not permitted, the access controller 1310 may not allow a user to access the interior of the compartment, even if the user provides valid authentication data/item(s) for the compartment. In other words, the PCS 100 may permit a user to access a PCS compartment if the user provides suitable authentication data/item(s) and a remote entity grants permission to access the compartment, but not if the authentication data/item(s) are unsuitable nor if the remote entity denies or revokes permission. For example, if a user provides compromised authentication data/item(s) (e.g., stolen authentication data or a lost/stolen key), the remote entity may determine that the authentication data/item(s) are compromised, deny permission to access the compartment, and instruct the access controller 1310 to revoke the user's privileges to access one or more compartments by disabling authentication data/item(s) assigned to or in the possession of the user.

In embodiments of the PCS 100 that implement two-factor access control, steps of the access control process may be performed in parallel and/or in any suitable sequence. In some embodiments, access controller 1310 may send a message to a remote entity (e.g., service center) requesting permission to allow authorized access to a compartment, and the remote entity may then reply with a grant or denial of permission to allow authorized access to the compartment. The access controller 1310 may send such a request before a user provides authentication data/item(s) for the compartment, after the user provides the authentication data/item(s) but before the authentication data/item(s) are validated, or after the user-provided authentication data/item(s) are validated. In some embodiments, a request to access a compartment is sent to the remote entity before a user attempts to gain access to the compartment (e.g., by providing authentication data/item(s)). After permission to allow authorized access to the compartment has been received by the PCS 100 (and before such permission has been revoked), a user may gain access to the compartment by providing suitable authentication data/item(s).

In some embodiments, the access controller 1310 provides an indication that permission to access a compartment (or permission to allow authorized access to a compartment) has been granted. For example, when access permission has been granted (and not revoked), the access controller 1310 may illuminate a light-emitting diode (e.g., a green LED) to indicate that access (e.g., authorized access) to the compartment is permitted. The indicator may be disposed in any suitable location, including, but not limited to, on the corresponding compartment or on an electronic key provided by the user. In some embodiments, the access controller 1310 may activate an indicator on a key wirelessly (e.g., over a wireless network) or via a wired connection (e.g., when the key is inserted into an interface connector or lock).

In some embodiments, the PCS 100 may implement single-factor access control based on user-provided authentication data/item(s) or on a grant, denial, or revocation of permission to access a compartment. For example, the access controller 1310 may open or unlock a compartment in response to receiving a grant of permission to access the compartment, without requiring the user to provide authentication data/item(s). In some embodiments, a user may transmit a code to a remote entity (e.g., by emailing the code to an email address associated with the entity, by sending a text message to a phone number associated with the entity, etc.), and, after validating the code, the entity may grant permission to access the compartment. In some embodiments, the user may transmit the code via a mobile device that wirelessly connects to a network through the PCS 100 (e.g., through an access node of the PCS 100). In some embodiments, the entity identifies a compartment of the PCS 100 and determines whether to grant permission to access the compartment based on the transmitted code, the email address/phone number to which the code was transmitted, and/or the email address/phone number from which the code was sent. In some embodiments, the entity may use an automated process to grant permission to access a compartment.

Access controller 1310 may detect and respond to attempts to gain unauthorized access to compartment(s) of PCS 100. In some embodiments, access controller 1310 determines that a user is attempting to gain unauthorized access to a PCS compartment if invalid authentication data is provided in more than N consecutive authentication attempts, where N is a predetermined number. In some embodiments, access controller 1310 determines that a user is attempting to gain unauthorized access to a PCS compartment (or has gained unauthorized access) if access controller 1310 detects disengagement of the compartment's lock or opening of the compartment's access member without a corresponding entry of the compartment's authentication data.

When unauthorized access (or an attempt to gain unauthorized access) to a PCS compartment is detected, access controller 1310 may take remedial action. In some embodiments, access controller 1310 collects evidence of the unauthorized access (or attempt) by activating a camera to acquire one or more images (e.g., still images or video) of a region proximate to the PCS. The acquired images may include images of the user who has accessed (or attempted to access) the PCS. In some embodiments, access controller 1310 sounds an alarm, displays a message via display subsystem 170, initiates communication with a security provider, and/or performs other suitable actions to draw attention and/or alert interested parties to the unauthorized access. In some embodiments, when unauthorized access to one or more compartments is detected, the access controller silently alerts a remote security center (e.g., alerts the remote security center without alerting the user), which in turn takes action based on the unauthorized access. Depending on which compartment is accessed, the security center may, for example, deploy security personnel or alert the local police.

Figure 16:
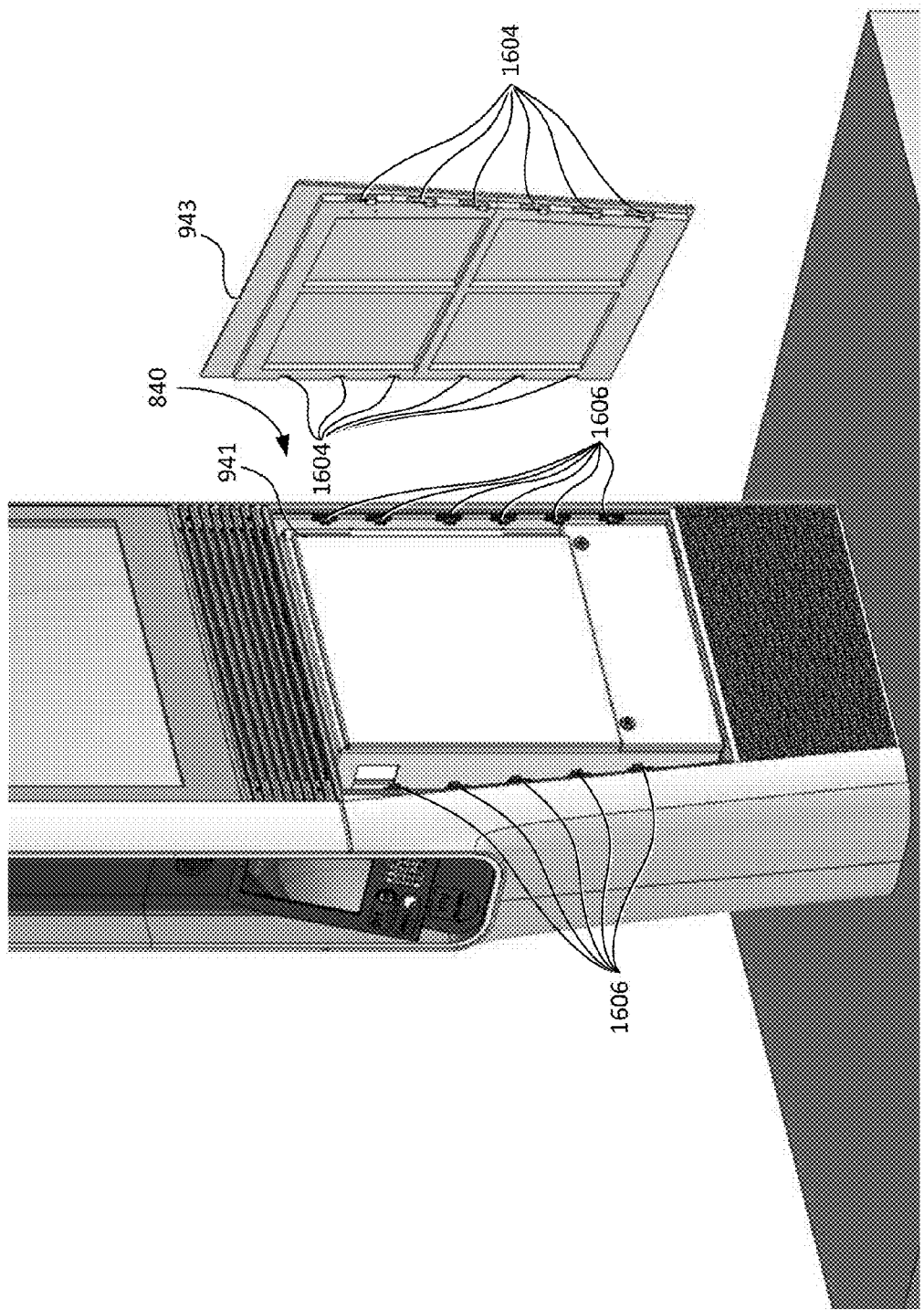
FIG. 16 shows a perspective view of an electronics compartment, in accordance with some embodiments.

FIG. 16 shows a perspective view of electronics compartment 840, according to some embodiments. In some embodiments, cover panel 943 functions as access member 1304*a* for electronics compartment 840. In some embodiments, the lock 1302*a* for electronics compartment 840 includes a set of latches 1604 and a corresponding set of latch receptacles 1606. When the lock is engaged, the interlocking of the latches 1604 and the latch receptacles 1606 holds the access member securely in the closed position. The lock may be disengaged by access controller 1310, which may drive one or more actuators coupled to the latch receptacles 1606 to release the latches 1604 or vice versa, thereby allowing the access member to be moved from the closed position (e.g., a position in which the interior of the compartment is inaccessible, such as the position of cover panel 943 in FIG. 9A) to the open position (e.g., a position in which the interior of the compartment is accessible, such as the position of cover panel 943 in FIG. 16). The cover panel 943 may be hinged and/or removable.

Figure 17A:
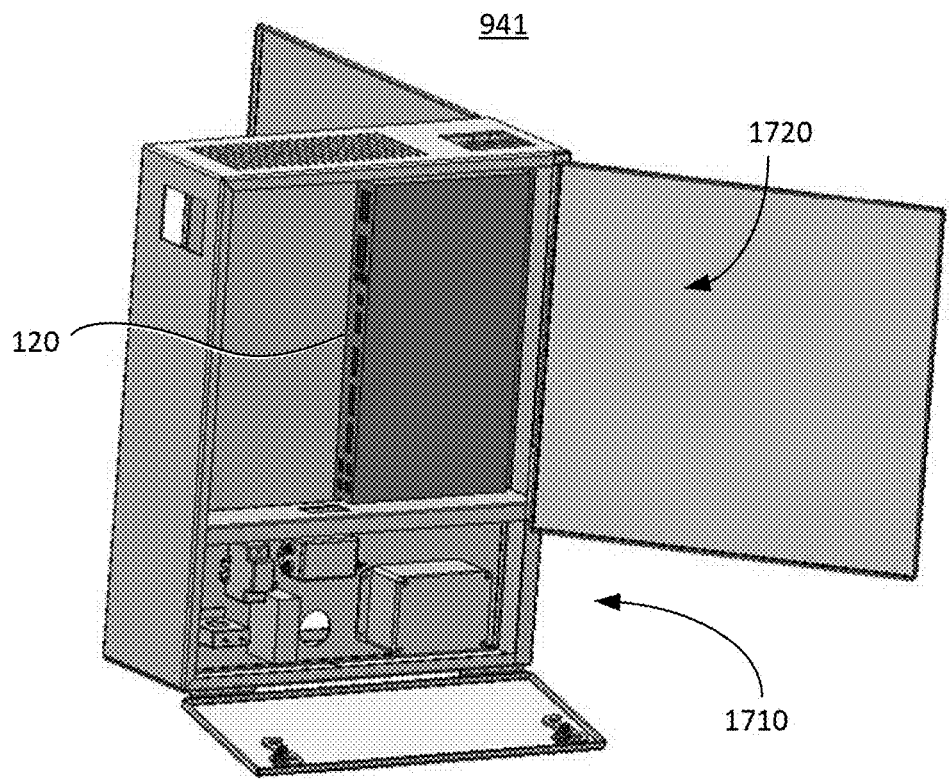
FIGS. 17A and 17B show respective front and rear perspective views of an electronics cabinet, in accordance with some embodiments.
Figure 17B:
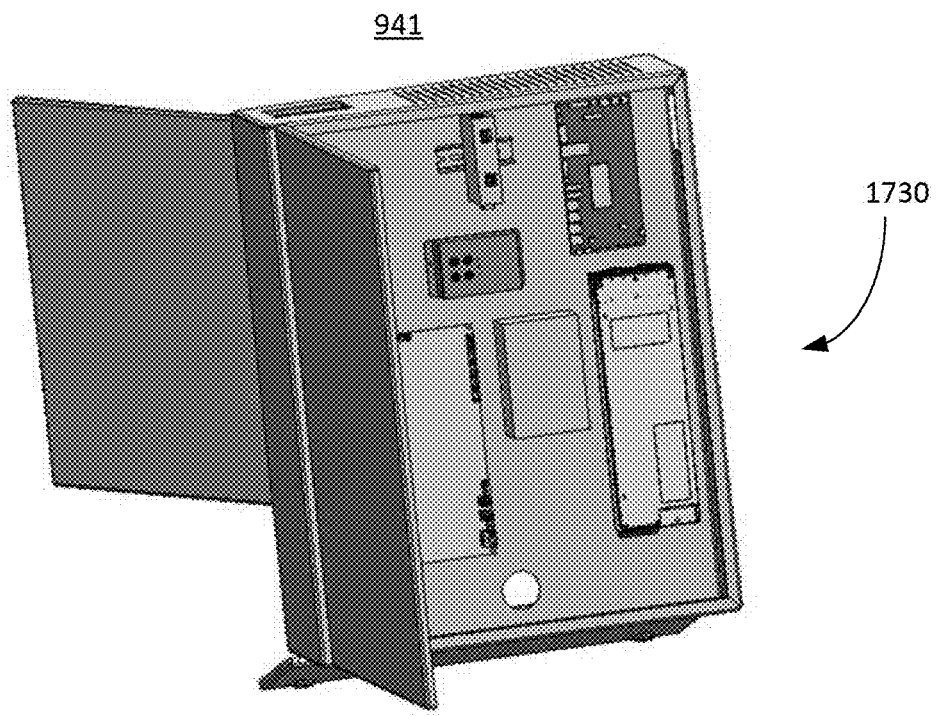

As can be seen in FIG. 16, electronics compartment 840 may enclose an electronics cabinet 941. FIGS. 17A and 17B show front perspective and rear perspective views of the electronics cabinet 941, according to some embodiments. Electronics cabinet 941 may include three sub-compartments 1710, 1720, and 1730. Sub-compartments 1710, 1720, and 1730 (or a subset thereof) may be independently secured and independently accessible. In some embodiments, sub-compartments 1710, 1720, and 1730 enclose, respectively, power distribution subsystem 110, network subsystem 120, and maintenance subsystem 130. In some embodiments, the power distribution subsystem 110 and the network subsystem 120 may be located on the same side of the electronics cabinet 941 (e.g., with the power distribution subsystem 110 located between the base of the PCS 100 and the network subsystem 120), and the maintenance subsystem 130 may be located on the opposite side of the electronics cabinet 941. In some embodiments, sub-compartment 1720 encloses network subsystem 120, and sub-compartments 1710 and 1730 collectively enclose power distribution subsystem 110 and maintenance subsystem 130 (e.g., portions of the power distribution subsystem 110 and/or portions of the maintenance subsystem 130 may be located in both the sub-compartment 1710 and the sub-compartment 1730).

In some embodiments, electronics compartment 840 may not enclose an electronics cabinet 941. Electronics compartment 840 may enclose electronics subsystem 140 without partitioning subsystems 110, 120, and 130 into sub-compartments.

An embodiment has been described in which an electronics compartment 840 encloses three sub-compartments 1710, 1720, and 1730, which in turn enclose power distribution subsystem 110, network subsystem 120, and maintenance subsystem 130. In some embodiments, PCS 100 may not include an electronics compartment 840 enclosing multiple compartments. Instead, PCS 100 may include three compartments which respectively enclose subsystems 110, 120 and 130.

Figure 18A:
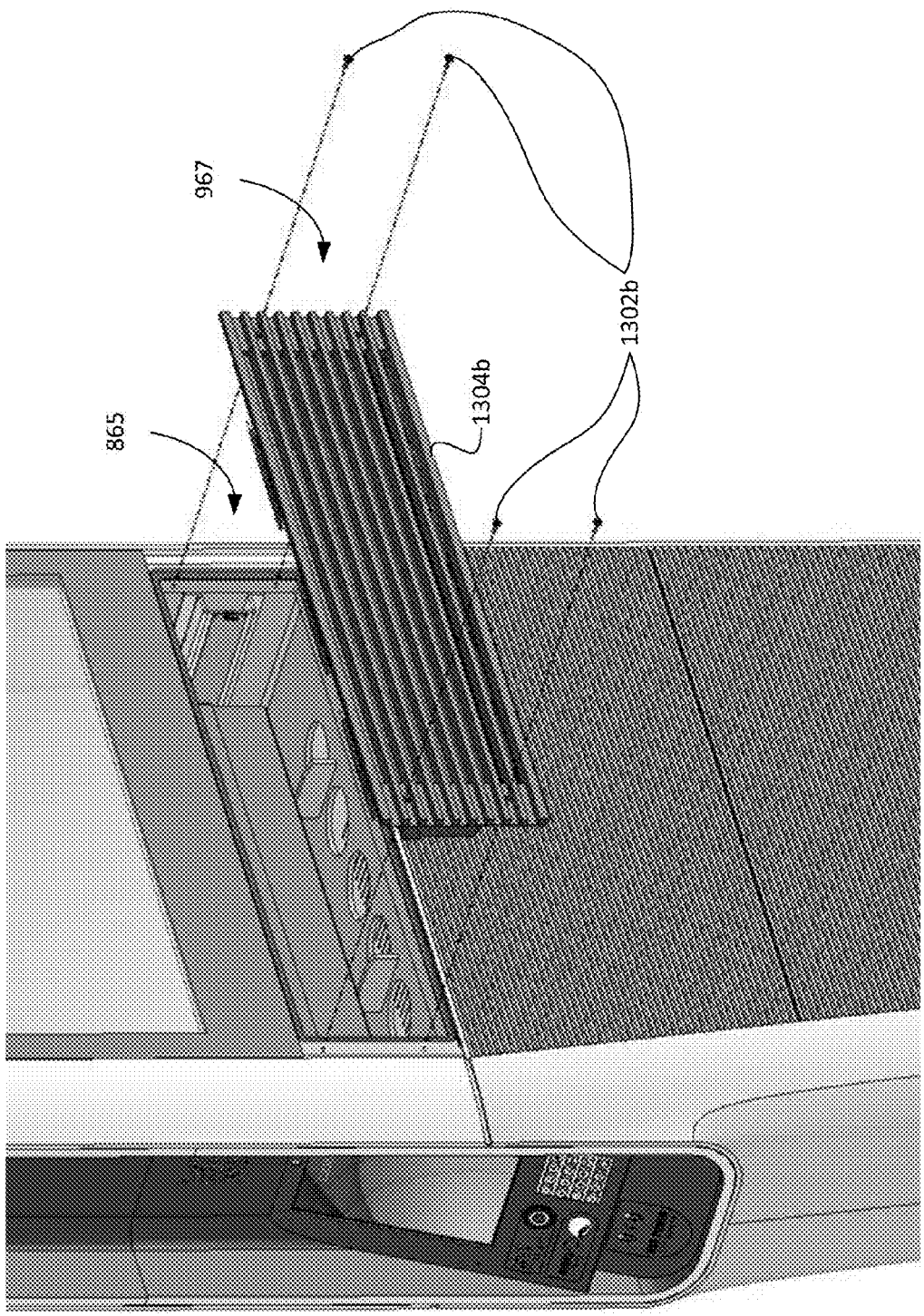
FIGS. 18A and 18B show respective front and exploded front perspective views of an air intake assembly, in accordance with some embodiments.
Figure 18B:
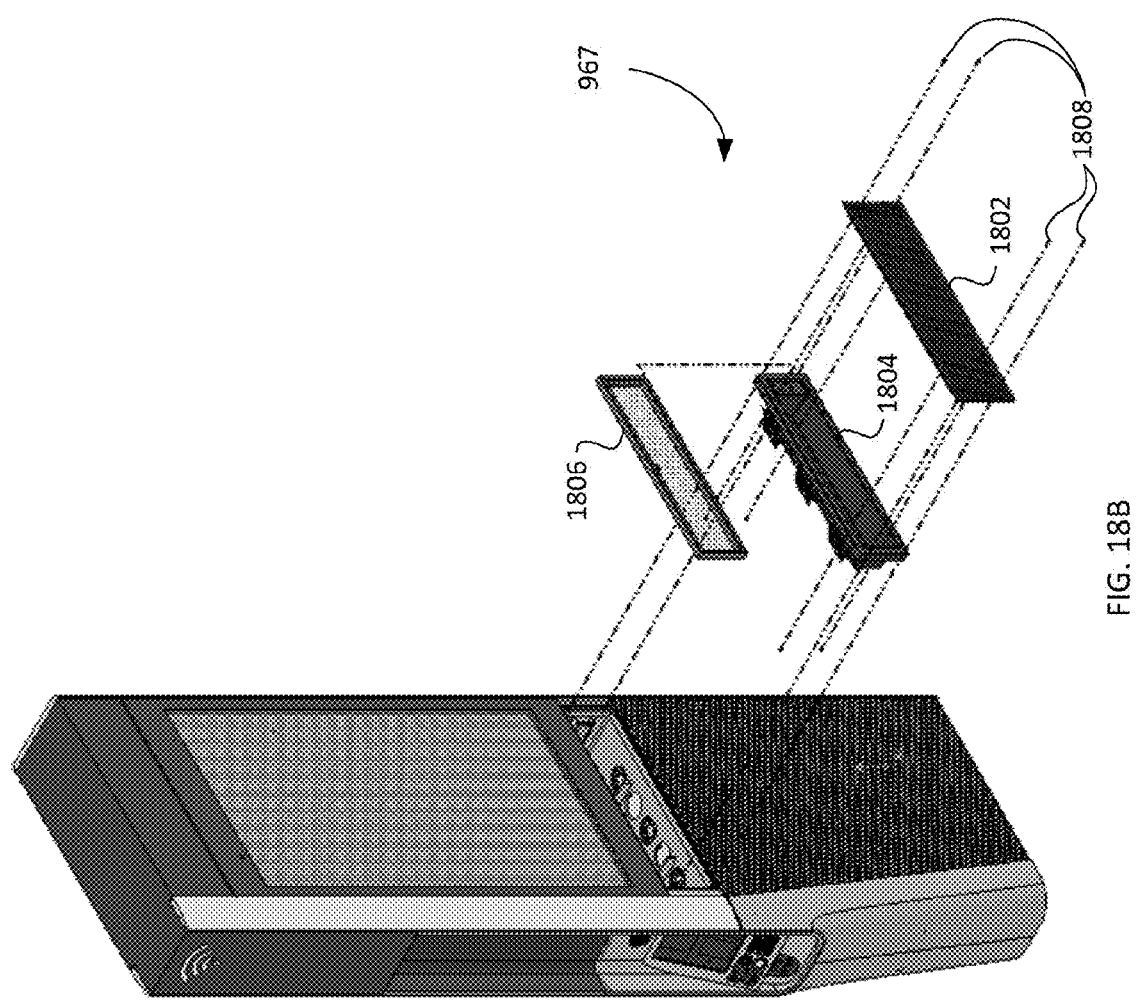

FIGS. 18A and 18B show front perspective and exploded front perspective views, respectively, of an air intake assembly 967, according to some embodiments. Air intake assembly 967 may be enclosed in air intake compartment 865 and may implement a portion of temperature control subsystem 160. In some embodiments, air intake assembly 967 includes a grill 1802, a filter 1806, and a fan assembly 1804. The grill 1802 may function as access member 1304b, and may be secured to the PCS by security fasteners 1808, which may function as lock 1302b. Thus, lock 1302b may be engaged by using security fasteners 1808 to fasten grill 1802 to the PCS. According to some embodiments, the closed and open positions of access member 1304b (e.g., grill 1802 of air intake assembly 967) are illustrated in FIG. 9A and FIG. 18A, respectively. In some embodiments, air intake compartment 865 may enclose two air intake assemblies 967 disposed proximate to each other, on opposite sides of PCS 100.

Figure 19B:
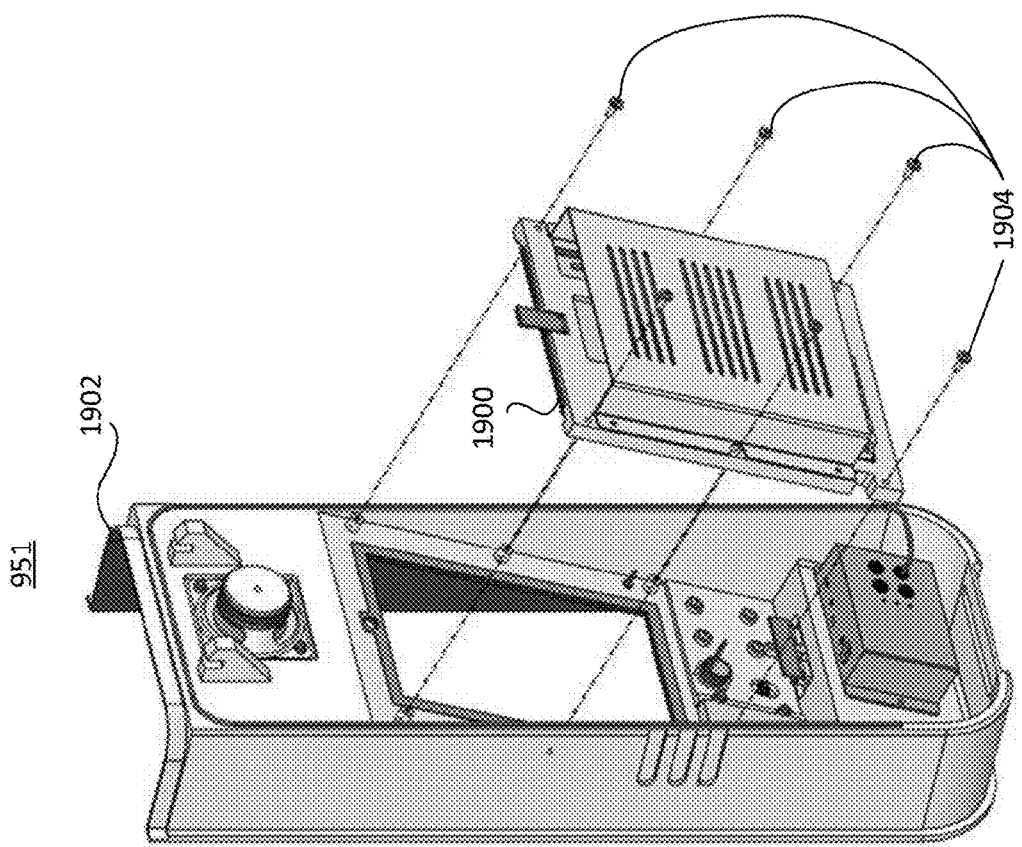
FIGS. 19A and 19B show respective front perspective and rear perspective views of a user interface device, in accordance with some embodiments.
Figure 19A:
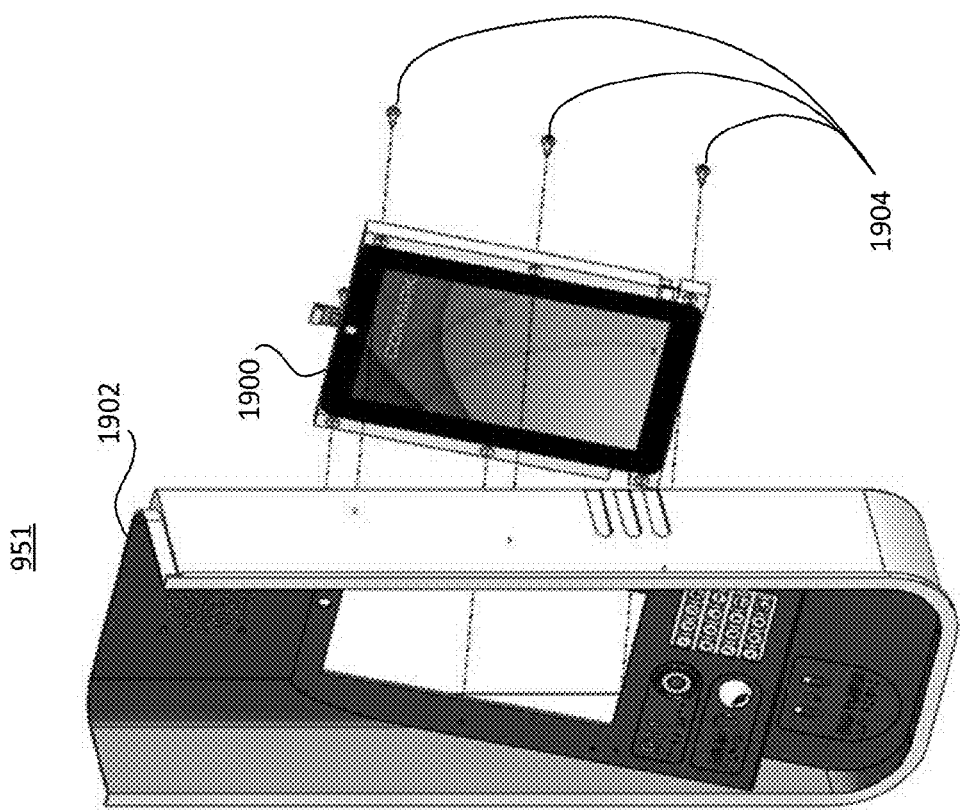

FIGS. 19A and 19B show front perspective and rear perspective views, respectively, of a user interface device 951, according to some embodiments. User interface device 951 may be partially enclosed in user interface compartment 850 and may implement a user interface subsystem 150. In some embodiments, user interface device 951 includes a user interface panel 1902 and a tablet computer 1900 fastened to the user interface panel 1902 by security fasteners 1904. In some embodiments, the security fasteners are accessible via the interior of air intake compartment 865, but not accessible from the exterior of the PCS 100. Thus, in some embodiments, the lock 1302f and access member 1304f for user interface compartment 850 may include, respectively, the lock 1302b and the access member 1304b for air intake compartment 865.

Figure 20:
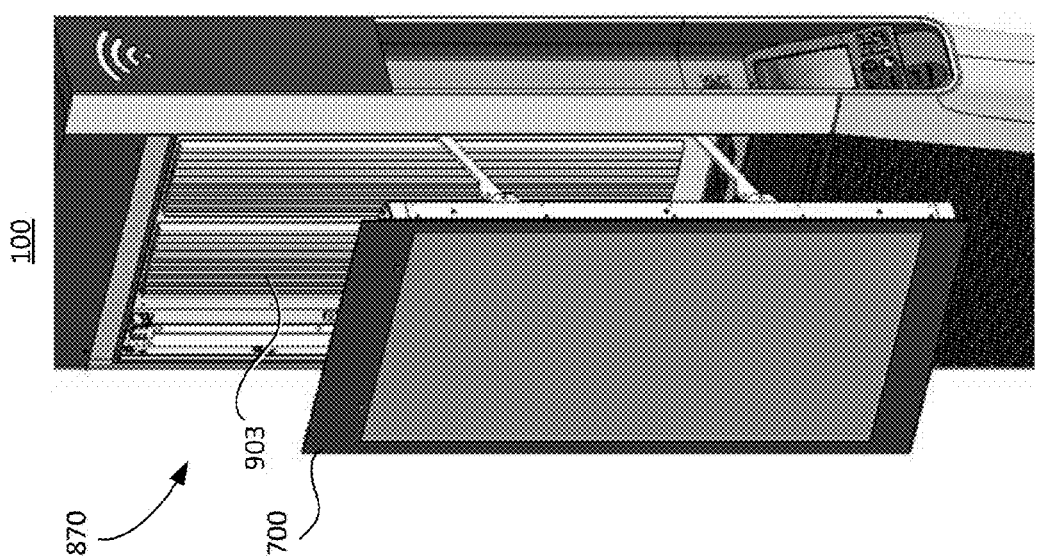
FIG. 20 shows a perspective view of a display compartment, in accordance with some embodiments.

FIG. 20 shows a perspective view of a display compartment 870, according to some embodiments. In some embodiments, display compartment 870 includes a display module 700 and a heat sink 903. In some embodiments, display compartment 870 includes a second display module (and, optionally, a second heat sink) arranged back-to-back with display module 700 and heat sink 903, such that display module 700 and the second display module face outwardly in opposite directions.

Figure 21:
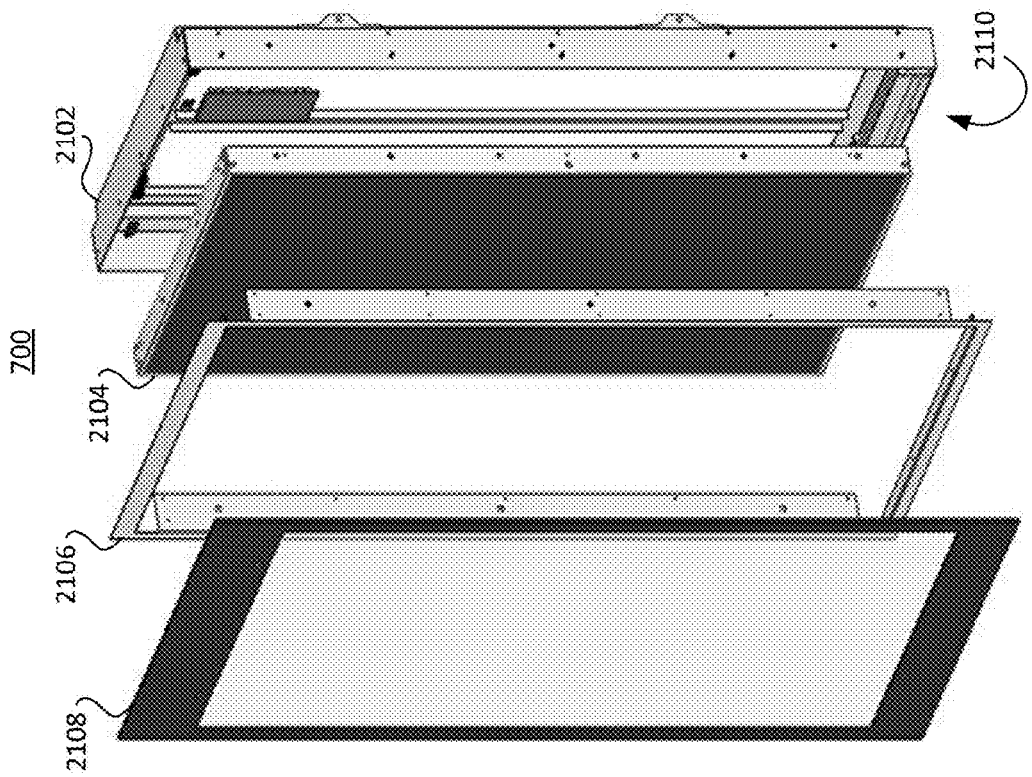
FIG. 21 shows an exploded perspective view of display module, in accordance with some embodiments.

FIG. 21 shows an exploded perspective view of a display module 700, according to some embodiments. In some embodiments, display module 700 includes a housing and a display panel 2104. The housing may include a housing frame 2102, a covering frame 2106, and a transparent covering 2108. Display module 700 may be assembled by positioning display panel 2104 in cavity 2110, fastening the display panel to housing frame 2102, and using covering frame 2106 to secure transparent covering 2108 over display panel 2104. Transparent covering 2108 may include toughened glass (e.g., "Gorilla Glass"® manufactured by Corning, Inc.). In some embodiments, the assembled display module 700 functions as the access member 1304c for display compartment 870. FIG. 9A shows access member 1304c (display module 700) in the closed position, and FIG. 20 shows the access member in the open or service position.

Figure 22:
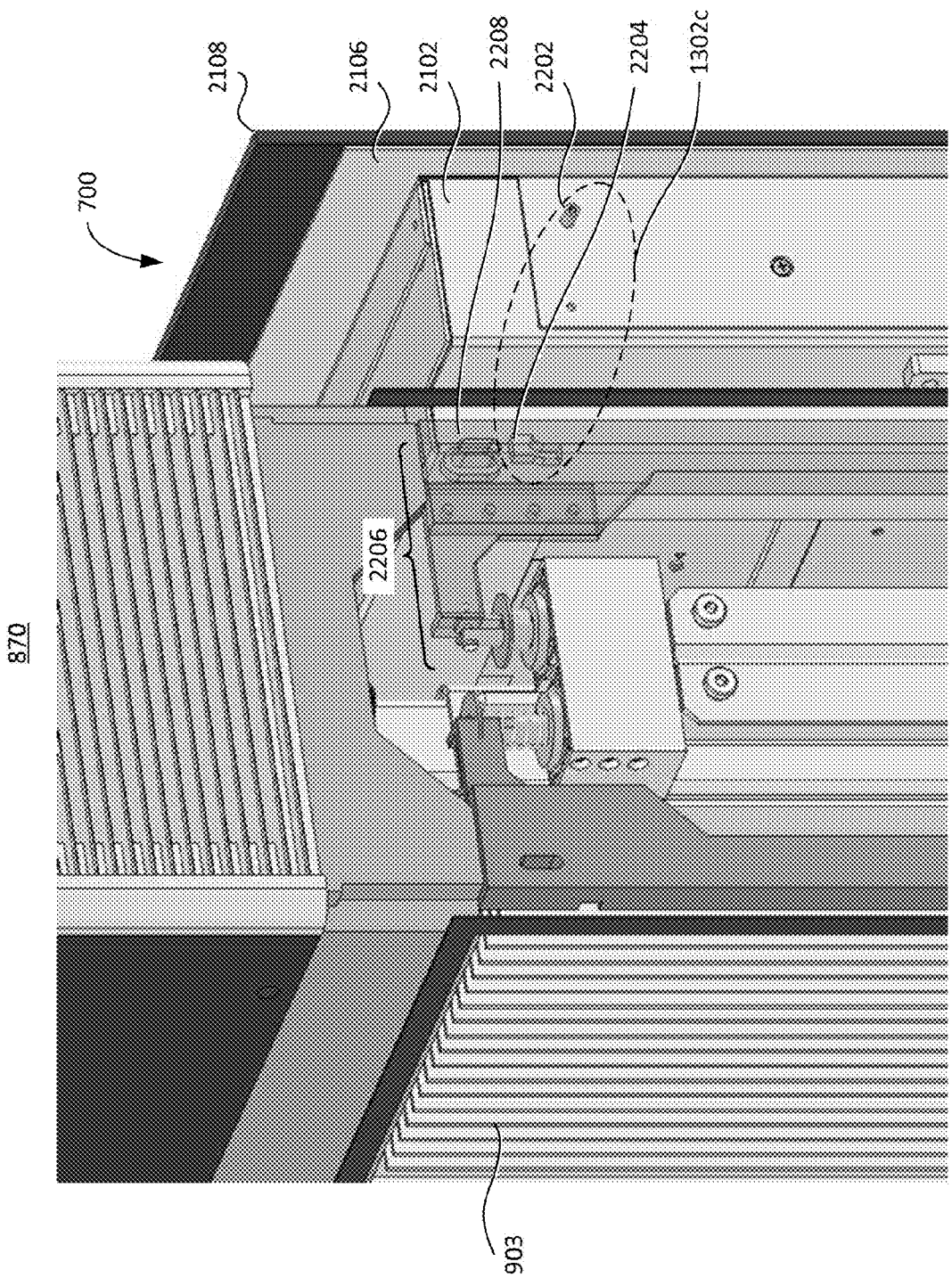
FIG. 22 shows a perspective cut-away view of a compartment lock of a display compartment, in accordance with some embodiments.

FIG. 22 shows a cut-away perspective view of compartment lock 1302c of display compartment 870, according to some embodiments. In some embodiments, compartment lock 1302c includes a connector 2202 (e.g., a pin) coupled to the housing of display module 700, and a mating interlocking connector 2204 (e.g., an L-shaped receptacle) formed in a retention member 2208 of PCS 100. FIG. 22 also shows an actuator 2206. In some embodiments, actuator 2206 is operable to disengage lock 1302c by moving retention member 2208 such that connector 2202 is released from mating interlocking connector 2204 (e.g., moving retention member 2208 toward the PCS's base). The operation of compartment lock 1302c and actuator 2206 are described in more detail below, with reference to FIGS. 23A and 23B.

Figure 23A:
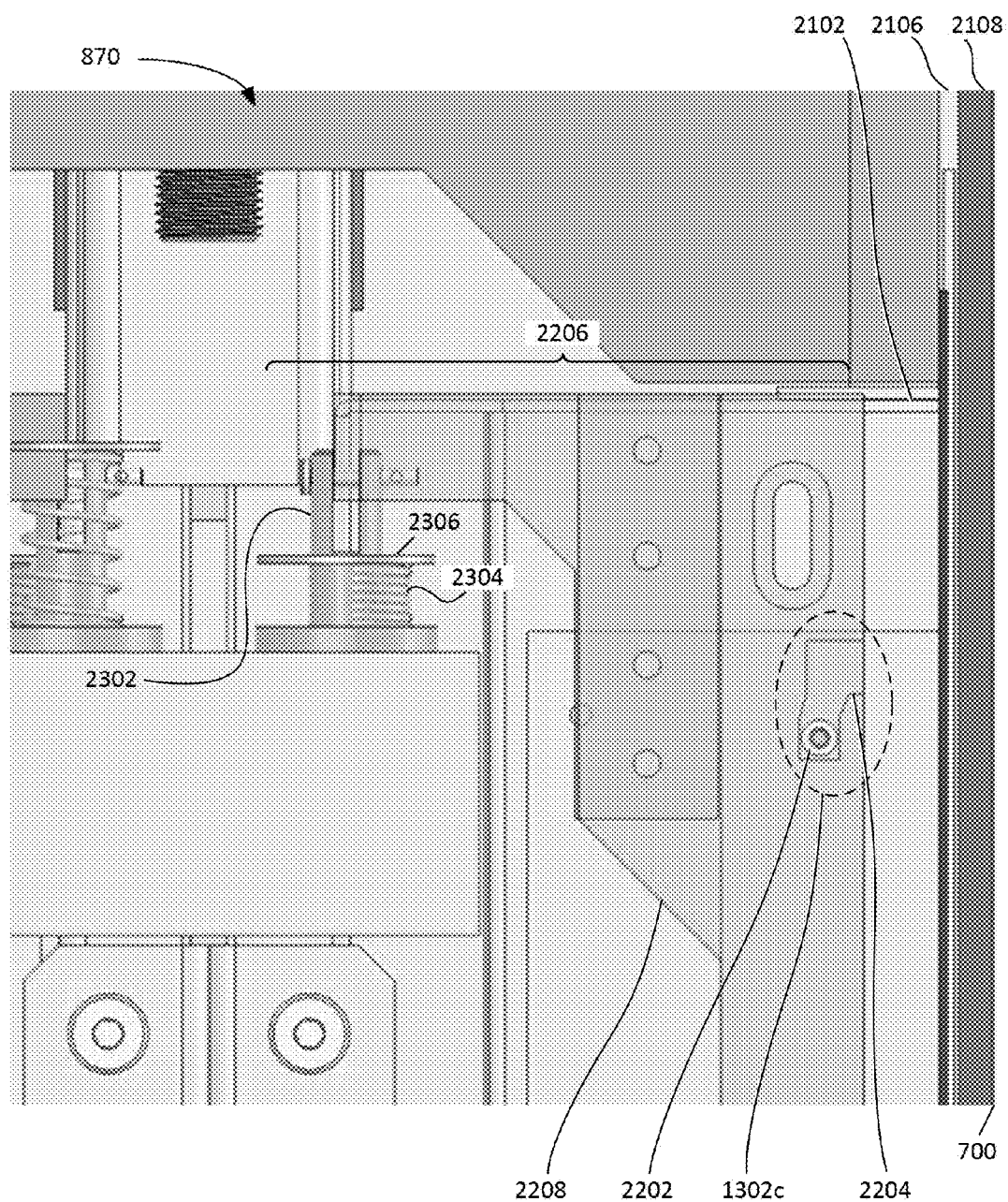
FIGS. 23A and 23B show side views of a compartment lock of a display compartment with the lock engaged (FIG. 23A) and disengaged (FIG. 23B), in accordance with some embodiments.

FIG. 23A shows a cross-sectional view of compartment lock 1302c of display compartment 870 with the lock engaged and the access member (display module 700) in the closed position, according to some embodiments. In some embodiments, lock 1302c is engaged by positioning connector 2202 within mating interlocking connector 2204, such that mating interlocking connector 2204 prevents connector 2202 from moving laterally. As can be seen, when lock 1302c is engaged, display module 700 is held in the closed position. In some embodiments, actuator 2206 is operable to disengage lock 1302c by retracting a pin 2302 into an aperture of a spool 2306, thereby moving mating interlocking connector 2204 downward such that connector 2202 can move laterally toward the exterior of the PCS 100. In some embodiments, actuator 2206 includes a bias member 2304 (e.g., a spring) that biases lock 1302c toward the engaged position. Actuator 2206 may be controlled by access controller 1310.

Figure 23B:
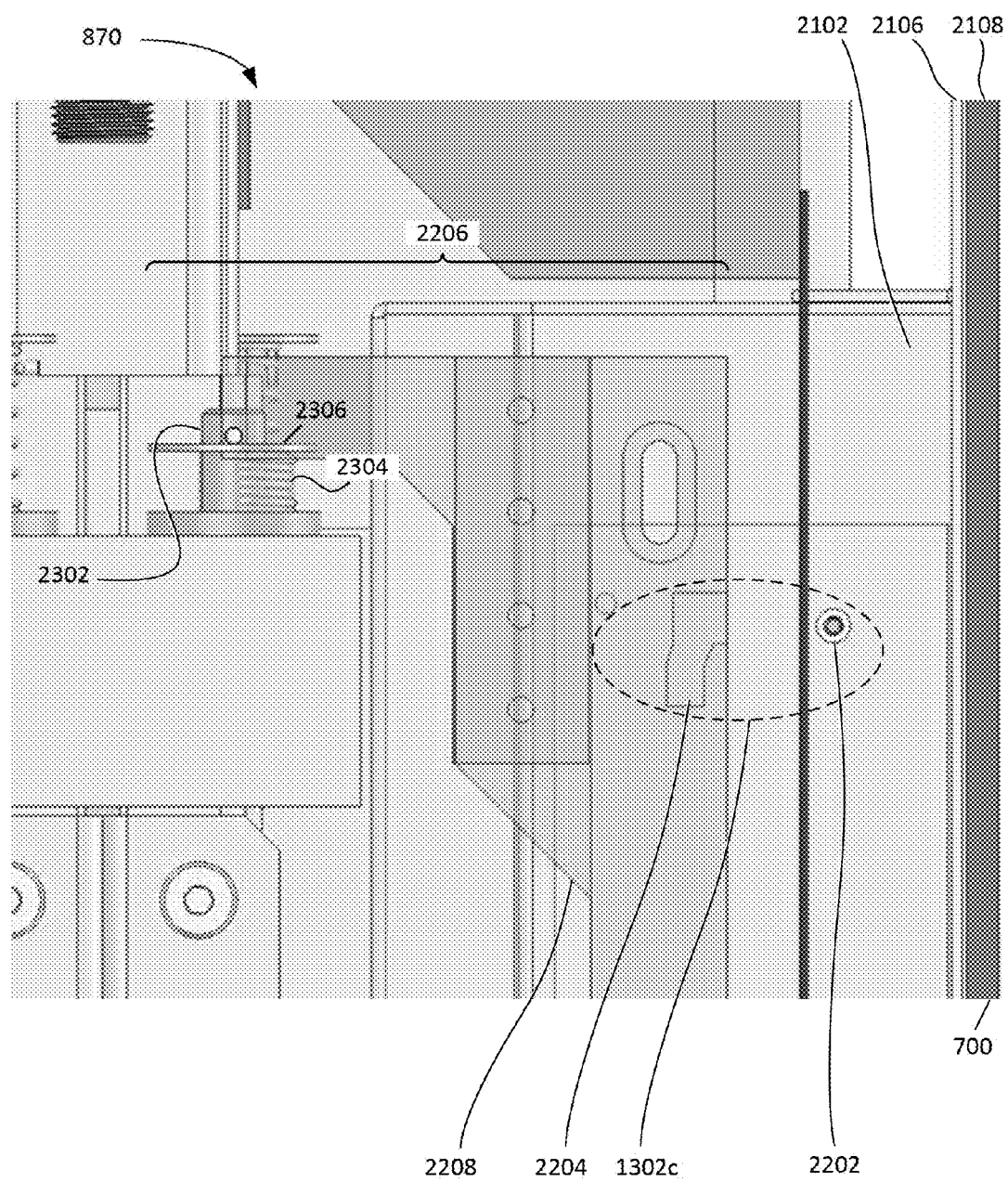

FIG. 23B shows a cross-sectional view of compartment lock 1302c of display compartment 870 with the lock disengaged and the access member (display module 700) in the open position, according to some embodiments. In the example of FIG. 23B, pin 2302 has been retracted, thereby causing retention member 2208 and mating interlocking connector 2204 to move downward, thereby releasing connector 2202 to move laterally toward the exterior of PCS 100.

An embodiment has been described in which compartment lock 1302c of display compartment 870 includes a connector 2202 and a mating interlocking connector 2204. In some embodiments, a compartment lock 1302c may include multiple pairs of connectors and mating interlocking connectors. The connectors may be arranged around a periphery of display module 700, and the mating interlocking connectors may be arranged around a periphery of display compartment 870. For example, retention member 2208 may include one or more mating interlocking connectors, and a second retention member disposed on the opposite side of display module 700 may also include one or more mating interlocking connectors. In some embodiments, the connectors 2202 may be disposed on the retention members 2208, and the mating interlocking connectors 2204 may be disposed on the display module 700.

As described above, PCS 100 may include two display modules 700 facing in opposite directions. In such embodiments, either one or both display modules may be equipped with compartment locks 1302c and actuators 2206 that operate independently or in unison.

Figure 24:
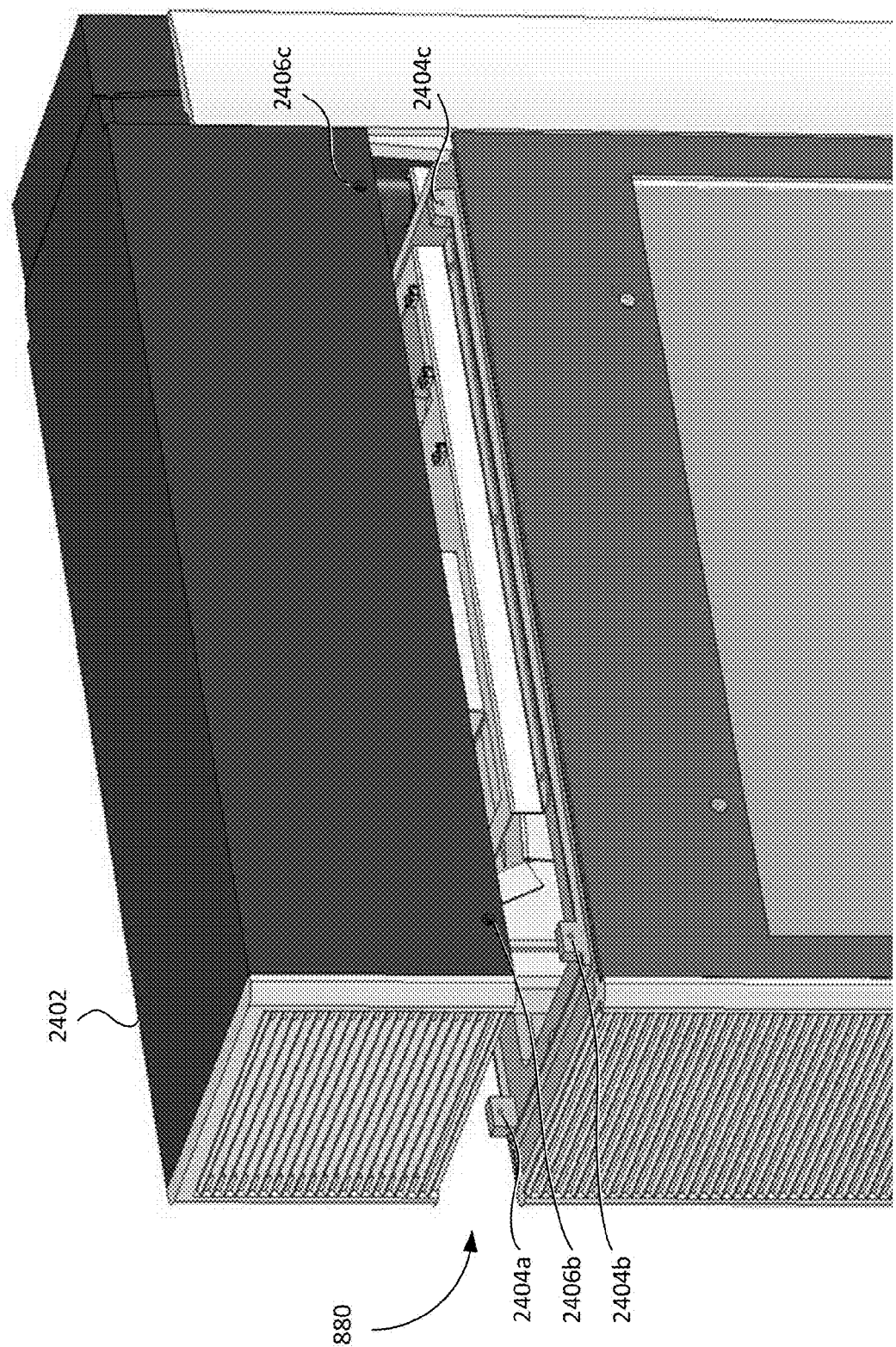
FIG. 24 shows a perspective view of a communications compartment, in accordance with some embodiments.

FIG. 24 shows a perspective view of a communications compartment 880, according to some embodiments. In some embodiments, communications compartment 880 includes a removable cap 985, which may function as access member 1304d, and may be secured to the PCS by inserting security fasteners through apertures 2404 and 2406. The security fasteners may function as compartment lock 1302d. According to some embodiments, the closed and open positions of access member 1304d (e.g., cap 985) are illustrated in FIG. 9A and FIG. 24, respectively.

Figure 25:
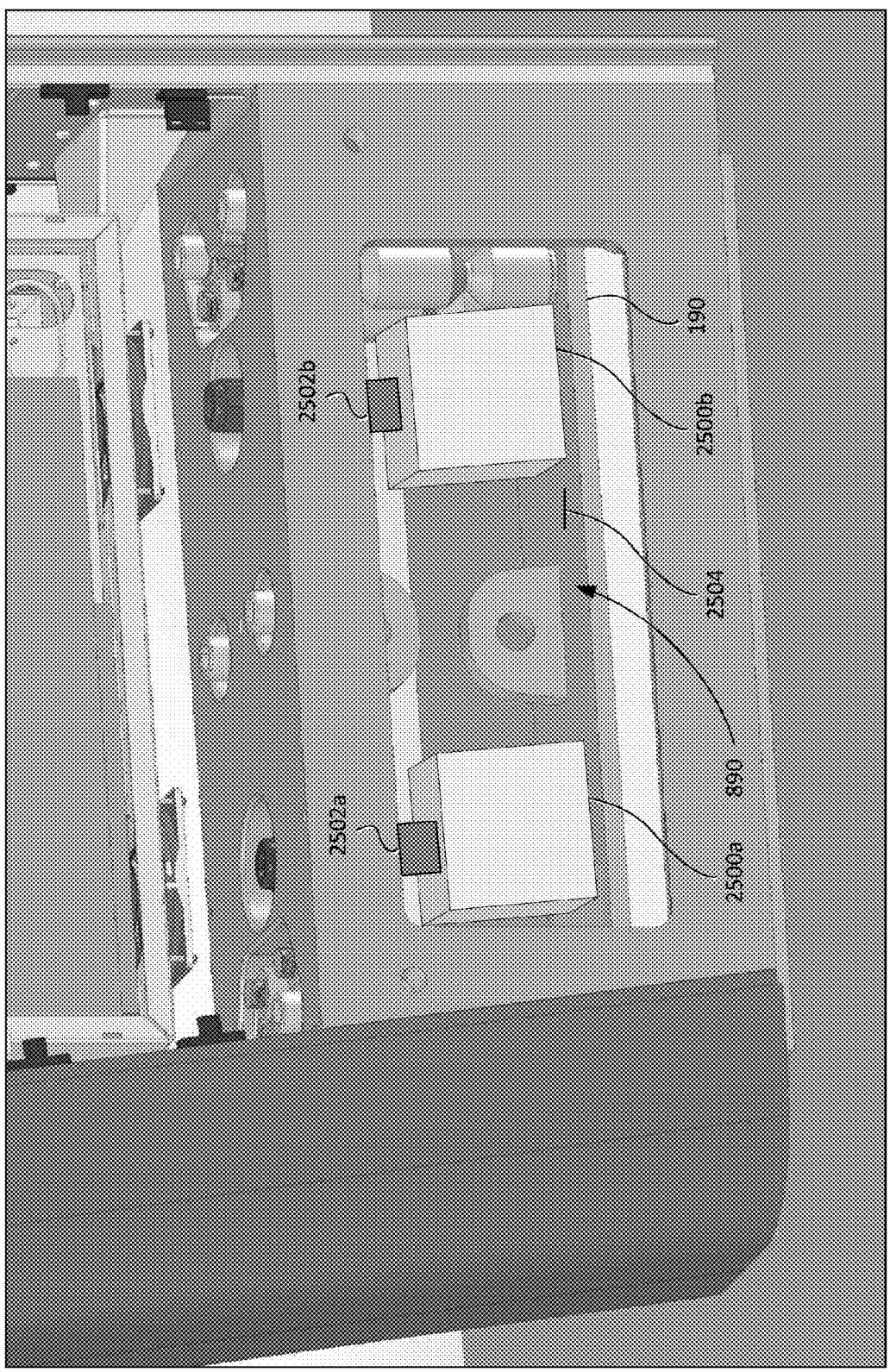
FIG. 25 shows a perspective view of a mounting compartment, in accordance with some embodiments.

Perspective views of mounting compartment 890 are shown in FIGS. 9A, 9C, and 25, according to some embodiments. Mounting compartment 890 may include a cover panel 991. In some embodiments, cover panel 991 functions as access member 1304e for mounting compartment 890. In some embodiments, the lock 1302e for mounting compartment 890 includes a set of latches disposed proximate the periphery of cover panel 991 and a corresponding set of latch receptacles disposed proximate the periphery of mounting compartment 890 or vice versa. When the lock is engaged, the interlocking of the latches and the latch receptacles may hold the access member securely in the closed position. The lock may be disengaged by access controller 1310, which may drive one or more actuators coupled to the latch receptacles to release the latches, thereby allowing the access member to be moved from the closed position (e.g., a position in which the interior of the compartment is inaccessible, such as the position of cover panel 991 in FIG. 9A) to the open position (e.g., a position in which the interior of the compartment is accessible, such as the position of cover panel 991 in FIG. 9C).

In some embodiments, the mounting compartment 890 contains a mains power connection and one or more network connections. The network connection(s) may be, for example, fiber optic and/or copper network connections, depending, for example, on where the PCS is located and what type of network service is available. In some locations, PCS 100 may receive input data through one or more fiber network connections, provide output data through one or more copper network connections, or vice versa.

In some embodiments, the mounting compartment 890 may contain one or more junction boxes 2500 for connecting power and/or network connections. In some embodiments, the junction boxes 2500 are attached to the mounting compartment 890 before the PCS 100 is installed, which may facilitate securing of the power and network cabling 2502 (e.g., fastening of the cabling to the PCS). In some embodiments, the junction boxes are attached to the PCS 100 before it is installed on mounting subsystem 190. In some embodiments, a portion 2504 of the mounting subsystem 190 forms a bottom surface of the mounting compartment 890. In some embodiments, portions of the power and/or network cabling are located in the mounting subsystem 190 before the PCS 100 is mounted, and the cabling is connected to the PCS's mains power connection and network connection(s) after the PCS 100 is mounted.

In some embodiments, one or more compartments of PCS 100 are hierarchically secured, such that access to one or more compartments is a precondition for accessing another compartment. For example, security interface 1320 may be disposed within a compartment C (e.g., air intake compartment 865 or communication compartment 880), such that a user can access the security interface 1320 only after accessing the compartment C. The user can then provide authentication data to access controller 1310 via security interface 1320, and thereby gain access to other compartments (e.g., display compartment 870, electronics compartment 840, or mounting compartment 890). In some embodiments, the security interface 1320 may include a key reader disposed on an exterior surface of the PCS 100 or proximate to the PCS 100.

Further Description of Some Embodiments

Embodiments have been described in which an access controller performs an authentication process and controls engagement/disengagement of compartment locks and/or opening/closing of compartment access members. The various authentication and control methods or processes outlined herein can be coded as software that is executable on one or more processors that employ one of a variety of operating systems or platforms. Additionally, such software can be written using any of a number of suitable programming languages and/or programming or scripting tools, and also can be compiled as executable machine language code or intermediate code that is executed on a framework or virtual machine. Also, the acts performed as part of the techniques described herein can be performed in any suitable order.

In this respect, the authentication and/or control techniques can be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various techniques discussed above. The computer readable medium or media can be non-transitory. The computer readable medium or media can be transportable, such that the program or programs stored thereon can be loaded onto one or more different computers or other processors to implement various aspects of the present invention as discussed above. The terms "program" or "software" are used herein in a generic sense to refer to a computer code or set of computer-executable instructions that can be employed to program a computer or other processor to implement various aspects described in the present disclosure. Additionally, it should be appreciated that according to one aspect of this disclosure, one or more computer programs that when executed perform techniques described herein need not reside on a single computer or processor, but can be distributed in a modular fashion amongst a number of different computers or processors to implement various aspects of the present invention.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures can be shown to have fields that are related through location in the data structure. Such relationships can likewise be achieved by assigning storage for the fields with locations in a computer-readable medium that conveys relationship between the fields. However, any suitable mechanism can be used to establish a relationship between information in fields of a data structure, including through the use of pointers, tags or other mechanisms that establish a relationship between data elements.

In some embodiments the technique(s) can be implemented as computer instructions stored in portions of a computer's random access memory to provide control logic that affects the processes described above. In such an embodiment, the program can be written in any one of a number of high-level languages, such as FORTRAN, PASCAL, C, C++, C#, Java, JavaScript, Tcl, or BASIC. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80x86 assembly language if it is configured to run on an IBM PC or PC clone. The software can be embedded on an article of manufacture including, but not limited to, "computer-readable program means" such as a floppy disk, a hard disk, an optical disk, a magnetic tape, a PROM, an EPROM, or CD-ROM.

Embodiments have been described in which various aspects of the techniques described herein are applied to a personal communication structure (PCS). In some embodiments, aspects of the techniques described herein may be applied to any suitable structure including, without limitation, a kiosk (e.g., an interactive kiosk), pay station (e.g., parking pay station), automated teller machine (ATM), article of street furniture (e.g., mailbox, bench, traffic barrier, bollard, telephone booth, streetlamp, traffic signal, traffic sign, public transit sign, public transit shelter, taxi stand, public lavatory, fountain, watering trough, memorial, sculpture, waste receptacle, fire hydrant, vending machine, utility pole, etc.), etc.

Various aspects of the present disclosure can be used alone, in combination, or in a variety of arrangements not specifically described in the foregoing, and the invention is therefore not limited in its application to the details and arrangement of components set forth in the foregoing description or illustrated in the drawings. For example, aspects described in one embodiment can be combined in a suitable manner with aspects described in other embodiments.

TERMINOLOGY

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A personal communication structure (PCS) comprising:
   at least three independently accessible compartments at least partially enclosing respective subsystems of the PCS, an interior of each of the independently accessible compartments being accessible without accessing the interior of any other independently accessible compartment, the at least three independently accessible compartments comprising:
   an electronics compartment at least partially enclosing a power distribution subsystem,
   a communications compartment at least partially enclosing a communications subsystem, and
   a display compartment at least partially enclosing a display subsystem; and
   an access controller operable to provide access independently to respective interiors of at least a subset of the compartments.

2. The PCS of claim 1, wherein the electronics compartment further at least partially encloses at least one subsystem selected from the group consisting of a networking subsystem and a maintenance subsystem.

3. The PCS of claim 1, wherein the electronics compartment comprises a power distribution compartment and an independently accessible networking compartment, wherein the power distribution compartment at least partially encloses the power distribution subsystem, and wherein the networking compartment at least partially encloses a networking subsystem.

4. The PCS of claim 1, wherein the independently accessible compartments further comprise at least one compartment selected from the group consisting of a networking compartment at least partially enclosing a networking subsystem and a maintenance compartment at least partially enclosing a maintenance subsystem.

5. The PCS of claim 1, wherein the electronics compartment comprises an access panel movable between an open position and a closed position, and a lock operable to lock the access panel in the closed position, and wherein the access controller is operable to provide access to the interior of the electronics compartment by performing at least one operation selected from the group consisting of disengaging the lock and moving the access panel to the open position.

6. The PCS of claim 1, wherein the electronics compartment is disposed along a lower portion of the PCS.

7. The PCS of claim 1, wherein the communications subsystem comprises at least one communication device selected from the group consisting of a wireless access point, a radio access node, and an antenna.

8. The PCS of claim 7, wherein the radio access node comprises a small cell operable to communicate with at least one mobile network selected from the group consisting of 3G mobile networks, 4G mobile networks, and LTE mobile networks.

9. The PCS of claim 1, wherein the communications compartment is located proximate a top of the PCS.

10. The PCS of claim 1, wherein the display subsystem comprises a display panel operable to display images.

11. The PCS of claim 10, wherein the display compartment comprises an access member movable between an open position and a closed position, and a lock operable to lock the access member in the closed position.

12. The PCS of claim 11, wherein the lock comprises a connector coupled to the access member and a mating interlocking connector coupled to a frame of the PCS.

13. The PCS of claim 11, wherein the access member comprises a housing, wherein the housing comprises a frame, a transparent covering secured to the frame, and a cavity formed by the frame and the transparent covering, and wherein the display panel is secured to the frame and disposed within the cavity.

14. The PCS of claim 11, wherein the access controller is operable to provide access to the interior of the display compartment by performing at least one operation selected from the group consisting of disengaging the lock and moving the access member to the open position.

15. The PCS of claim 1, wherein the display compartment is disposed along an upper portion of the PCS.

16. The PCS of claim 1, wherein the access controller comprises a processing device, wherein the subset of the independently accessible compartments comprise respective locks, and wherein the processing device is configured to independently disengage the respective locks.

17. The PCS of claim 16, wherein the processing device is adapted to disengage each of the locks by controlling at least one device selected from the group consisting of a solenoid driver, a rotary actuator, a linear actuator, an electromagnet, a cam, and a lever.

18. The PCS of claim 16, wherein the processing device is configured to receive authentication data and to disengage at least one of the locks based on the authentication data meeting authentication requirements associated with the locks.

19. The PCS of claim 18, wherein the access controller further comprises a data input device configured to provide the authentication data to the processing device.

20. The PCS of claim 18, wherein the access controller is configured to detect at least one of unauthorized access and attempted unauthorized access.

21. The PCS of claim 20, wherein the access controller is configured to collect evidence of at least one of the unauthorized access and the attempted unauthorized access.

22. The PCS of claim 21, further comprising a camera, wherein the access controller is configured to collect the evidence by operating the camera to acquire at least one image of a region proximate to the PCS.

23. The PCS of claim 20, wherein the access controller is configured to provide an alert regarding at least one of the unauthorized access and the attempted unauthorized access.

24. The PCS of claim 23, wherein the access controller is configured to provide the alert by performing at least one act selected from the group consisting of sounding an alarm, displaying a message via the display subsystem, and sending a silent alert to a security provider.

25. The PCS of claim 18, wherein the processing device is further configured to receive permission to disengage the at least one lock, and wherein the processing device is configured to disengage the at least one lock based on receiving the permission and on the authentication data meeting the authentication requirements associated with the at least one lock.

26. The PCS of claim 25, wherein the processing device is further configured to send a message requesting permission to disengage the at least one lock, and wherein the permission to disengage the at least one lock is received in response to sending the message.

27. The PCS of claim 1, wherein the independently accessible compartments further comprise a user interface compartment at least partially enclosing a user interface subsystem.

28. The PCS of claim 1, further comprising an air intake compartment at least partially enclosing an air intake subsystem.

29. The PCS of claim 1, further comprising a mounting compartment, wherein the mounting compartment encloses at least one power connection and at least one network connection.

30. A personal communication structure (PCS) comprising:
a plurality of independently accessible compartments at least partially enclosing respective subsystems of the PCS, the plurality of independently accessible compartments comprising:
an electronics compartment at least partially enclosing a power distribution subsystem,
a communications compartment at least partially enclosing a communications subsystem, and
a display compartment at least partially enclosing a display subsystem; and
an access controller operable to provide access independently to respective interiors of at least a subset of the compartments,
wherein the access controller comprises a processing device, wherein the subset of the independently accessible compartments comprise respective locks, and wherein the processing device is configured to independently disengage the respective locks,
wherein the access controller is configured to detect closure of an access member of at least one compartment, the access member being movable between an open position and a closed position, and
wherein the access controller is configured to engage the lock associated with the at least one compartment based on detection of the closure of the access member.

* * * * *